United States Patent
Frank et al.

(10) Patent No.: US 10,698,628 B2
(45) Date of Patent: Jun. 30, 2020

(54) INFINITE MEMORY FABRIC HARDWARE IMPLEMENTATION WITH MEMORY

(71) Applicant: ULTRATA, LLC, Vienna, VA (US)

(72) Inventors: Steven J. Frank, Boulder, CO (US); Larry Reback, Vienna, VA (US)

(73) Assignee: Ultrata, LLC, Vienna, VA (US)

( * ) Notice: Subject to any disclaimer, the term of this patent is extended or adjusted under 35 U.S.C. 154(b) by 0 days.

(21) Appl. No.: 15/169,580

(22) Filed: May 31, 2016

(65) Prior Publication Data

US 2016/0364172 A1    Dec. 15, 2016

Related U.S. Application Data

(60) Provisional application No. 62/172,978, filed on Jun. 9, 2015.

(51) Int. Cl.
*G06F 3/06* (2006.01)
(52) U.S. Cl.
CPC .......... *G06F 3/0647* (2013.01); *G06F 3/0613* (2013.01); *G06F 3/0683* (2013.01)
(58) Field of Classification Search
CPC ..... G06F 3/0647; G06F 3/0683; G06F 3/0613
(Continued)

(56) References Cited

U.S. PATENT DOCUMENTS 4,326,247 A    4/1982   Chamberlin
5,297,279 A    3/1994   Bannon et al.
(Continued)

FOREIGN PATENT DOCUMENTS

WO    WO 2000/074305    12/2000

OTHER PUBLICATIONS

Kang et al., "Object-based SCM: An Efficient Interface for Storage Class Memories," retrieved from https://www.usenix.org/legacy/event/fast11/posters_files/Kang.pdf, retrieved on Apr. 13, 2016 from www.ssrc.ucsc.edu/Papers/kang-msst11.pdf, 12 pages.

(Continued)

*Primary Examiner* — Hua J Song
(74) *Attorney, Agent, or Firm* — Sheridan Ross P.C.

(57) ABSTRACT

Embodiments of the invention provide systems and methods for managing processing, memory, storage, network, and cloud computing to significantly improve the efficiency and performance of processing nodes. More specifically, embodiments of the present invention are directed to a hardware-based processing node of an object memory fabric. The processing node may include a memory module storing and managing one or more memory objects, the one or more memory objects each include at least a first memory and a second memory, wherein the first memory has a lower latency than the second memory, and wherein each memory object is created natively within the memory module, and each memory object is accessed using a single memory reference instruction without Input/Output (I/O) instructions, wherein a set of data is stored within the first memory of the memory module; wherein the memory module is configured to receive an indication of a subset of the set of data that is eligible to be transferred between the first memory and the second memory; and wherein the memory module dynamically determines which of the subset of data will be transferred to the second memory based on access patterns associated with the object memory fabric.

30 Claims, 34 Drawing Sheets

US 10,698,628 B2
Page 2

(58) Field of Classification Search
USPC .................................................. 711/165
See application file for complete search history.

(56) References Cited

U.S. PATENT DOCUMENTS

| | | |
|---|---|---|
| 5,652,875 A | 7/1997 | Taylor |
| 5,664,207 A | 9/1997 | Crumpler et al. |
| 5,781,906 A | 7/1998 | Aggarwal et al. |
| 5,859,849 A | 1/1999 | Parks |
| 5,889,954 A | 3/1999 | Gessel et al. |
| 5,987,468 A | 11/1999 | Singh et al. |
| 6,115,790 A | 9/2000 | Schimmel |
| 6,230,151 B1 | 5/2001 | Agrawal et al. |
| 6,366,876 B1 | 4/2002 | Looney |
| 6,421,769 B1 | 7/2002 | Teitenberg et al. |
| 6,446,188 B1 | 9/2002 | Henderson et al. |
| 6,470,344 B1 | 10/2002 | Kothuri et al. |
| 6,587,874 B1 | 7/2003 | Golla et al. |
| 6,651,163 B1 | 11/2003 | Kranich et al. |
| 6,799,252 B1 | 9/2004 | Bauman |
| 7,149,858 B1 | 12/2006 | Kiselev |
| 7,188,128 B1 | 3/2007 | Nagaraj et al. |
| 7,251,663 B1 | 7/2007 | Smith |
| 7,350,048 B1 | 3/2008 | Schulz |
| 7,526,603 B1 | 4/2009 | Abdollahi-Alibeik et al. |
| 7,587,422 B2 | 9/2009 | Wong et al. |
| 7,657,706 B2 | 2/2010 | Iyer et al. |
| 7,689,602 B1 | 3/2010 | Sim-Tang |
| 7,804,769 B1 | 9/2010 | Tuplur et al. |
| 8,219,564 B1 | 7/2012 | Shao et al. |
| 8,327,187 B1 | 12/2012 | Metcalf |
| 8,392,368 B1 | 3/2013 | Kelly et al. |
| 8,484,259 B1 | 7/2013 | Makkar et al. |
| 8,589,574 B1 | 11/2013 | Cormie et al. |
| 8,706,915 B2 | 4/2014 | Duchesneau |
| 8,812,450 B1 | 8/2014 | Kesavan et al. |
| 8,868,825 B1 | 10/2014 | Hayes et al. |
| 8,904,120 B1 | 12/2014 | Killamsetti et al. |
| 9,002,795 B2 | 4/2015 | Messinger et al. |
| 9,043,567 B1 | 5/2015 | Modukuri et al. |
| 9,069,710 B1 | 6/2015 | Modukuri et al. |
| 9,122,579 B2 | 9/2015 | Flynn et al. |
| 9,141,492 B2 | 9/2015 | Dhavale et al. |
| 9,165,015 B2 | 10/2015 | Kauffman et al. |
| 9,280,788 B2 | 3/2016 | Ferrari et al. |
| 9,367,569 B1 | 6/2016 | Shukla et al. |
| 9,449,068 B2 | 9/2016 | Ferrari et al. |
| 9,454,534 B2 | 9/2016 | Thomas et al. |
| 9,524,302 B2 | 12/2016 | Regni et al. |
| 2001/0027512 A1 | 10/2001 | Hagersten |
| 2003/0115238 A1 | 6/2003 | O'Connor et al. |
| 2004/0039900 A1 | 2/2004 | Heishi et al. |
| 2004/0047360 A1 | 3/2004 | Myers |
| 2004/0083460 A1 | 4/2004 | Pierce |
| 2004/0133590 A1 | 7/2004 | Henderson et al. |
| 2004/0153573 A1 | 8/2004 | Kim et al. |
| 2004/0205740 A1 | 10/2004 | Lavery et al. |
| 2005/0004924 A1 | 1/2005 | Baldwin |
| 2005/0044187 A1 | 2/2005 | Jhaveri et al. |
| 2005/0055721 A1 | 3/2005 | Zigmond et al. |
| 2005/0066095 A1 | 3/2005 | Mullick et al. |
| 2005/0102297 A1 | 5/2005 | Lloyd et al. |
| 2005/0102670 A1 | 5/2005 | Bretl et al. |
| 2005/0114289 A1 | 5/2005 | Fair |
| 2005/0149539 A1 | 7/2005 | Cameron et al. |
| 2005/0171932 A1 | 8/2005 | Nandhra |
| 2005/0182892 A1 | 8/2005 | Nakanishi et al. |
| 2005/0273571 A1 | 12/2005 | Lyon et al. |
| 2006/0041731 A1 | 2/2006 | Jochemsen et al. |
| 2006/0143360 A1 | 6/2006 | Petev et al. |
| 2006/0161583 A1 | 7/2006 | Burka et al. |
| 2006/0161739 A1 | 7/2006 | Genty et al. |
| 2006/0212643 A1 | 9/2006 | Suzuoki |
| 2006/0256603 A1 | 11/2006 | Foster et al. |
| 2006/0259656 A1 | 11/2006 | Sullivan |
| 2007/0033362 A1 | 2/2007 | Sinclair |
| 2007/0094310 A1 | 4/2007 | Passey et al. |
| 2007/0110047 A1 | 5/2007 | Kim |
| 2007/0133406 A1 | 6/2007 | Vasseur |
| 2007/0198785 A1 | 8/2007 | Kogge et al. |
| 2007/0234290 A1 | 10/2007 | Ronen et al. |
| 2007/0245111 A1 | 10/2007 | McBride et al. |
| 2008/0005521 A1 | 1/2008 | Cholleti et al. |
| 2008/0008202 A1 | 1/2008 | Terrell et al. |
| 2008/0052436 A1 | 2/2008 | Sharma et al. |
| 2008/0120474 A1 | 5/2008 | Hastings et al. |
| 2008/0163183 A1 | 7/2008 | Li et al. |
| 2008/0189251 A1 | 8/2008 | Branscome et al. |
| 2008/0208888 A1 | 8/2008 | Mitchell et al. |
| 2008/0209406 A1 | 8/2008 | O'Callahan |
| 2009/0006831 A1 | 1/2009 | Kwong et al. |
| 2009/0125639 A1 | 5/2009 | Dam et al. |
| 2009/0132760 A1 | 5/2009 | Flynn et al. |
| 2009/0150641 A1 | 6/2009 | Flynn et al. |
| 2009/0172293 A1 | 7/2009 | Sun |
| 2009/0198918 A1 | 8/2009 | Arimilli et al. |
| 2009/0210626 A1 | 8/2009 | Papazova et al. |
| 2009/0231798 A1 | 9/2009 | Skinner |
| 2009/0271790 A1 | 10/2009 | Williams |
| 2009/0299966 A1 | 12/2009 | Schneider |
| 2009/0327596 A1 | 12/2009 | Christenson et al. |
| 2010/0088317 A1 | 4/2010 | Bone et al. |
| 2010/0146004 A1 | 6/2010 | Sim-Tang |
| 2011/0004788 A1 | 1/2011 | Petit et al. |
| 2011/0072204 A1 | 3/2011 | Chang et al. |
| 2011/0103391 A1 | 5/2011 | Davis et al. |
| 2011/0122791 A1 | 5/2011 | Bonald et al. |
| 2011/0161608 A1* | 6/2011 | Bellows ............ G06F 12/0802 711/162 |
| 2011/0202724 A1 | 8/2011 | Kegel et al. |
| 2011/0283071 A1 | 11/2011 | Yokoya et al. |
| 2012/0017037 A1 | 1/2012 | Riddle et al. |
| 2012/0023233 A1 | 1/2012 | Okamoto et al. |
| 2012/0158670 A1 | 6/2012 | Sharma et al. |
| 2012/0185230 A1 | 7/2012 | Archer et al. |
| 2013/0031364 A1 | 1/2013 | Glew et al. |
| 2013/0054922 A1 | 2/2013 | Tuch et al. |
| 2013/0086563 A1 | 4/2013 | Blainey et al. |
| 2013/0091236 A1 | 4/2013 | Aho |
| 2013/0103896 A1 | 4/2013 | Rajan et al. |
| 2013/0117225 A1 | 5/2013 | Dalton |
| 2013/0117766 A1 | 5/2013 | Bax et al. |
| 2013/0198474 A1 | 8/2013 | Shaath |
| 2013/0205114 A1 | 8/2013 | Badam et al. |
| 2013/0219114 A1 | 8/2013 | Sutardja |
| 2013/0268739 A1 | 10/2013 | Gupta et al. |
| 2013/0346444 A1 | 12/2013 | Makkar et al. |
| 2013/0346953 A1 | 12/2013 | Chen et al. |
| 2013/0347088 A1 | 12/2013 | McBrearty et al. |
| 2014/0025770 A1 | 1/2014 | Warfield et al. |
| 2014/0032822 A1 | 1/2014 | Oh |
| 2014/0033048 A1 | 1/2014 | Kim et al. |
| 2014/0310467 A1 | 1/2014 | Shalf et al. |
| 2014/0040199 A1 | 2/2014 | Golab et al. |
| 2014/0081924 A1 | 3/2014 | Jennings et al. |
| 2014/0101347 A1 | 4/2014 | Chandhoke et al. |
| 2014/0108709 A1 | 4/2014 | Barrall et al. |
| 2014/0137019 A1 | 5/2014 | Paulsen et al. |
| 2014/0143217 A1 | 5/2014 | Thakur et al. |
| 2014/0165196 A1 | 6/2014 | Dalal et al. |
| 2014/0173706 A1 | 6/2014 | Apotovsky et al. |
| 2014/0192583 A1 | 7/2014 | Rajan et al. |
| 2014/0250256 A1 | 9/2014 | Duran |
| 2014/0258620 A1 | 9/2014 | Nagarajan et al. |
| 2014/0317206 A1 | 10/2014 | Lomelino et al. |
| 2014/0317352 A1 | 10/2014 | Kleen |
| 2014/0325116 A1* | 10/2014 | McKelvie ........... G06F 12/0246 711/103 |
| 2014/0337321 A1 | 11/2014 | Coyote et al. |
| 2014/0365726 A1 | 12/2014 | Bennett et al. |
| 2014/0372491 A1 | 12/2014 | Ross et al. |
| 2014/0380414 A1 | 12/2014 | Saidi et al. |
| 2015/0039840 A1 | 2/2015 | Chandra et al. |
| 2015/0063349 A1 | 3/2015 | Ardalan et al. |

(56) References Cited

U.S. PATENT DOCUMENTS

| | | |
|---|---|---|
| 2015/0124806 A1 | 5/2015 | Banerjee et al. |
| 2015/0154192 A1 | 6/2015 | Lysne et al. |
| 2015/0160988 A1 | 6/2015 | Scomparim |
| 2015/0186215 A1 | 7/2015 | Das Sharma et al. |
| 2015/0242324 A1 | 8/2015 | Novakovic et al. |
| 2015/0370721 A1 | 12/2015 | Morris et al. |
| 2016/0055191 A1 | 2/2016 | Joshi et al. |
| 2016/0077901 A1 | 3/2016 | Roth et al. |
| 2016/0124802 A1 | 5/2016 | Gabor et al. |
| 2016/0132511 A1 | 5/2016 | Chan et al. |
| 2016/0170928 A1 | 6/2016 | Tamarkin et al. |
| 2016/0202907 A1* | 7/2016 | Kanno .................. G06F 12/08 711/165 |
| 2016/0210048 A1 | 7/2016 | Frank et al. |
| 2016/0210053 A1 | 7/2016 | Frank et al. |
| 2016/0210054 A1 | 7/2016 | Frank et al. |
| 2016/0210075 A1 | 7/2016 | Frank et al. |
| 2016/0210076 A1 | 7/2016 | Frank et al. |
| 2016/0210077 A1 | 7/2016 | Frank et al. |
| 2016/0210078 A1 | 7/2016 | Frank et al. |
| 2016/0210079 A1 | 7/2016 | Frank et al. |
| 2016/0210080 A1 | 7/2016 | Frank et al. |
| 2016/0210082 A1 | 7/2016 | Frank et al. |
| 2016/0210238 A1 | 7/2016 | Frank et al. |
| 2016/0231940 A1 | 8/2016 | Tabachnik et al. |
| 2016/0283245 A1 | 9/2016 | Ben-Kiki et al. |
| 2016/0357476 A1 | 12/2016 | Chen et al. |
| 2016/0364171 A1 | 12/2016 | Frank et al. |
| 2016/0364173 A1 | 12/2016 | Frank et al. |
| 2017/0052717 A1 | 2/2017 | Rawat et al. |
| 2017/0160963 A1 | 6/2017 | Frank et al. |
| 2017/0160984 A1 | 6/2017 | Frank et al. |
| 2017/0199815 A1 | 7/2017 | Frank et al. |
| 2018/0188993 A1 | 7/2018 | Frank et al. |
| 2018/0217755 A1 | 8/2018 | Frank et al. |
| 2018/0225046 A1 | 8/2018 | Frank et al. |
| 2018/0225061 A1 | 8/2018 | Frank et al. |
| 2020/0004423 A1 | 1/2020 | Frank et al. |

OTHER PUBLICATIONS

Wolczko et al., "An Object-Based Memory Architecture," retirved from http://webcache.googleusercontent.com/search?q=cache:94bLdHnF19MJ:www.wolczko.com/muchroom/obma.ps.Z+&cd=en&ct=cInk&gl=in, retrieved on Apr. 13, 2016 from www.wolczko.com/mushroom, 22 pages.

Wu et al., "Exposing Memory Access Regularities Using Object Relative Memory Profiling," symposium on Code Generation and Optimization, Mar. 20-24, 2004, retrieved from http://ieeexplore.ieee.org/stamp/stamp.jsp?tp=&arnumber=1281684&isnumber=28612>, retrieved on Mar. 4, 2016, 9 pages.

International Search Report and Written Opinion for International (PCT) Patent Application No. PCT/US16/14013, dated Apr. 7, 2016, 19 pages.

International Search Report and Written Opinion for International (PCT) Patent Application No. PCT/US16/14021, dated Mar. 31, 2016, 10 pages.

International Search Report and Written Opinion for International (PCT) Patent Application No. PCT/US16/14024, dated Mar. 28, 2016, 10 pages.

International Search Report and Written Opinion for International (PCT) Patent Application No. PCT/US16/14018, dated Mar. 29, 2016, 11 pages.

International Search Report and Written Opinion for International (PCT) Patent Application No. PCT/US16/14099, dated Jun. 2, 2016, 13 pages.

International Search Report and Written Opinion for International (PCT) Patnet Application No. PCT/US16/14074, dated Apr. 1, 2016, 9 pages.

International Search Report and Written Opinion for International (PCT) Patent Application No. PCT/US16/14130, dated Apr. 7, 2016, 11 pages.

International Search Report and Written Opinion for International (PCT) Patent Application No. PCT/US16/14135, dated Mar. 24, 2016, 12 pages.

International Search Report and Written Opinion for International (PCT) Patent Application No. PCT/US16/14113, dated Mar. 29, 2016, 9 pages.

International Search Report and Written Opinion for International (PCT) Patent Application No. PCT/US16/14124, dated Mar. 31, 2016, 11 pages.

International Search Report and Written Opinion for International (PCT) Patent Application No. PCT/US16/14119, dated Mar. 28, 2016, 11 pages.

International Search Report and Written Opinion for International (PCT) Patent Application No. PCT/US16/35203, dated Aug. 5, 2016, 20 pages.

International Search Report and Written Opinion for International (PCT) Patent Application No. PCT/US16/35268, dated Aug. 30, 2016, 8 pages.

International Search Report and Written Opinion for International (PCT) Patent Application No. PCT/US16/35264, dated Aug. 18, 2016, 14 pages.

International Search Report and Written Opinion for International (PCT) Patent Application No. PCT/US16/65320, dated Feb. 17, 2017, 10 pages.

International Search Report and Written Opinion for International (PCT) Patent Application No. PCT/US16/65330, dated Feb. 6, 2017, 12 pages.

International Search Report and Written Opinion for International (PCT) Patent Application No. PCT/US16/65334, dated Feb. 21, 2017, 13 pages.

Official Action for U.S. Appl. No. 15/001,494, filed Jun. 6, 2017, 22 pages.

Official Action for U.S. Appl. No. 15/001,524, dated Jun. 6, 2017, 28 pages.

Official Action for U.S. Appl. No. 15/001,652, dated Mar. 24, 2017, 12 pages.

Official Action for U.S. Appl. No. 15/001,526, dated May 22, 2017, 38 pages.

Official Action for U.S. Appl. No. 15/001,490, dated Jun. 20, 2017, 30 pages.

Official Action for U.S. Appl. No. 15/168,965, dated Mar. 9, 2017, 42 pages.

Dasgupta et al., "The Clouds Distributed Operating System," Computer, vol. 24, No. 11, Nov. 1991, pp. 34-44.

Gruber et al., "Eos, and Environment for Object-Based Systems," Hawaii International Conference on System Sciences, Architectural and Operating System Support for Persistent Object Systems Minitrack, 1992, pp. 1-14.

Hennessy et al., "Computer Architecture: A Quantitative Approach, 5th Edition—Chapter 5: Thread-Level Parallelism" Elsevier, Wathan, MA, 2012, retrieved from https://aaddiii.files.wordpress.com/2016/02/computer-architecture-patterson-5th-edition.pdf, pp. 344-348.

Novakovic et al., "Scale-Out NUMA," Proceedings of ASPLOS-XIX, Mar. 2014, pp. 1-15.

International Preliminary Report on Patentability for International (PCT) Patent Application No. PCT/US16/14013, dated Jul. 25, 2017, 8 pages.

Extended European Search Report for European Patent Application No. 16740628.9, dated Sep. 17, 2018, 12 pages.

International Preliminary Report on Patentability for International (PCT) Patent Application No. PCT/US16/14021, dated Jul. 25, 2017, 8 pages.

International Preliminary Report on Patentability for International (PCT) Patent Application No. PCT/US16/14024, dated Jul. 25, 2017, 8 pages.

International Preliminary Report on Patentability for International (PCT) Patent Application No. PCT/US16/14018, dated Jul. 25, 2017, 6 pages.

International Preliminary Report on Patentability for International (PCT) Patent Application No. PCT/US16/14099, dated Jul. 25, 2017, 8 pages.

Extended European Search Report for European Patent Application No. 16740661.0, dated Aug. 14, 2018, 9 pages.

(56) References Cited

OTHER PUBLICATIONS

International Preliminary Report on Patentability for International (PCT) Patent Application No. PCT/US16/14074, dated Jul. 25, 2017, 6 pages.
International Preliminary Report on Patentability for International (PCT) Patent Application No. PCT/US16/14130, dated Jul. 25, 2017, 10 pages.
International Preliminary Report on Patentability for International (PCT) Patent Application No. PCT/US16/14135, dated Jul. 25, 2017, 9 pages.
International Preliminary Report on Patentability for International (PCT) Patent Application No. PCT/US16/14113, dated Jul. 25, 2017, 6 pages.
Extended European Search Report for European Patent Application No. 16740669.3, dated Aug. 21, 2018, 10 pages.
International Preliminary Report on Patentability for International (PCT) Patent Application No. PCT/US16/14124, dated Jul. 25, 2017, 8 pages.
International Preliminary Report on Patentability for International (PCT) Patent Application No. PCT/US16/14119, dated Jul. 25, 2017, 8 pages.
International Preliminary Report on Patentability for International (PCT) Patent Application No. PCT/US16/65320, dated Jun. 21, 2018, 9 pages.
International Preliminary Report on Patentability for International (PCT) Patent Application No. PCT/US16/65330, dated Jun. 21, 2018, 11 pages.
International Preliminary Report on Patentability for International (PCT) Patent Application No. PCT/US16/65334, dated Jun. 21, 2018, 12 pages.
Official Action for U.S. Appl. No. 15/001,320, dated Aug. 25, 2017 17 pages.
Official Action for U.S. Appl. No. 15/001,320, dated Jan. 10, 2018 20 pages.
Official Action for U.S. Appl. No. 15/001,320, dated May 3, 2018 25 pages.
Official Action for U.S. Appl. No. 15/001,320, dated Sep. 20, 2018, 26 pages.
Official Action for U.S. Appl. No. 15/001,332, dated Aug. 25, 2017 17 pages.
Official Action for U.S. Appl. No. 15/001,332, dated Jan. 1, 2018 19 pages.
Official Action for U.S. Appl. No. 15/001,332, dated May 3, 2018 24 pages.
Official Action for U.S. Appl. No. 15/001,332, dated Sep. 20, 2018 30 pages.
Official Action for U.S. Appl. No. 15/001,340, dated Sep. 12, 2017 19 pages.
Official Action for U.S. Appl. No. 15/001,340, dated Jan. 10, 2018 21 pages.
Official Action for U.S. Appl. No. 15/001,340, dated May 3, 2018 25 pages.
Official Action for U.S. Appl. No. 15/001,340, dated Sep. 20, 2018 31 pages.
Official Action for U.S. Appl. No. 15/001,343, dated Sep. 14, 2017 17 pages.
Official Action for U.S. Appl. No. 15/001,343, dated Mar. 8, 2018 20 pages.
Official Action for U.S. Appl. No. 15/001,343, dated Jun. 19, 2018 22 pages.
Official Action for U.S. Appl. No. 15/001,343, dated Sep. 27, 2018, 28 pages.
Official Action for U.S. Appl. No. 15/001,451, dated Dec. 1, 2017 22 pages.
Notice of Allowance for U.S. Appl. No. 15/001,451, dated Feb. 7, 2018 9 pages.
Official Action for U.S. Appl. No. 15/001,494, dated Oct. 26, 2017 25 pages.
Official Action for U.S. Appl. No. 15/001,494, dated Feb. 27, 2018 29 pages.
Official Action for U.S. Appl. No. 15/001,494, dated Jun. 20, 2018 34 pages.
Official Action for U.S. Appl. No. 15/001,524, dated Oct. 26, 2017 26 pages.
Official Action for U.S. Appl. No. 15/001,524, dated Mar. 7, 2018 31 pages.
Official Action for U.S. Appl. No. 15/001,524, dated Jun. 28, 2018 41 pages.
Official Action for U.S. Appl. No. 15/001,652, dated Sep. 22, 2017 13 pages.
Notice of Allowance for U.S. Appl. No. 15/001,652, dated Jan. 16, 2018 8 pages.
Official Action for U.S. Appl. No. 15/938,061, dated Jul. 24, 2018, 15 pages.
Official Action for U.S. Appl. No. 15/001,366, dated Sep. 8, 2017 17 pages.
Official Action for U.S. Appl. No. 15/001,366, dated Jan. 10, 2018 20 pages.
Official Action for U.S. Appl. No. 15/001,366, dated Apr. 23, 2018 27 pages.
Official Action for U.S. Appl. No. 15/001,366, dated Sep. 18, 2018 28 pages.
Official Action for U.S. Appl. No. 15/001,526, dated Oct. 20, 2017 33 pages.
Official Action for U.S. Appl. No. 15/001,526, dated Feb. 27, 2018 37 pages.
Official Action for U.S. Appl. No. 15/001,526, dated Jun. 25, 2018 41 pages.
Official Action for U.S. Appl. No. 15/001,490, dated Oct. 20, 2017 29 pages.
Official Action for U.S. Appl. No. 15/001,490, dated Feb. 27, 2018 38 pages.
Official Action for U.S. Appl. No. 15/001,490, dated Jun. 20, 2018 40 pages.
Official Action for U.S. Appl. No. 15/168,965, dated Sep. 21, 2017 47 pages.
Notice of Allowance for U.S. Appl. No. 15/168,965, dated Jan. 26, 2018 14 pages.
Notice of Allowance for U.S. Appl. No. 15/946,860, dated Aug. 10, 2018 11 pages.
Notice of Allowance for U.S. Appl. No. 15/946,860, dated Oct. 22, 2018 5 pages.
Official Action for U.S. Appl. No. 15/169,585, dated Sep. 13, 2017 15 pages.
Notice of Allowance for U.S. Appl. No. 15/169,585, dated Nov. 1, 2017 6 pages.
Official Action for U.S. Appl. No. 15/852,228, dated Apr. 10, 2018 17 pages.
Official Action for U.S. Appl. No. 15/852,228, dated Oct. 15, 2018 14 pages.
Official Action for U.S. Appl. No. 15/371,393, dated Jan. 18, 2018 12 pages.
Official Action for U.S. Appl. No. 15/371,393, dated Jul. 3, 2018 16 pages.
Official Action for U.S. Appl. No. 15/371,440, dated Feb. 12, 2018 29 pages.
Notice of Allowance for U.S. Appl. No. 15/371,440, dated Sep. 12, 2018 7 pages.
Notice of Allowance for U.S. Appl. No. 15/371,440, dated Oct. 22, 2018 8 pages.
Official Action for U.S. Appl. No. 15/371,448, dated Feb. 12, 2018 33 pages.
Notice of Allowance for U.S. Appl. No. 15/371,448, dated Sep. 12, 2018 8 pages.
Extended European Search Report for European Patent Application No. 16808050.5, dated Nov. 13, 2018, 10 pages.
Official Action for U.S. Appl. No. 15/001,494, dated Dec. 21, 2018, 34 pages.
Official Action for U.S. Appl. No. 15/001,524, dated Dec. 17, 2018, 40 pages.
Official Action for U.S. Appl. No. 15/001,526, dated Dec. 14, 2018, 39 pages.

(56) References Cited

OTHER PUBLICATIONS

Official Action for U.S. Appl. No. 15/001,490, dated Dec. 14, 2018, 38 pages.
Notice of Allowance for U.S. Appl. No. 15/371,393, dated Nov. 7, 2018, 8 pages.
Notice of Allowance for U.S. Appl. No. 15/371,448, dated Nov. 2, 2018, 9 pages.
Extended European Search Report for European Patent Application No. 16808045.5, dated Jan. 18, 2019, 8 pages.
Official Action for U.S. Appl. No. 15/938,061, dated Feb. 21, 2019, 13 pages.
U.S. Appl. No. 16/254,043, filed Jan. 22, 2019, Frank et al.
U.S. Appl. No. 16/254,079, filed Jan. 22, 2019, Frank et al.
U.S. Appl. No. 16/266,460, filed Feb. 4, 2019, Frank et al.
U.S. Appl. No. 16/269,833, filed Feb. 7, 2019, Frank et al.
Official Action (with English translation) for Chinese Patent Application No. 201680015733.X, dated Dec. 23, 2019, 20 pages.
Official Action (no English translation available) for Chinese Patent Application No. 201680015942.4, dated Oct. 22, 2019, 7 pages.
Official Action for European Patent Application No. 16740661.0, dated Jan. 15, 2020, 6 pages.
U.S. Appl. No. 16/545,640, filed Aug. 20, 2019, Frank et al.
Extended European Search Report for European Patent Application No. 16873738.5, dated Jul. 8, 2019, 8 pages.
Extended European Search Report for European Patent Application No. 16873742.7, dated Jul. 12, 2019, 9 pages.
Official Action for U.S. Appl. No. 15/001,320, dated Mar. 8, 2019, 29 pages.
Official Action for U.S. Appl. No. 15/001,320, dated Oct. 31, 2019, 25 pages.
Official Action for U.S. Appl. No. 15/001,332, dated Mar. 14, 2019 31 pages.
Official Action for U.S. Appl. No. 15/001,332, dated Oct. 18, 2019 28 pages.
Official Action for U.S. Appl. No. 15/001,340, dated Mar. 22, 2019, 32 pages.
Official Action for U.S. Appl. No. 15/001,340, dated Oct. 18, 2019, 32 pages.
Official Action for U.S. Appl. No. 15/001,343, dated Mar. 22, 2019, 31 pages.
Official Action for U.S. Appl. No. 15/001,343, dated Oct. 21, 2019, 28 pages.
Official Action for U.S. Appl. No. 15/946,918, dated Oct. 31, 2019, 20 pages.
Official Action for U.S. Appl. No. 15/001,494, dated May 3, 2019, 37 pages.
Official Action for U.S. Appl. No. 15/001,494, dated Dec. 2, 2019, 38 pages.
Official Action for U.S. Appl. No. 15/001,524, dated May 3, 2019, 44 pages.
Official Action for U.S. Appl. No. 15/001,524, dated Nov. 19, 2019, 43 pages.
Notice of Allowance for U.S. Appl. No. 15/938,061, dated Jun. 12, 2019, 6 pages.
Official Action for U.S. Appl. No. 15/001,366, dated Feb. 26, 2019, 25 pages.
Official Action for U.S. Appl. No. 15/001,366, dated Jul. 26, 2019, 28 pages.
Official Action for U.S. Appl. No. 15/001,526, dated May 3, 2019, 43 pages.
Official Action for U.S. Appl. No. 15/001,526, dated Nov. 19, 2019, 38 pages.
Official Action for U.S. Appl. No. 15/001,490, dated May 3, 2019, 45 pages.
Official Action for U.S. Appl. No. 15/001,490, dated Nov. 12, 2019, 37 pages.
Notice of Allowance for U.S. Appl. No. 16/254079, dated Nov. 8, 2019, 11 pages.
Notice of Allowance for U.S. Appl. No. 15/852,228, dated May 20, 2019 5 pages.

\* cited by examiner

INFINITE MEMORY FABRIC HARDWARE IMPLEMENTATION WITH MEMORY

CROSS-REFERENCE TO RELATED APPLICATIONS

The present application claims benefit under 35 USC 119(e) of U.S. Provisional Application No. 62/172,978, filed on Jun. 9, 2015 by Frank et al and entitled "Infinite Memory Fabric Hardware Implementation," of which the entire disclosure is incorporated herein by reference for all purposes.

The present application is also related to the following co-pending and commonly assigned U.S. patent applications:

U.S. patent application Ser. No. 15/001,320, filed on Jan. 20, 2016 by Frank and entitled "Object Based Memory Fabric;"

U.S. patent application Ser. No. 15/001,332, filed on Jan. 20, 2016 by Frank and entitled "Trans-Cloud Object Based Memory;"

U.S. patent application Ser. No. 15/001,340, filed on Jan. 20, 2016 by Frank and entitled "Universal Single Level Object Memory Address Space;"

U.S. patent application Ser. No. 15/001,343, filed on Jan. 20, 2016 by Frank and entitled "Object Memory Fabric Performance Acceleration;"

U.S. patent application Ser. No. 15/001,451, filed on Jan. 20, 2016 by Frank and entitled "Distributed Index for Fault Tolerant Object Memory Fabric;"

U.S. patent application Ser. No. 15/001,494, filed on Jan. 20, 2016 by Frank and entitled "Implementation of an Object Memory Centric Cloud;"

U.S. patent application Ser. No. 15/001,524, filed on Jan. 20, 2016 by Frank and entitled "Managing Metadata in an Object Memory Fabric;"

U.S. patent application Ser. No. 15/001,652, filed on Jan. 20, 2016 by Frank and entitled "Utilization of a Distributed Index to Provide Object Memory Fabric Coherency;"

U.S. patent application Ser. No. 15/001,366, filed on Jan. 20, 2016 by Frank and entitled "Object Memory Data Flow Instruction Execution;"

U.S. patent application Ser. No. 15/001,490, filed on Jan. 20, 2016 by Frank and entitled "Object Memory Data Flow Triggers;"

U.S. patent application Ser. No. 15/001,526, filed on Jan. 20, 2016 by Frank and entitled "Object Memory Instruction Set;"

U.S. patent application Ser. No. 15/168,965 filed concurrent herewith by Frank and entitled "Infinite Memory Fabric Streams and APIS;" and U.S. patent application Ser. No. 15/169,585 filed concurrent herewith by Frank and entitled "Infinite Memory Fabric Hardware Implementation with Router," of which the entire disclosure of each is incorporated herein by reference for all purposes.

BACKGROUND OF THE INVENTION

Embodiments of the present invention relate generally to methods and systems for improving performance of processing nodes in a fabric and more particularly to changing the way in which processing, memory, storage, network, and cloud computing, are managed to significantly improve the efficiency and performance of commodity hardware.

As the size and complexity of data and the processes performed thereon continually increases, computer hardware is challenged to meet these demands. Current commodity hardware and software solutions from established server, network and storage providers are unable to meet the demands of Cloud Computing and Big Data environments. This is due, at least in part, to the way in which processing, memory, and storage are managed by those systems. Specifically, processing is separated from memory which is turn is separated from storage in current systems and each of processing, memory, and storage is managed separately by software. Each server and other computing device (referred to herein as a node) is in turn separated from other nodes by a physical computer network, managed separately by software and in turn the separate processing, memory, and storage associated with each node are managed by software on that node.

FIG. 1 is a block diagram illustrating an example of the separation data storage, memory, and processing within prior art commodity servers and network components. This example illustrates a system 100 in which commodity servers 105 and 110 are communicatively coupled with each other via a physical network 115 and network software 155 as known in the art. Also as known in the art, the servers can each execute any number of one or more applications 120a, 120b, 120c of any variety. As known in the art, each application 120a, 120b, 120c executes on a processor (not shown) and memory (not shown) of the server 105 and 110 using data stored in physical storage 150. Each server 105 and 110 maintains a directory 125 mapping the location of the data used by the applications 120a, 120b, 120c. Additionally, each server implements for each executing application 120a, 120b, 120c a software stack which includes an application representation 130 of the data, a database representation 135, a file system representation 140, and a storage representation 145.

While effective, there are three reasons that such implementations on current commodity hardware and software solutions from established server, network and storage providers are unable to meet the increasing demands of Cloud Computing and Big Data environments. One reason for the shortcomings of these implementations is their complexity. The software stack must be in place and every application must manage the separation of storage, memory, and processing as well as applying parallel server resources. Each application must trade-off algorithm parallelism, data organization and data movement which is extremely challenging to get correct, let alone considerations of performance and economics. This tends to lead to implementation of more batch oriented solutions in the applications, rather than the integrated real-time solutions preferred by most businesses. Additionally, separation of storage, memory, and processing, in such implementations also creates significant inefficiency for each layer of the software stack to find, move, and access a block of data due to the required instruction execution and latencies of each layer of the software stack and between the layers. Furthermore, this inefficiency limits the economic scaling possible and limits the data-size for all but the most extremely parallel algorithms. The reason for the latter is that the efficiency with which servers (processors or threads) can interact limits the amount of parallelism due to Amdahl's law. Hence, there is a need for improved methods and systems for managing processing, memory, and storage to significantly improve the performance of processing nodes.

BRIEF SUMMARY OF THE INVENTION

Embodiments of the invention provide systems and methods for managing processing, memory, storage, network, and cloud computing to significantly improve the efficiency and performance of processing nodes. More specifically, embodiments of the present invention are directed to object memory fabric streams and application programming interfaces (APIs) that correspond to a method to implement a distributed object memory and to support hardware, software, and mixed implementations. The stream API may be defined from any point as two one-way streams in opposite directions. Advantageously, the stream API can be implemented with a variety topologies. The stream API may handle object coherency so that any device can then move or remotely execute arbitrary functions, since functions are within object meta-data, which is part of a coherent object address space.

In one aspect, a hardware-based processing node of an object memory fabric is disclosed. The hardware-based processing node may include a memory module storing and managing one or more memory objects. Each memory object may be created natively within the memory module. Each memory object may be accessed using a single memory reference instruction without Input/Output (I/O) instructions. The hardware-based processing node may be configured to utilize a stream application programming interface (API) to communicate with one or more additional nodes to operate as a set of nodes of the object memory fabric. The set of nodes may operate so that all memory objects of the set of nodes are accessible based at least in part on the stream API when the set of nodes are implemented with any one topology of a plurality of different topologies. The stream API may define communications from any node of the set of nodes as two one-way streams including a first one-way stream in a first direction and a second one-way stream in a second direction that is opposite with respect to the first direction.

In another aspect, a method for facilitating communications among nodes of an object memory fabric is disclosed. One or more memory objects may be created natively within a memory module of a hardware-based processing node of the object memory fabric. Each memory object of the one or more memory objects may be accessed using a single memory reference instruction without Input/Output (I/O) instructions. A stream application programming interface (API) may be utilized by the hardware-based processing node to communicate with one or more additional nodes to operate as a set of nodes of the object memory fabric. The set of nodes may operates so that all memory objects of the set of nodes are accessible based at least in part on the stream API when the set of nodes are implemented with any one topology of a plurality of different topologies. The stream API may define communications from any node of the set of nodes as two one-way streams including a first one-way stream in a first direction and a second one-way stream in a second direction that is opposite with respect to the first direction.

In various embodiments, the communications defined by the stream API may correspond to ring streams according to a unidirectional ring organization between multiple nodes of the set of nodes. In various embodiments, the one-way streams each may include instruction packages. At least one instruction package of the instruction packages may include an extended instruction and associated data. In various embodiments, the at least one instruction package may correspond to an instruction package that includes a pull instruction, or an acknowledge instruction with object information.

In various embodiments, physical address of memory and storage may be managed with each of the one or more memory objects based at least in part on an object address space that is allocated on a per-object basis with an object addressing scheme so that object addresses are allocated to the one or more memory objects according to the object addressing scheme. The instruction package may include one or more fields for specifying: an object ID that corresponds to an object start point in a respective object address of the object addresses for the respective memory object; an object offset to address a specific portion of the respective memory object; and/or an object size of the respective memory object.

In various embodiments, the instruction package may include one or more fields for specifying a hierarchical node identification for a requesting node corresponding to a requesting hardware-based processing node of the plurality of hardware-based processing nodes and/or requesting software-based node. At least one node of the set of nodes may be configured to route a response to the requesting node based at least in part on the hierarchical node identification.

In various embodiments, physical address of memory and storage may be managed with each of the one or more memory objects based at least in part on an object address space that is allocated on a per-object basis with an object addressing scheme so that block object addresses are allocated to the one or more memory objects according to the object addressing scheme. The at least one instruction package may correspond to an object data package that includes a push instruction, object information, and a single block specified by a particular block object address of the block object addresses.

In various embodiments, at least one node of the set of nodes may be configured to route the at least one instruction package based at least in part on a location of the single block, a stream API request, and the push instruction. In various embodiments, at least one node of the set of nodes may be configured to route the at least one instruction package based at least in part on a location of the single block, a stream API request, and the push instruction.

In yet another aspect, an object memory fabric is disclosed. The object memory fabric may include a plurality of hardware-based processing nodes. Each hardware-based processing node may include one or more memory modules storing and managing one or more memory objects. Each memory object may be created natively within the memory module. Each memory object may be accessed using a single memory reference instruction without Input/Output (I/O) instructions. Each hardware-based processing node of the plurality of hardware-based processing nodes may be configured to utilize a stream application programming interface (API) to communicate with other hardware-based processing nodes of the plurality of hardware-based processing nodes to operate as a set of nodes of the object memory fabric. The set of nodes operates so that any hardware-based processing node of the plurality of hardware-based processing nodes may be configured to move the one or more memory objects and/or remotely execute functions on other hardware-based processing nodes of the plurality of hardware-based processing nodes based at least in part on the stream API.

In still another aspect, a method for facilitating communications among nodes of an object memory fabric is disclosed. One or more memory objects may be created natively within one or more memory modules of one or more hardware-based processing nodes of a plurality of hardware-based processing nodes. Each memory object may be accessed using a single memory reference instruction without Input/Output (I/O) instructions. A stream application programming interface (API) may be utilized, by each hardware-based processing node of the plurality of hardware-based processing nodes, to communicate with other hardware-based processing nodes of the plurality of hardware-based processing nodes to operate as a set of nodes of the object memory fabric. The set of nodes may operate so that any hardware-based processing node of the plurality of hardware-based processing nodes is configured to move the one or more memory objects and/or remotely execute functions on other hardware-based processing nodes of the plurality of hardware-based processing nodes based at least in part on the stream API.

In various embodiments, the moving the one or more memory objects and/or the remotely executing functions on the other hardware-based processing nodes of the plurality of hardware-based processing nodes may be responsive to a stream API request from a requesting node of the plurality of hardware-based processing nodes and/or from a software layer interfacing with the object memory fabric. In various embodiments, each hardware-based processing node of the plurality of hardware-based processing nodes may be further configured to utilize the stream API to initiate requests from within the object memory fabric. In various embodiments, each hardware-based processing node of the plurality of hardware-based processing nodes may be further configured to utilize the stream API to propagate and/or initiate operations responsive to the requests.

In various embodiments, the object memory fabric may include a component that uses software to emulate at least one hardware node of the plurality of hardware-based processing nodes. In various embodiments, the functions may include one or more cache coherency functions used to determine whether a local object cache state is sufficient for an intended operation corresponding to a stream API request from a requesting node, and, consequent to the determining, to forward a response toward the requesting node or forward the stream API request to another node.

In various embodiments, the moving the one or more memory objects and/or the remotely executing functions on other hardware-based processing nodes of the plurality of hardware-based processing nodes based at least in part on the stream API may include pulling and/or pushing at least a portion of the one or more memory objects between at least two hardware-based processing nodes of the plurality of hardware-based processing nodes. The pulling may include at least one hardware-based processing node requesting at least the portion of the one or more memory objects to move to a location corresponding to the at least one hardware-based processing node. The pushing may include at least one hardware-based processing node requesting at least the portion of the one or more memory objects to move to a remote location that is remote from the at least one hardware-based processing node.

In various embodiments, at least the portion of the one or more memory objects may include memory object data and memory object metadata. The memory object metadata may include one or more triggers that specify additional one or more operations to be executed by any object memory module of the plurality of hardware-based processing nodes when at least the portion of the one or more memory objects is located at the respective object memory module and accessed as part of the respective object memory module responding to the pulling and/or the pushing.

Embodiments of the present technology are directed to a hardware-based processing node of an object memory fabric. The processing node may comprise a memory module storing and managing one or more memory objects, the one or more memory objects each include at least a first memory and a second memory, wherein the first memory has a lower latency than the second memory, and wherein: each memory object is created natively within the memory module, and each memory object is accessed using a single memory reference instruction without Input/Output (I/O) instructions, wherein a set of data is stored within the first memory of the memory module; wherein the memory module is configured to receive an indication of a subset of the set of data that is eligible to be transferred between the first memory and the second memory; and wherein the memory module dynamically determines which of the subset of data will be transferred to the second memory based on access patterns associated with the object memory fabric.

In alternative aspects, the memory module initiates the transfer of data from the first memory to the second memory. In alternative aspects, the memory module transmits a communication to a processor connected to the hardware-based processing node, wherein the communication includes a notification that data has been transferred to the second memory. In alternative aspects, a data of the subset of data is eligible to be transferred between the first memory and the second memory based on a determination that the data will be referenced within a certain predetermined period of time. In alternative aspects, dynamically determining which of the subset of data will be transferred to the second memory includes using metadata stored in the memory module, wherein the metadata is associated with the data. In alternative aspects, the first memory is a non-volatile, persistent memory and the second memory is a volatile, non-persistent memory. In alternative aspects, the first memory is a flash memory and the second memory is a dynamic random-access memory (DRAM). In alternative aspects, the hardware-based processing node further comprises a processor, and wherein the memory module maps an object of the one or more memory objects from the object memory fabric into a virtual address space, and wherein a processor maps the object from the virtual address space into physical memory of the processor. In alternative aspects, the memory module is an accelerator module storing the one or more memory objects, wherein the accelerator module performs a set of predefined management functions on the one or more memory objects. In alternative aspects, the set of predefined management functions of the accelerator module replace storage management and networking software in the node.

Other embodiments of the present technology are directed to an object memory fabric comprising a plurality of hardware-based processing nodes. Each hardware-based processing node may comprise a memory module storing and managing one or more memory objects, the one or more memory objects each include at least a first memory and a second memory, wherein the first memory has a lower latency than the second memory, and wherein: each memory object is created natively within the memory module, and each memory object is accessed using a single memory reference instruction without Input/Output (I/O) instructions, wherein a set of data is stored within the first memory of the memory module; wherein the memory module is configured to receive an indication of a subset of the set of data that is eligible to be transferred between the first memory and the second memory; and wherein the memory module dynamically determines which of the subset of data will be transferred to the second memory based on access patterns associated with the object memory fabric.

In alternative aspects, the memory module initiates the transfer of data from the first memory to the second memory. In alternative aspects, the memory module transmits a communication to a processor connected to the hardware-based processing node, wherein the communication includes a notification that data has been transferred to the second memory. In alternative aspects, a data of the subset of data is eligible to be transferred between the first memory and the second memory based on a determination that the data will be referenced within a certain predetermined period of time. In alternative aspects, dynamically determining which of the subset of data will be transferred to the second memory includes using metadata stored in the memory module, wherein the metadata is associated with the data. In alternative aspects, the first memory is a non-volatile, persistent memory and the second memory is a volatile, non-persistent memory. In alternative aspects, the first memory is a flash memory and the second memory is a dynamic random-access memory (DRAM). In alternative aspects, the hardware-based processing node further comprises a processor, and wherein the memory module maps an object of the one or more memory objects from the object memory fabric into a virtual address space, and wherein a processor maps the object from the virtual address space into physical memory of the processor. In alternative aspects, the memory module is an accelerator module storing the one or more memory objects, wherein the accelerator module performs a set of predefined management functions on the one or more memory objects. In alternative aspects, the set of predefined management functions of the accelerator module replace storage management and networking software in the node.

Other embodiments of the present technology are directed to a computer-implemented method. The method may comprise creating one or more memory objects natively within a memory module of a hardware-based processing node of the object memory fabric, wherein the hardware-based processing node includes a memory module storing and managing one or more memory objects, the one or more memory objects each including at least a first memory and a second memory having lower latency than the second memory; accessing each memory object of the one or more memory objects using a single memory reference instruction without Input/Output (I/O) instructions; and storing, by the hardware-based processing node, a set of data within the first memory of the memory module; receiving, by the memory module, an indication of a subset of the set of data that is eligible to be transferred between the first memory and the second memory; and determining, by the memory module, which of the subset of data will be transferred to the second memory based on access patterns associated with the object memory fabric.

In alternative aspects, the memory module initiates the transfer of data from the first memory to the second memory. In alternative aspects, the memory module transmits a communication to a processor connected to the hardware-based processing node, wherein the communication includes a notification that data has been transferred to the second memory. In alternative aspects, a data of the subset of data is eligible to be transferred between the first memory and the second memory based on a determination that the data will be referenced within a certain predetermined period of time. In alternative aspects, dynamically determining which of the subset of data will be transferred to the second memory includes using metadata stored in the memory module, wherein the metadata is associated with the data. In alternative aspects, the first memory is a non-volatile, persistent memory and the second memory is a volatile, non-persistent memory. In alternative aspects, the first memory is a flash memory and the second memory is a dynamic random-access memory (DRAM). In alternative aspects, the hardware-based processing node further comprises a processor, and wherein the memory module maps an object of the one or more memory objects from the object memory fabric into a virtual address space, and wherein a processor maps the object from the virtual address space into physical memory of the processor. In alternative aspects, the memory module is an accelerator module storing the one or more memory objects, wherein the accelerator module performs a set of predefined management functions on the one or more memory objects. In alternative aspects, the set of predefined management functions of the accelerator module replace storage management and networking software in the node.

DETAILED DESCRIPTION OF THE INVENTION

Figure 1:
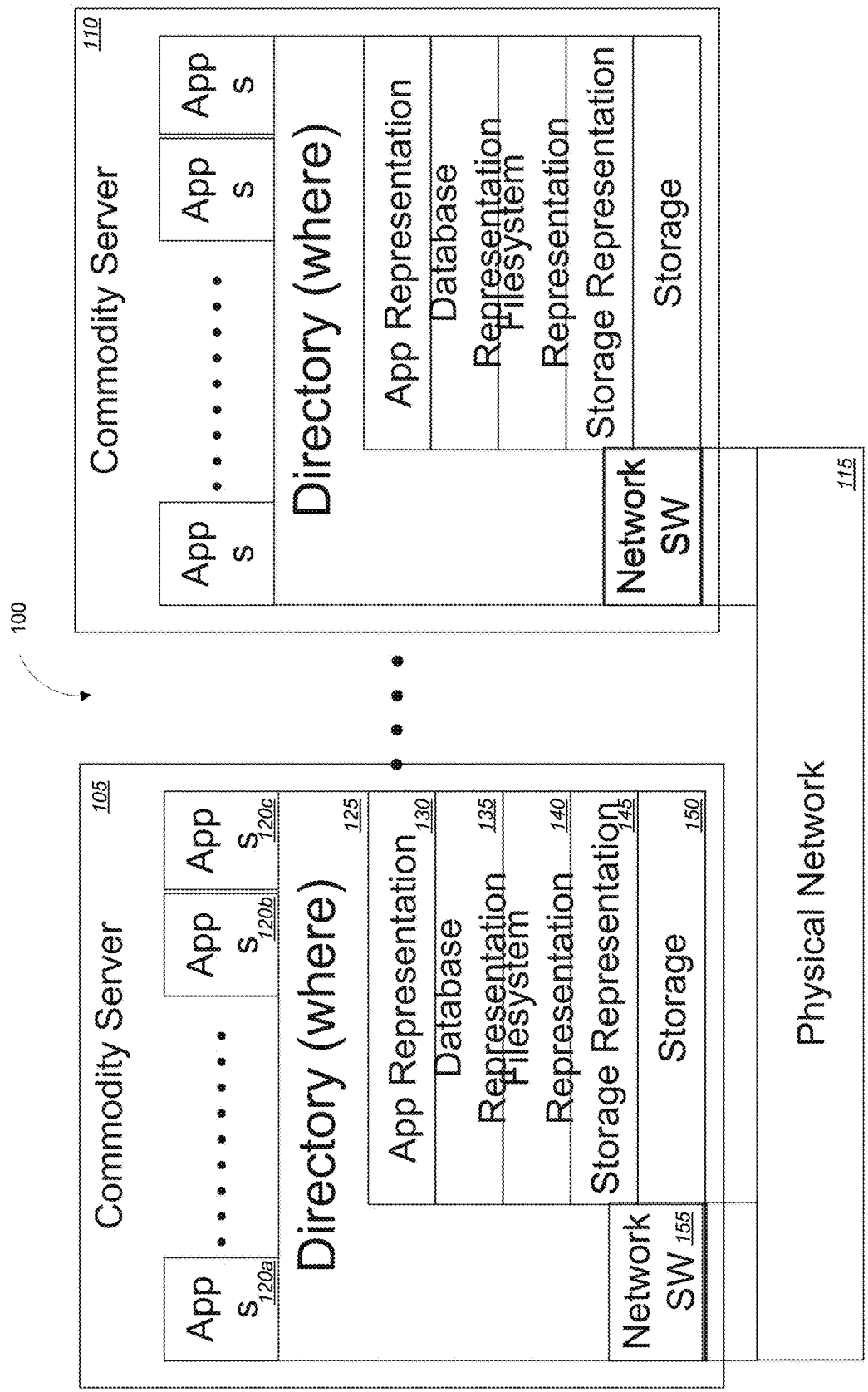
FIG. 1 is a block diagram illustrating an example of the separation data storage, memory, processing, network, and cloud computing within prior art commodity servers and network components.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. Various other terms used herein are now defined for the sake of clarity.

Virtual memory is a memory management technique that gives the illusion to each software process that memory is as large as the virtual address space. The operating system in conjunction with differing degrees of hardware manages the physical memory as a cache of the virtual address space, which is placed in secondary storage and accessible through Input/Output instructions. Virtual memory is separate from, but can interact with, a file system.

A single level store is an extension of virtual memory in which there are no files, only persistent objects or segments which are mapped into a processes' address space using virtual memory techniques. The entire storage of the computing system is thought of as a segment and address within a segment. Thus at least three separate address spaces, i.e., physical memory address/node, virtual address/process, and secondary storage address/disk, are managed by software.

Object storage refers to the way units of storage called objects are organized. Every object consists of a container that holds three things: actual data; expandable metadata; and a globally unique identifier referred to herein as the object address. The metadata of the object is used to define contextual information about the data and how it should be used and managed including relationship to other objects.

The object address space is managed by software over storage devices, nodes, and network to find an object without knowing its physical location. Object storage is separate from virtual memory and single level store, but can certainly inter-operate through software.

Block storage consists of evenly sized blocks of data with an address based on a physical location and without metadata.

A network address is a physical address of a node within an IP network that is associated with a physical location.

A node or processing node is a physical unit of computing delineated by a shared physical memory that be addressed by any processor within the node.

Object memory is an object store directly accessible as memory by processor memory reference instructions and without implicit or explicit software or Input/Output instructions required. Object capabilities are directly provided within the object memory to processing through memory reference instructions.

An object memory fabric connects object memory modules and nodes into a single object memory where any object is local to any object memory module by direct management, in hardware, of object data, meta-data and object address.

An object router routes objects or portions of objects in an object memory fabric based on an object address. This is distinct from a conventional router which forwards data packets to appropriate part of a network based on a network address.

Embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for managing processing, memory, storage, network, and cloud computing to significantly improve the efficiency and performance of processing nodes. Embodiments described herein can be implemented in a set of hardware components that, in essence, change the way in which processing, memory, and storage, network, and cloud computing are managed by breaking down the artificial distinctions between processing, memory, storage and networking in today's commodity solutions to significantly improve the efficiency and performance of commodity hardware. For example, the hardware elements can include a standard format memory module, such as a (DIMM) and a set of one or more object routers. The memory module can be added to commodity or "off-the-shelf" hardware such a server node and acts as a big data accelerator within that node. Object routers can be used to interconnect two or more servers or other nodes adapted with the memory modules and help to manage processing, memory, and storage across these different servers. Nodes can be physically close or far apart. Together, these hardware components can be used with commodity servers or other types of computing nodes in any combination to implement the embodiments described herein.

According to one embodiment, such hardware components can implement an object-based memory which manages the objects within the memory and at the memory layer rather than in the application layer. That is, the objects and associated properties are implemented and managed natively in memory enabling the object memory system to provide increased functionality without any software and increasing performance by dynamically managing object characteristics including, but not limited to persistence, location and processing. Object properties can also propagate up to higher application levels.

Such hardware components can also eliminate the distinction between memory (temporary) and storage (persistent) by implementing and managing both within the objects. These components can eliminate the distinction between local and remote memory by transparently managing the location of objects (or portions of objects) so all objects appear simultaneously local to all nodes. These components can also eliminate the distinction between processing and memory through methods of the objects to place the processing within the memory itself.

According to one embodiment, such hardware components can eliminate typical size constraints on memory space of the commodity servers imposed by address sizes. Rather, physical addressing can be managed within the memory objects themselves and the objects can in turn be accessed and managed through the object name space.

Embodiment described herein can provide transparent and dynamic performance acceleration, especially with big data or other memory intensive applications by reducing or eliminating overhead typically associated with memory management, storage management, networking and data directories. Rather, management of the memory objects at the memory level can significantly shorten the pathways between storage and memory and between memory and processing, thereby eliminating the associated overhead between each. Various additional details of embodiments of the present invention will be described below with reference to the figures.

Figure 2:
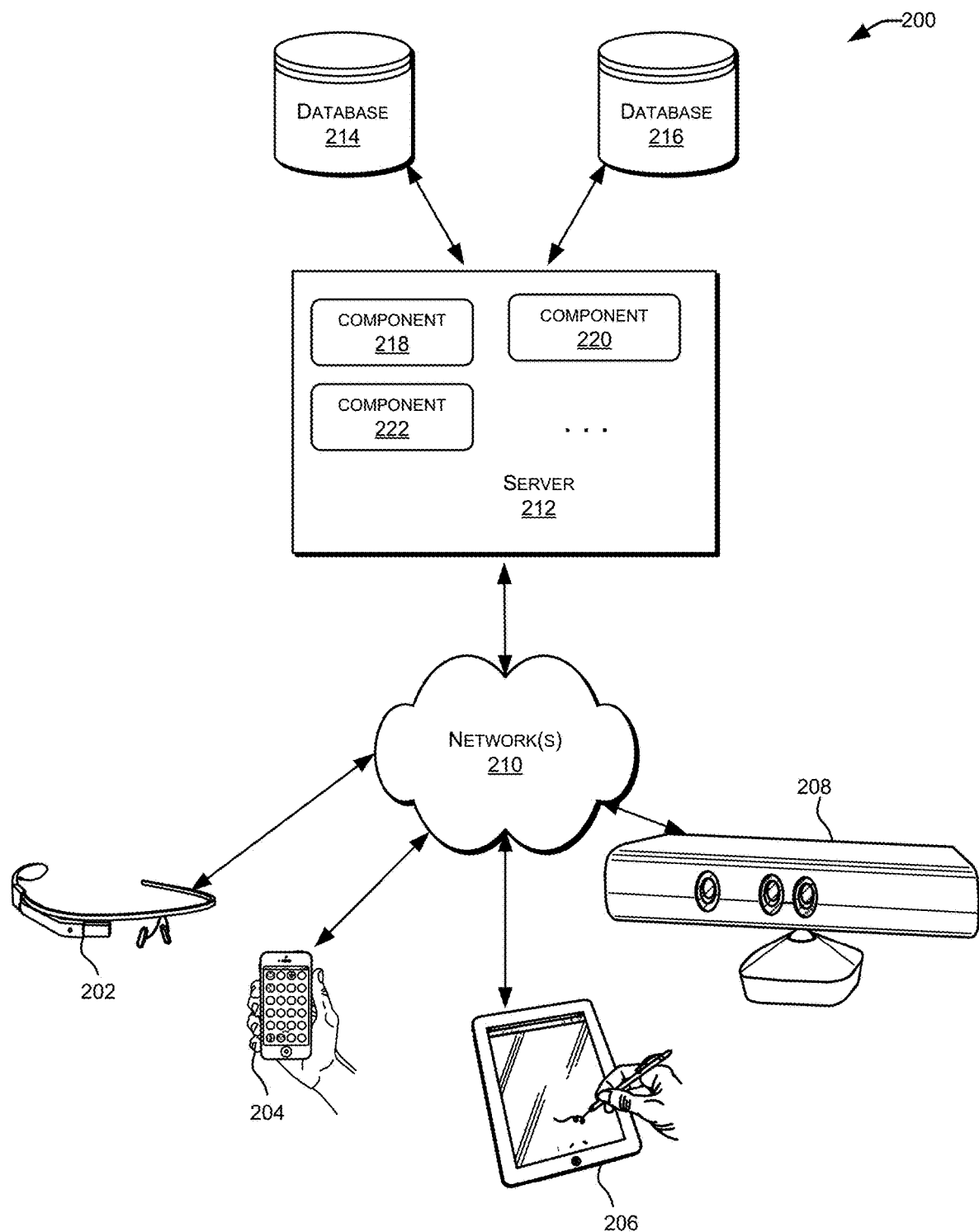
FIG. 2 is a block diagram illustrating components of an exemplary distributed system in which various embodiments of the present invention may be implemented.

FIG. 2 is a block diagram illustrating components of an exemplary distributed system in which various embodiments of the present invention may be implemented. In the illustrated embodiment, distributed system 200 includes one or more client computing devices 202, 204, 206, and 208, which are configured to execute and operate a client application such as a web browser, proprietary client, or the like over one or more network(s) 210. Server 212 may be communicatively coupled with remote client computing devices 202, 204, 206, and 208 via network 210.

In various embodiments, server 212 may be adapted to run one or more services or software applications provided by one or more of the components of the system. In some embodiments, these services may be offered as web-based or cloud services or under a Software as a Service (SaaS) model to the users of client computing devices 202, 204, 206, and/or 208. Users operating client computing devices 202, 204, 206, and/or 208 may in turn utilize one or more client applications to interact with server 212 to utilize the services provided by these components. For the sake of clarity, it should be noted that server 212 and database 214, 216 can correspond to server 105 described above with reference to FIG. 1. Network 210 can be part of or an extension to physical network 115. It should also be understood that there can be any number of client computing devices 202, 204, 206, 208 and servers 212, each with one or more databases 214, 216.

In the configuration depicted in the figure, the software components 218, 220 and 222 of system 200 are shown as being implemented on server 212. In other embodiments, one or more of the components of system 200 and/or the services provided by these components may also be implemented by one or more of the client computing devices 202, 204, 206, and/or 208. Users operating the client computing devices may then utilize one or more client applications to use the services provided by these components. These components may be implemented in hardware, firmware, software, or combinations thereof. It should be appreciated that various different system configurations are possible, which may be different from distributed system 200. The embodiment shown in the figure is thus one example of a distributed system for implementing an embodiment system and is not intended to be limiting.

Client computing devices 202, 204, 206, and/or 208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 202, 204, 206, and 208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 210.

Although exemplary distributed system 200 is shown with four client computing devices, any number of client computing devices may be supported. Other devices, such as devices with sensors, etc., may interact with server 212.

Network(s) 210 in distributed system 200 may be any type of network familiar to those skilled in the art that can support data communications using any of a variety of commercially-available protocols, including without limitation TCP/IP (Transmission Control Protocol/Internet Protocol), SNA (Systems Network Architecture), IPX (Internet Packet Exchange), AppleTalk, and the like. Merely by way of example, network(s) 210 can be a Local Area Network (LAN), such as one based on Ethernet, Token-Ring and/or the like. Network(s) 210 can be a wide-area network and the Internet. It can include a virtual network, including without limitation a Virtual Private Network (VPN), an intranet, an extranet, a Public Switched Telephone Network (PSTN), an infra-red network, a wireless network (e.g., a network operating under any of the Institute of Electrical and Electronics Engineers (IEEE) 802.11 suite of protocols, Bluetooth®, and/or any other wireless protocol); and/or any combination of these and/or other networks. Elements of such networks can have an arbitrary distance, i.e., can be remote or co-located. Software Defined Networks (SDNs) can be implemented with a combination of dumb routers and software running on servers.

Server 212 may be composed of one or more general purpose computers, specialized server computers (including, by way of example, Personal Computer (PC) servers, UNIX® servers, mid-range servers, mainframe computers, rack-mounted servers, etc.), server farms, server clusters, or any other appropriate arrangement and/or combination. In various embodiments, server 212 may be adapted to run one or more services or software applications described in the foregoing disclosure. For example, server 212 may correspond to a server for performing processing described above according to an embodiment of the present disclosure.

Server 212 may run an operating system including any of those discussed above, as well as any commercially available server operating system. Server 212 may also run any of a variety of additional server applications and/or mid-tier applications, including HyperText Transport Protocol (HTTP) servers, File Transfer Protocol (FTP) servers, Common Gateway Interface (CGI) servers, JAVA® servers, database servers, and the like. Exemplary database servers include without limitation those commercially available from Oracle, Microsoft, Sybase, International Business Machines (IBM), and the like.

In some implementations, server 212 may include one or more applications to analyze and consolidate data feeds and/or event updates received from users of client computing devices 202, 204, 206, and 208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 212 may also include one or more applications to display the data feeds and/or real-time events via one or more display devices of client computing devices 202, 204, 206, and 208.

Distributed system 200 may also include one or more databases 214 and 216. Databases 214 and 216 may reside in a variety of locations. By way of example, one or more of databases 214 and 216 may reside on a non-transitory storage medium local to (and/or resident in) server 212. Alternatively, databases 214 and 216 may be remote from server 212 and in communication with server 212 via a network-based or dedicated connection. In one set of embodiments, databases 214 and 216 may reside in a Storage-Area Network (SAN). Similarly, any necessary files for performing the functions attributed to server 212 may be stored locally on server 212 and/or remotely, as appropriate. In one set of embodiments, databases 214 and 216 may include relational databases that are adapted to store, update, and retrieve data in response to commands, e.g., MySQL-formatted commands. Additionally or alternatively, server 212 can provide and support big data processing on unstructured data including but not limited to Hadoop processing, NoSQL databases, graph databases etc. In yet other implementations, server 212 may perform non-database types of bog data applications including but not limited to machine learning.

Figure 3:
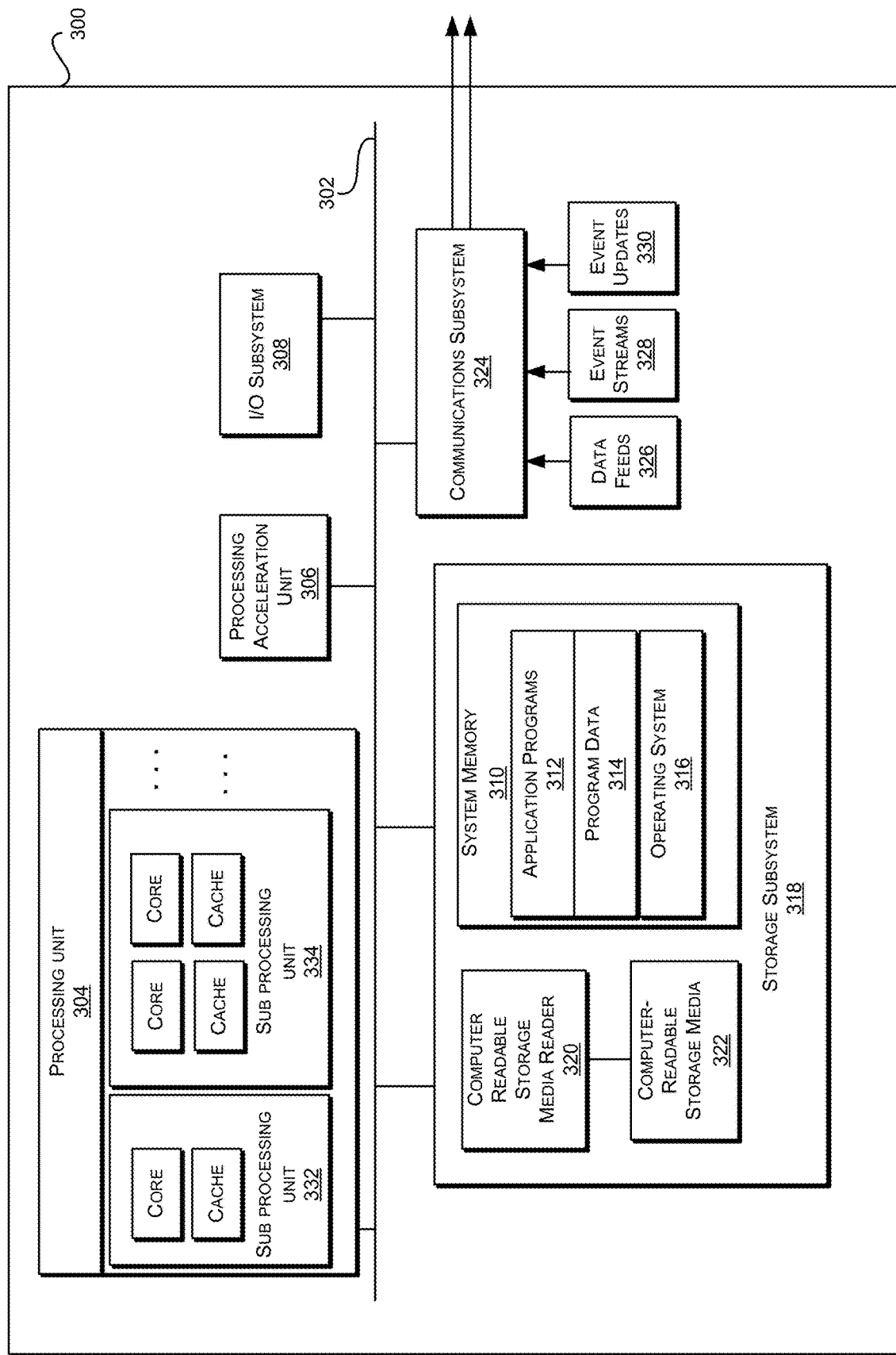
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, which can be implemented as a Mezzanine bus manufactured to the IEEE P1386.1 standard, or PCI enhanced (PCIe) bus.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a Digital Signal Processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a Cathode Ray Tube (CRT), a flat-panel device, such as that using a Liquid Crystal Display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as Random Access Memory (RAM)) and/or non-volatile (such as Read-Only Memory (ROM), flash memory, etc.) The RAM typically contains data and/or program modules that are immediately accessible to and/or presently being operated and executed by processing unit 304. In some cases, system memory 310 may comprise one or more Double Data Rate fourth generation (DDR4) Dual Inline Memory Modules (DIMMs). In some implementations, system memory 310 may include multiple different types of memory, such as Static Random Access Memory (SRAM) or Dynamic Random Access Memory (DRAM). In some implementations, a Basic Input/Output System (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, Relational Database Management Systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, Electronically Erasable Programmable ROM (EEPROM), flash memory or other memory technology, CD-ROM, Digital Versatile Disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, Universal Serial Bus (USB) flash drives, Secure Digital (SD) cards, DVD disks, digital video tape, and the like. Computer-readable storage media 322 may also include, Solid-State Drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, Magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include Radio Frequency (RF) transceiver components for accessing wireless voice and/or data networks (e.g., using cellular telephone technology, advanced data network technology, such as 3G, 4G or Enhanced Data rates for Global Evolution (EDGE), WiFi (IEEE 802.11 family standards, or other mobile communication technologies, or any combination thereof), Global Positioning System (GPS) receiver components, and/or other components. In some embodiments communications subsystem 324 can provide wired network connectivity (e.g., Ethernet) in addition to or instead of a wireless interface. In some cases, communications subsystem 324 can be implemented in whole or in part as one or more PCIe cards.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

As introduced above, embodiments of the invention provide systems and methods for managing processing, memory, storage, network, and cloud computing to significantly improve the efficiency and performance of processing nodes such as any of the servers or other computers or computing devices described above. Embodiments described herein can be implemented in a set of hardware components that, in essence, change the way in which processing, memory, storage, network, and cloud are managed by breaking down the artificial distinctions between processing, memory, storage and networking in today's commodity solutions to significantly improve the performance of commodity hardware. For example, the hardware elements can include a standard format memory module, such as a Dual Inline Memory Module (DIMM), which can be added to any of the computer systems described above. For example, the memory module can be added to commodity or "off-the-shelf" hardware such a server node and acts as a big data accelerator within that node. The components can also include one or more object routers. Object routers can include, for example, a PCI express card added to the server node along with the memory module and one or more external object routers such as rack mounted routers, for example. Object routers can be used to interconnect two or more servers or other nodes adapted with the memory modules and help to manage processing, memory, and storage across these different servers Object routers can forward objects or portions of objects based on object addresses and participate in operation of the object memory fabric. Together, these hardware components can be used with commodity servers or other types of computing nodes in any combination to implement an object memory fabric architecture.

Figure 4:
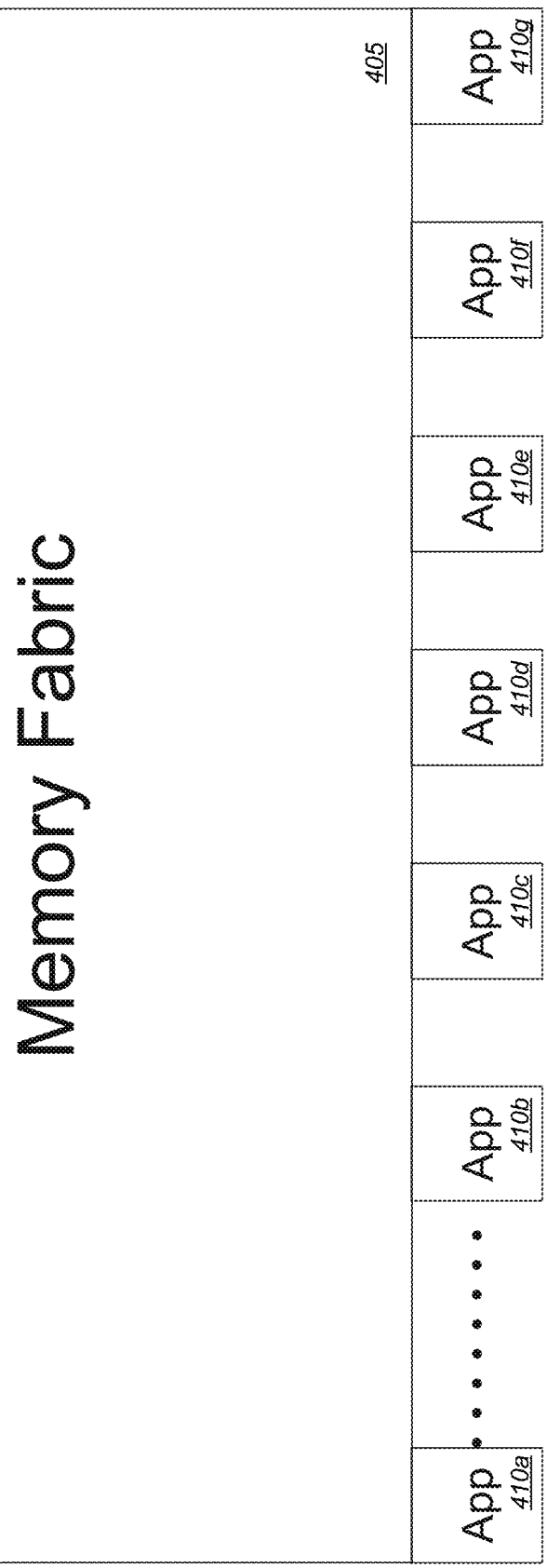
FIG. 4 is a block diagram illustrating an exemplary object memory fabric architecture according to one embodiment of the present invention.

FIG. 4 is a block diagram illustrating an exemplary object memory fabric architecture according to one embodiment of the present invention. As illustrated here, the architecture 400 comprises an object memory fabric 405 supporting any number of applications 410a-g. As will be described in greater detail below, this object memory fabric 405 can comprise any number of processing nodes such as one or more servers having installed one or more memory modules as described herein. These nodes can be interconnected by one or more internal and/or external object routers as described herein. While described as comprising one or more servers, it should be noted that the processing nodes of the object memory fabric 405 can comprise any of a variety of different computers and/or computing devices adapted to operate within the object memory fabric 405 as described herein.

According to one embodiment, the object memory fabric 405 provides an object-based memory which manages memory objects within the memory of the nodes of the object memory fabric 405 and at the memory layer rather than in the application layer. That is, the objects and associated properties can be implemented and managed natively in the nodes of the object memory fabric 405 to provide increased functionality without any software and increasing efficiency and performance by dynamically managing object characteristics including, but not limited to persistence, location and processing. Object properties can also propagate to the applications 410a-g. The memory objects of the object memory fabric 405 can be used to eliminate typical size constraints on memory space of the commodity servers or other nodes imposed by address sizes. Rather, physical addressing can be managed within the memory objects themselves and the objects can in turn be accessed and managed through the object name space. The memory objects of the object memory fabric 405 can also be used to eliminate the distinction between memory (temporary) and storage (persistent) by implementing and managing both within the objects. The object memory fabric 405 can also eliminate the distinction between local and remote memory by transparently managing the location of objects (or portions of objects) so all objects appear simultaneously local to all nodes. The memory objects can also eliminate the distinction between processing and memory through methods of the objects to place the processing within the memory itself. In other words, embodiments of the present invention provide a single-level memory that puts the computes with the storage and the storage with the computes, directly and thereby eliminating numerous levels of software overhead communicating across these levels and the artificial overhead of moving data to be processed.

In these ways, embodiments of the object memory fabric 405 and components thereof as described herein can provide transparent and dynamic performance acceleration, especially with big data or other memory intensive applications by reducing or eliminating overhead typically associated with memory management, storage management, networking, data directories, and data buffers at both the system and application software layers. Rather, management of the memory objects at the memory level can significantly shorten the pathways between storage and memory and between memory and processing, thereby eliminating the associated overhead between each.

Embodiments provide coherent, hardware-based, infinite memory managed as memory objects with performance accelerated in-memory, spanning all nodes, and scalable across all nodes. This enables transparent dynamic performance acceleration based on the object and end application. Using an architecture according to embodiments of the present invention, applications and system software can be treated the same and as simple as a single, standard server but additionally allowing memory fabric objects to capture heuristics. Embodiments provide multiple dimensions of accelerated performance including locality acceleration. According to one embodiment, object memory fabric metadata associated with the memory objects can include triggers which enable the object memory fabric architecture to localize and move data to fast dram memory ahead of use. Triggers can be a fundamental generalization that enables the memory system to execute arbitrary functions based on memory access. Various embodiments can also include an instruction set which can provide a unique instruction model for the object memory fabric based on the triggers defined in the metadata associated with each memory object and that supports core operations and optimizations and allows the memory intensive portion of applications to be more efficiently executed in a highly parallel manner within IMF.

Embodiments can also decrease software path-length by substituting a small number of memory references for a complex application, storage and network stack. This can be accomplished when memory and storage is directly addressable as memory under embodiments of the present invention. Embodiments can additionally provide accelerated performance of high level memory operations. For many cases, embodiments of the object memory fabric architecture can eliminate the need to move data to the processor and back to memory, which is extremely inefficient for today's modern processors with three or more levels of caches.

Figure 5:
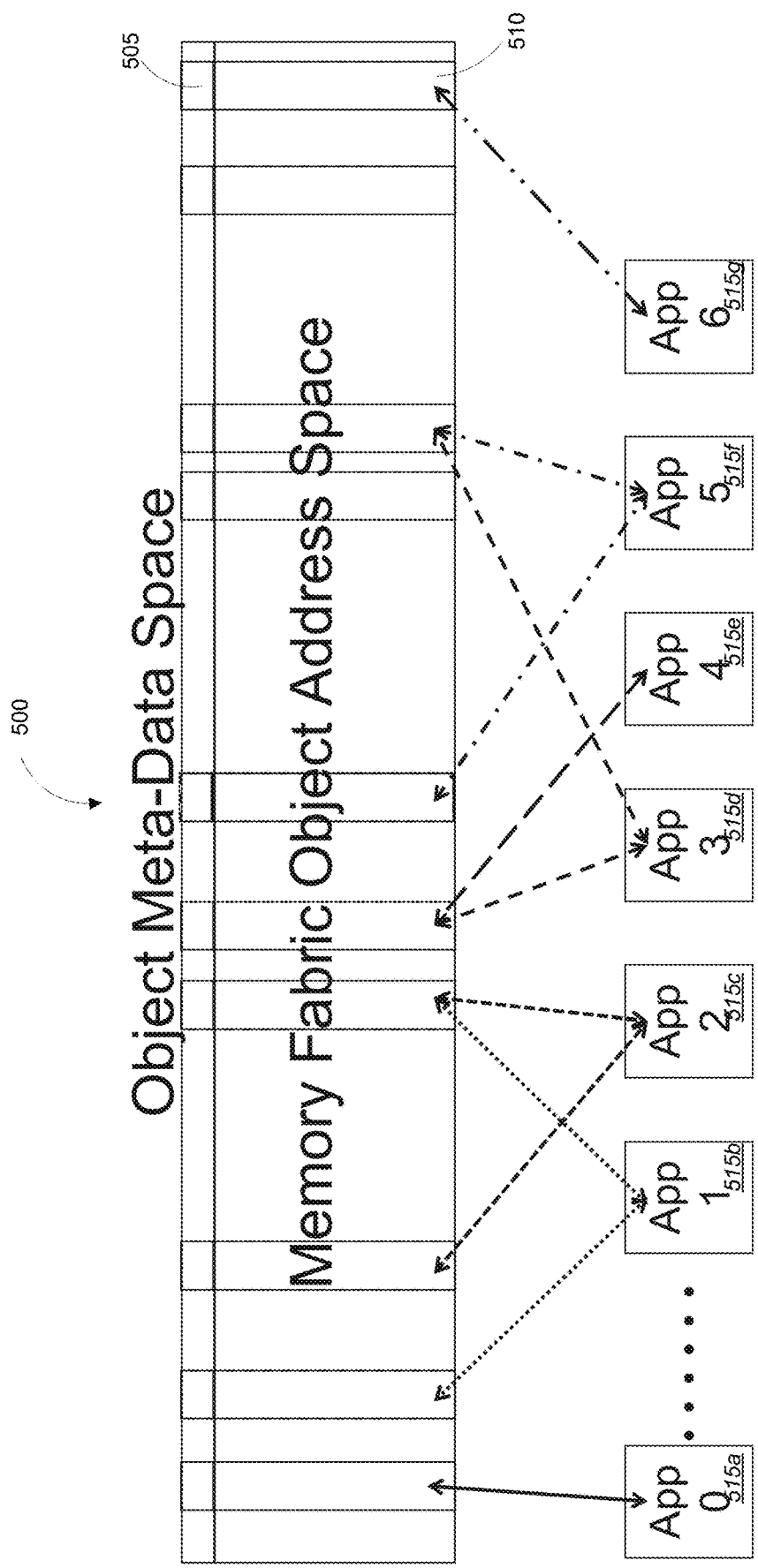
FIG. 5 is a block diagram illustrating an exemplary memory fabric object memory according to one embodiment of the present invention.

FIG. 5 is a block diagram illustrating an exemplary memory fabric object memory according to one embodiment of the present invention. More specifically, this example illustrates an application view of how memory fabric object memory can be organized. Memory fabric object address space 500 can be a 128 bit linear address space where the object ID corresponds to the start of the addressable object. Objects 510 can be variable size from 212 to 264 bytes. The address space 500 can efficiently be utilized sparsely within and across objects as object storage is allocated on a per block basis. The size of the object space 500 is meant to be large enough that garbage collection is not necessary and to enable disjoint systems to be easily combined.

Object metadata 505 associated with each object 510 can be transparent with respect to the object address space 500 and can utilize the object memory fabric to manage objects and blocks within objects and can be accessible at appropriate privilege by applications 515a-g through Application Program Interfaces (APIs) of the object memory fabric. This API provides functions for applications to set up and maintain the object memory fabric, for example by using modified Linux libc. With a small amount of additional effort applications such as a SQL database or graph database can utilize the API to create memory objects and provide and/or augment object metadata to allow the object memory fabric to better manage objects. Object metadata 505 can include object methods, which enable performance optimization through dynamic object-based processing, distribution, and parallelization. Metadata can enable each object to have a definable security policy and access encapsulation within an object.

According to embodiments of the present invention, applications 515a-g can now access a single object that captures it's working and/or persistent data (such as App0 515a) or multiple objects for finer granularity (such as App1 515b). Applications can also share objects. Object memory 500 according to these embodiments can physically achieves this powerfully simple application view with a combination of physical organization, which will be described in greater detail below with reference to FIG. 6, and object memory dynamics. Generally speaking, the object memory 500 can be organized as a distributed hierarchy that creates hierarchical neighborhoods for object storage and applications 515a-g. Object memory dynamics interact and leverage the hierarchal organization to dynamically create locals of objects and applications (object methods) that operate on objects. Since object methods can be associated with memory objects, as objects migrate and replicate on the memory fabric, object methods naturally gain increased parallelism as object size warrants. The hierarchy in conjunction with object dynamics can further create neighborhoods of neighborhoods based on the size and dynamics of the object methods.

Figure 6:
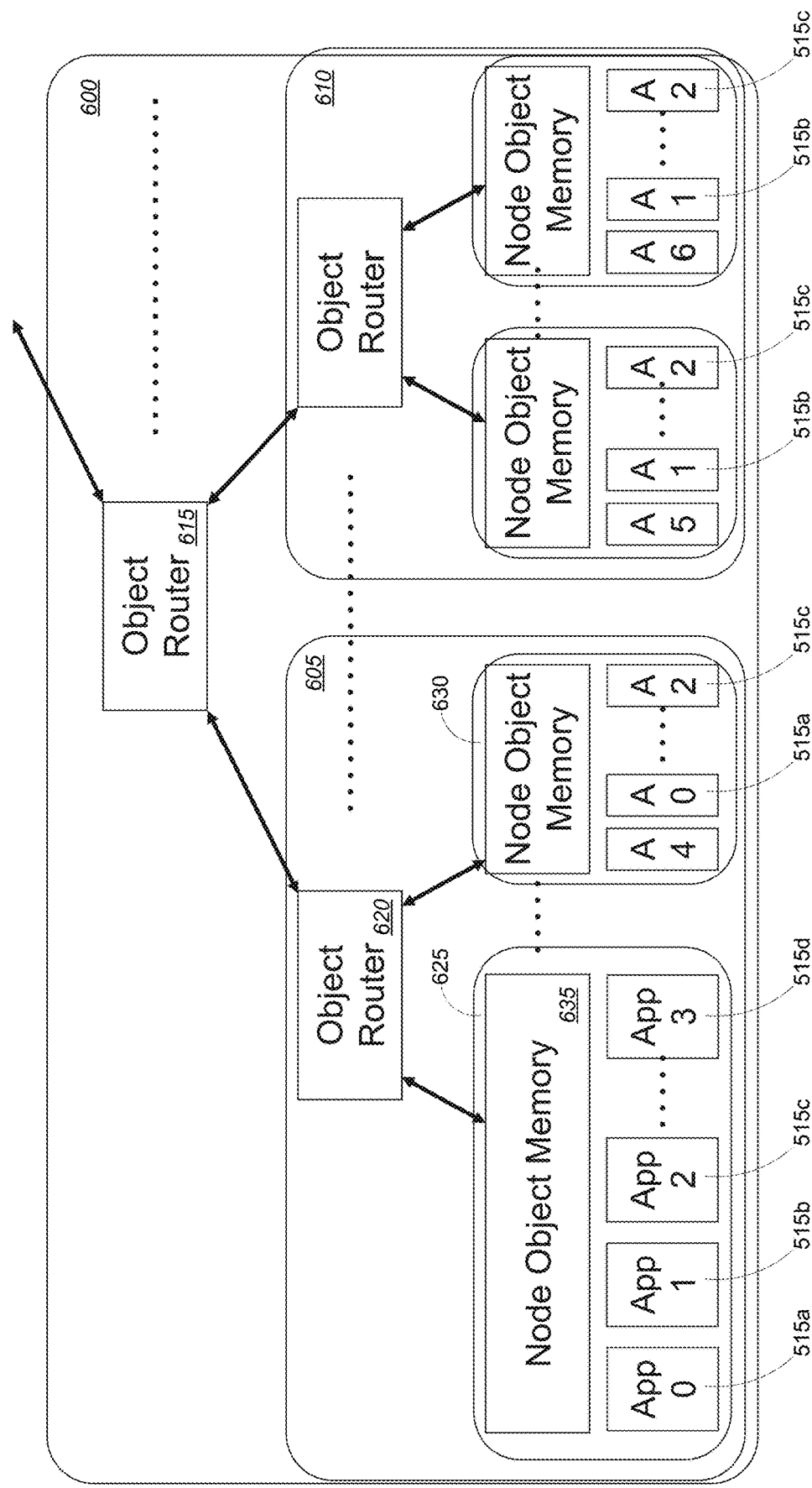
FIG. 6 is a block diagram illustrating an exemplary object memory dynamics and physical organization according to one embodiment of the present invention.

FIG. 6 is a block diagram illustrating an exemplary object memory dynamics and physical organization according to one embodiment of the present invention. As illustrated in this example, an object memory fabric 600 as described above can include any number of processing nodes 605 and 610 communicatively coupled via one or more external object routers 615. Each node 605 and 610 can also include an internal object router 620 and one or more memory modules. Each memory module 625 can include a node object memory 635 supporting any number of applications 515a-g. Generally speaking, the memory module 625, node object router 620 and inter-node object router 615 can all share a common functionality with respect to the object memory 635 and index thereof. In other words, the underlying design objects can be reused in all three providing a common design adaptable to hardware of any of a variety of different form factors and types in addition to those implementations described here by way of example.

More specifically, a node can comprise a single node object router 620 and one or more memory modules 625 and 630. According to one embodiment, a node 605 can comprise a commodity or "off-the-shelf" server, the memory module 625 can comprise a standard format memory card such as a Dual-Inline Memory Module (DIMM) card, and the node object router 620 can similarly comprise a standard format card such as a Peripheral Component Interconnect express (PCIe) card. The node object router 620 can implement an object index covering the objects/blocks held within the object memory(s) 635 of the memory modules 625 and 630 within the same node 605. Each memory module 625 and 630 can hold the actual objects and blocks within objects, corresponding object meta-data, and object index covering objects currently stored local to that memory module. Each memory module 625 and 630 can independently manage both dram memory (fast and relatively expensive) and flash memory (not as fast, but much less expensive) in a manner that the processor (not shown) of the node 605 thinks that there is the flash amount of fast dram. The memory modules 625 and 630 and the node object router 620 can both manage free storage through a free storage index implemented in the same manner as for other indexes. Memory modules 625 and 630 can be directly accessed over the standard DDR memory bus by processor caches and processor memory reference instructions. In this way, the memory objects of the memory modules 625 and 630 can be accessed using only conventional memory reference instructions and without implicit or explicit Input/Output (I/O) instructions.

Objects within the object memory 635 of each node 625 can be created and maintained through an object memory fabric API (not shown). The node object router 620 can communicate with the API through a modified object memory fabric version of libc and an object memory fabric driver (not shown). The node object router 620 can then update a local object index, send commands toward a root, i.e., towards the inter-node object router 615, as required and communicate with the appropriate memory module 625 or 630 to complete the API command locally. The memory module 625 or 630 can communicate administrative requests back to the node object router 620 which can handle them appropriately.

According to one embodiment, the internal architecture of the node object router 620 can be very similar to the memory module 625 with the differences related to routing functionality such as managing a node memory object index and routing appropriate packets to and from the memory modules 625 and 630 and the inter-node object router 615. That is, the node object router 620 can have additional routing functionality but does not need to actually store memory objects.

The inter-node object router 615 can be considered analogous to an IP router. However, the first difference is the addressing model used. IP routers utilize a fixed static address per each node and routes based on the destination IP address to a fixed physical node. However, the inter-node object router 615 of the object memory fabric 600 utilizes a memory fabric object address (OA) which specifies the object and specific block of the object. Objects and blocks can dynamically reside at any node. The inter-node object router 615 can route OA packages based on the dynamic location(s) of objects and blocks and track object/block location dynamically in real time. The second difference is that the object router can implement the object memory fabric distributed protocol which provides the dynamic nature of object/block location and object functions, for example including, but not limited, to triggers. The inter-node object router 615 can be implemented as a scaled up version of node object router 620 with increased object index storage capacity, processing rate and overall routing bandwidth. Also, instead of connecting to a single PCIe or other bus or channel to connect to memory modules, inter-node object router 615 can connect to multiple node object routers and/or multiple other inter-node object routers. According to one embodiment, a node object router 620 can communicate with the memory modules 625 and 630 with direct memory access over PCIe and the memory bus (not shown) of the node 605. Node object routers of different nodes 605 and 610 can in turn connect with one or more inter-node object routers 615 over a high-speed network (not shown) such as 25/100GE fiber that uses several layers of Gigabit Ethernet protocol or object memory fabric protocol tunneled through standard IP, for example. Multiple inter-node object routers can connect with the same network.

In operation, the memory fabric object memory can physically achieve its powerfully simple application view described above with reference to FIGS. 4 and 5 with a combination of physical organization and object memory dynamics. According to one embodiment and as introduced above with reference to FIG. 5, the memory fabric object memory can be organized as a distributed hierarchy that creates hierarchical neighborhoods for object storage and applications 515*a-g*. The node object routers can keep track of which objects and portions of objects are local to a neighborhood. The actual object memory can be located on nodes 605 or 610 close to applications 515*a-g* and memory fabric object methods.

Also as introduced above, object memory dynamics can interact and leverage the hierarchal organization to dynamically create locals of objects and applications (object methods) that operate on objects. Since object methods can be associated with objects as objects migrate and replicate across nodes, object methods naturally gain increased parallelism as object size warrants. This object hierarchy, in conjunction with object dynamics, can in turn create neighborhoods of neighborhoods based on the size and dynamics of the object methods.

For example, App0 515*a* spans multiple memory modules 625 and 630 within a single level object memory fabric neighborhood, in this case node 605. Object movement can stay within that neighborhood and its node object router 620 without requiring any other communication links or routers. The self-organizing nature along the hierarchy defined neighborhoods provides efficiency from a performance and minimum bandwidth perspective. In another example, App1 (A1) 515*b* can have the same characteristic but in a different neighborhood, i.e., in node 610. App2 (A2) 515*c* can be a parallel application across a two-level hierarchy neighborhood, i.e., nodes 605 and 610. Interactions can be self-contained in the respective neighborhood.

As noted above, certain embodiments may include a data types and metadata architecture certain embodiments can also include a data types and metadata architecture that facilitate multiple advantages of the present invention. With respect to the architecture, the following description discloses various aspects of: object memory fabric address spaces; an object memory fabric coherent object address space; an object memory fabric distributed object memory and index; an object memory fabric index; object memory fabric objects; and an extended instruction execution model. Various embodiments may include any one or combination of such aspects.

Figure 7:
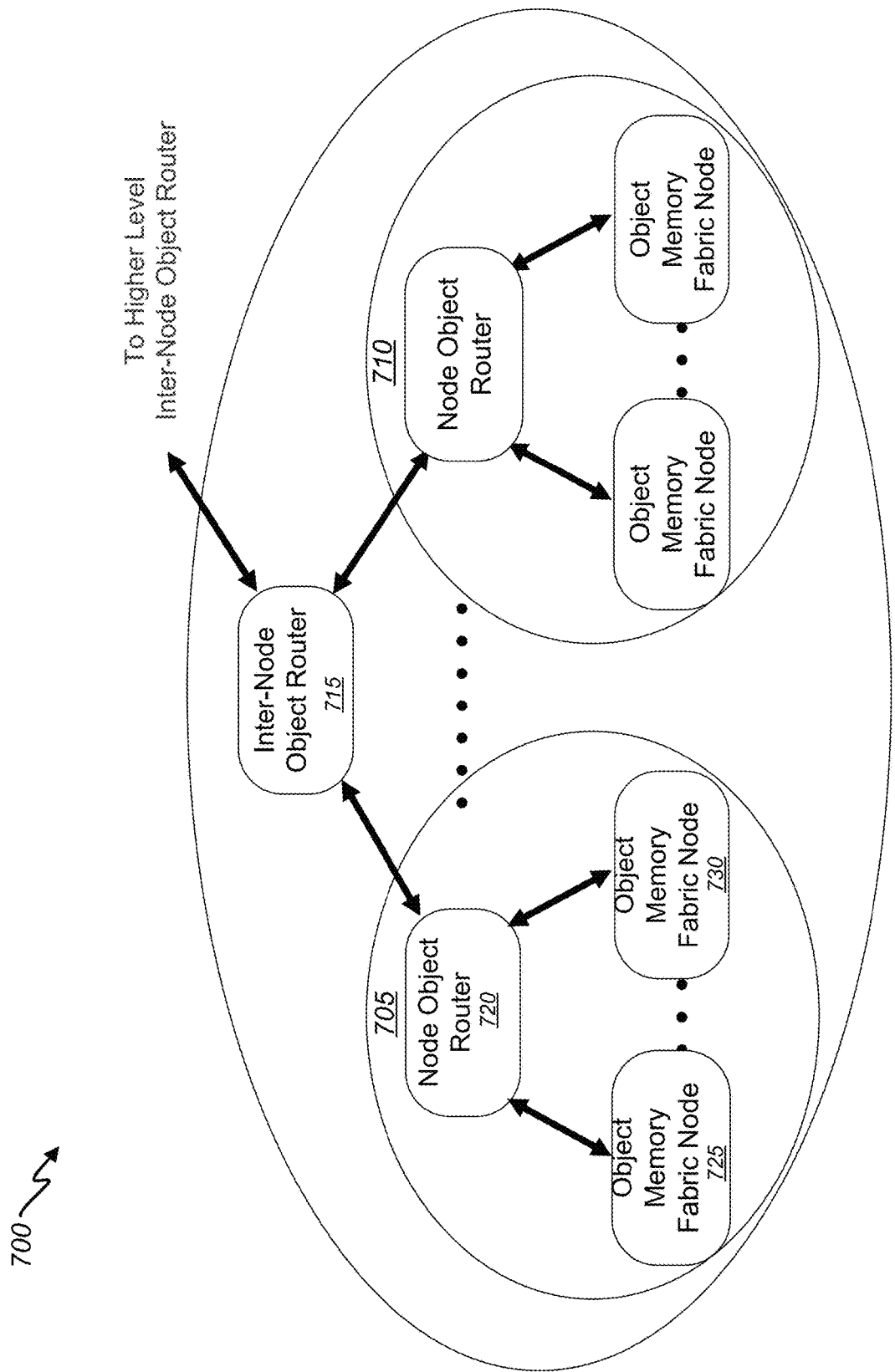
FIG. 7 is a block diagram illustrating aspects of object memory fabric hierarchy of object memory, which localizes working sets and allows for virtually unlimited scalability, according to one embodiment of the present invention.

FIG. 7 is a block diagram illustrating an aspect of object memory fabric hierarchy of object memory, which localizes working sets and allows for virtually unlimited scalability, according to one embodiment of the present invention. As disclosed herein, certain embodiments may include core organization and data types that enable the object memory fabric to dynamically operate to provide the object memory application view. The core organization and data types facilitate the fractal-like characteristics of the system which allow the system to behave identically in a scale-independent fashion. In the depicted example, an object memory fabric 700 as disclosed herein can include any number of processing nodes 705 and 710 communicatively coupled at higher levels via one or more external object routers, such as object router 715, which may in turn be coupled to one or more higher level object routers.

Specifically, the system may be a fat-tree built from nodes, from leaf nodes to root node(s). According to certain embodiments, each node may just understand whether its scope encompasses an object and based on that whether to route a request/response toward the root or leaf. Putting these nodes together enables a system to dynamically scale to any capacity, without impacting the operation or perspective of any node. In some embodiments, the leaf node may be a DIMM built from standard memory chips, plus object memory fabric 700 implemented within an FPGA. In some embodiments, standard memory chips could have object memory fabric 700 imbedded. In various embodiments, implementations may have remote nodes such as mobile phones, drones, cars, internet of things components, and/or the like.

To facilitate various advantageous properties of object memory fabric 700, certain embodiments may employ coherent object memory fabric address spaces. Table 1 below identifies non-limiting examples of various aspects of address spaces, in accordance with certain embodiments of the present disclosure. All nodes that are connected to a single object memory fabric 700, local or distributed, can be considered part of a single system environment according to certain embodiments. As indicated in Table 1, object memory fabric 700 can provide a coherent object address space. In some embodiments, a 128-bit object address space may be provided. However, other embodiments are possible. There are several reasons for a large object address space, including the following. The object address space is to directly uniquely address and manage all memory, storage across all nodes within an object memory fabric system, and provide a unique address for conventional storage outside of an object memory fabric system. The object address space can allow an address to be used once and never garbage collect, which is a major efficiency. The object address space can allow a distinction between allocating address space and allocating storage. In other words, the object address space can be used sparsely as an effective technique for simplicity, performance, and flexibility.

As further indicated in Table 1, the object memory fabric 700 can directly support per-process virtual address spaces and physical address spaces. With some embodiments, the per-process virtual address spaces and physical address spaces may be compatible with x86-64 architecture. In certain embodiments, the span of a single virtual address space may be within a single instance of Linux OS, and may be usually coincident with a single node. The object memory fabric 700 may enable the same virtual address space to span more than a single node. The physical address space may be the actual physical memory addressing (e.g., within an x86-64 node in some embodiments).

TABLE 1

Address Spaces

| Parameter | Object memory fabric Object Address Space | Virtual Address | Physical Address |
|---|---|---|---|
| Description | Object memory fabric address | Process address handle to object memory fabric address | Cache of object memory fabric |
| Scope | Global | Per process, can be shared | Per node |
| Size | $2^{128}$ | $2^{64}$ ($2^{48}$ Haswell) | $2^{46}$ (Haswell) |
| Object Support | Yes, object memory fabric object index tree and per object index tree | Yes, page tables | Yes, object memory fabric metadata |
| Object Sizes | $2^{\{12\ |21\ |30\ |39\ |48\ |}$ | | |
| Address Space Allocation | Sparse-with or without storage, object units | Sparse-with or without storage, object units | Sparse-page |
| Storage Allocation | Object or block (page) | Based on object memory fabric | Page |
| Security (Access) | Through virtual address, operating system, and file system | Operating system | Operating system/ object memory fabric |

Figure 8:
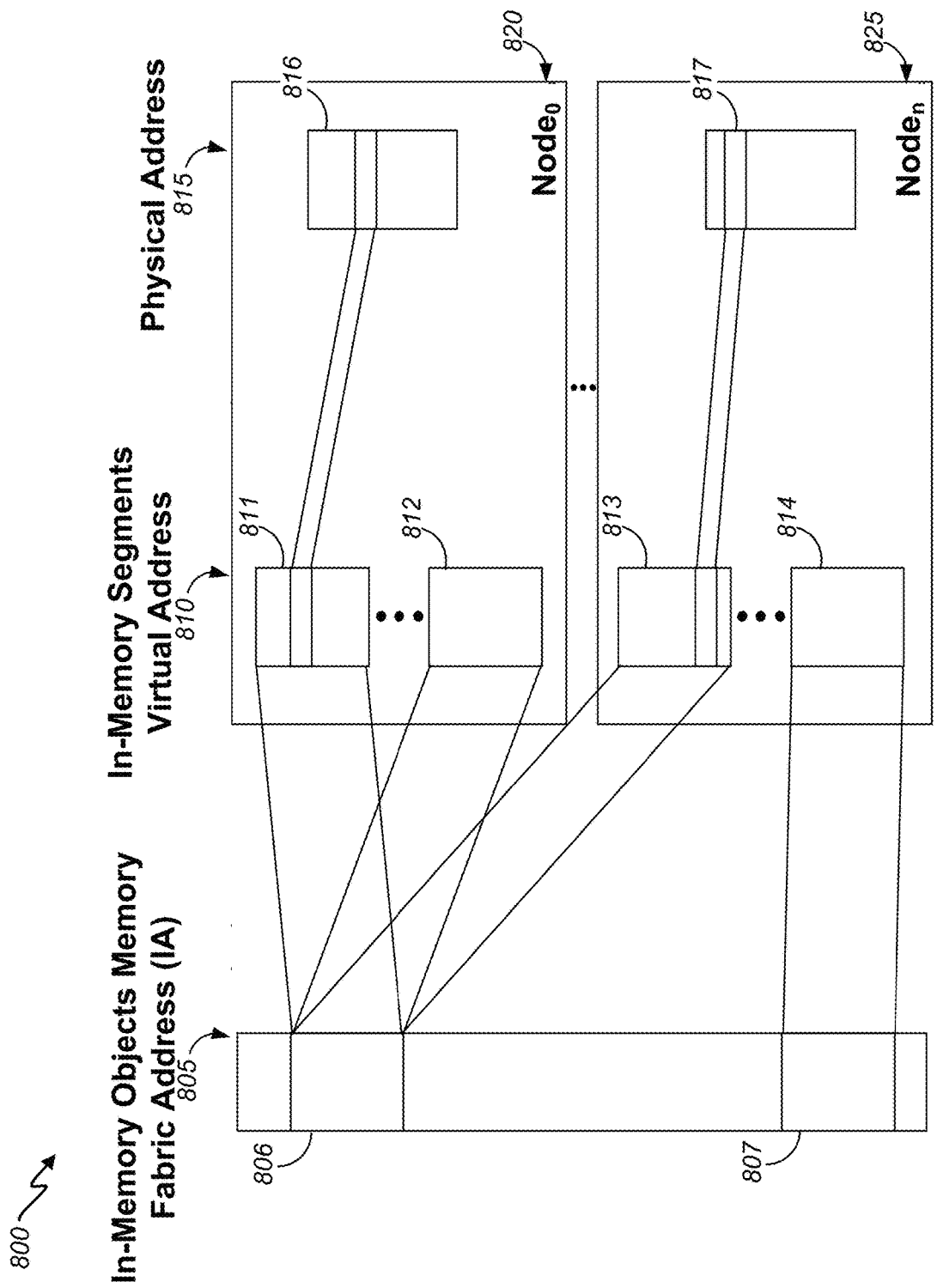
FIG. 8 is a block diagram illustrating aspects of an example relationship between object address space, virtual address, and physical address, according to one embodiment of the present invention.

FIG. 8 is a block diagram illustrating an example relationship 800 between object address space 805, virtual addresses 810, and physical addresses 815, in accordance with certain embodiments of the present disclosure. With object address space 805, a single object can range in size. By way of example without limitation, a single object can range in size from 2 megabytes ($2^{21}$) to 16 petabytes ($2^{64}$). Other ranges are possible. Within the object memory fabric 700, object address space 805 may be allocated on an object granularity basis in some embodiments. In some embodiments, storage may be allocated on a 4 k byte block basis (e.g., blocks 806, 807). Thus, the object address space block 806, 807 in some embodiments may correspond to the 4 k byte page size within x86-64 architecture. When the object address space 805 is created, only the address space and object metadata may exist. When storage is allocated on a per block basis, there can be data stored in the corresponding block of the object. Block storage can be allocated in a sparse or non-sparse manner and pre and/or demand allocated. For example, in some embodiments, software can use an object as a hash function and only allocate physical storage for the valid hashes.

Referring to the example of FIG. 8, within a node 820, 825, which could be a conventional server in some embodiments, physical pages corresponding to physical addresses 815 may be allocated on a dynamic basis corresponding to the virtual addresses 810. Since object memory fabric 700 actually provides the physical memory within a node 820, 825 by way of the object memory fabric DIMM, when a virtual address segment 811, 812, 813, 814 is allocated, an object address space 805 object which corresponds to the particular segment 811, 812, 813, 814 can also be created. This enables the same or a different virtual address 810 across nodes 820, 825 to address and access the same object. The actual physical address 815 at which a block/page within an object resides within a node 820, 825 can vary over time within or across nodes 820, 825, transparently to application software.

Certain embodiments of the object memory fabric 700 may provide key advantages: embodiments of object memory fabric 700 may provide integrated addressing, objects with transparent invariant pointers (no swizzling required), and methods to access a large address space across nodes—a with certain embodiments being compatible with x84-64, Linux, and applications. Normally, systems have numerous different addresses (e.g., for memory address with separate address space, sectors, cylinders, physical disks, database systems, file systems, etc.), which requires significant software overhead for converting, buffering, and moving objects and blocks between different layers of addresses. Using integrated addressing to address objects, and blocks within objects, and using the object namespace eliminates layers of software by having single-level addressing invariant across all nodes/systems. With a sufficiently large address space, one address system is not invariant with particular database application and all these systems working together.

Thus, a node may include a memory module may store and manage one or more memory objects, where physical address of memory and storage is managed with each of the one or more memory objects based at least in part on an object address space that is allocated on a per-object basis with a single-level object addressing scheme. The node may be configured to utilize the object addressing scheme to operatively couple to one or more additional nodes to operate as a set of nodes of an object memory fabric, where the set of nodes operates so that all memory objects of the set of nodes are accessible based at least in part on the object addressing scheme, the object addressing scheme defining invariant object addresses for the one or more memory objects that are invariant with respect to physical memory storage locations and storage location changes of the one or more memory objects within the memory module and across all modules interfacing the object memory fabric. Accordingly, the object addresses are invariant within a module and across all modules that interface to object memory fabric, regardless of whether the objects are in a single server or not. Even though the objects can be stored on any or all modules, the object addresses are still invariant no matter at which physical memory locations the objects are currently or will be stored. The following provides details of certain embodiments that may provide such advantages through the object address space and object address space pointers.

Figure 9:
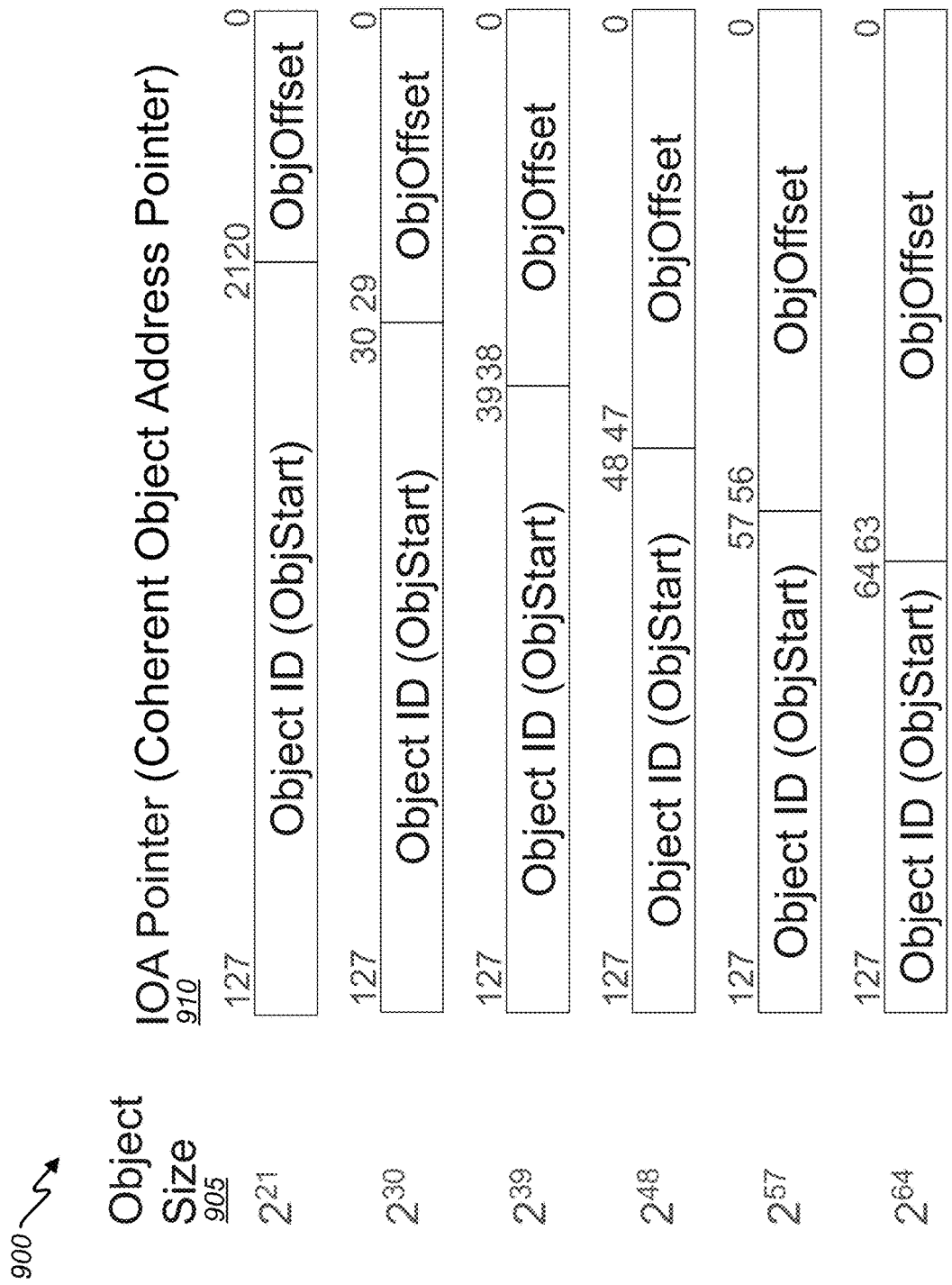
FIG. 9 is a block diagram illustrating aspects of an example relationship between object sizes and object address space pointers, according to one embodiment of the present invention.

Certain embodiments of object memory fabric 700 may support multiple, various pointer formats. FIG. 9 is a block diagram illustrating an example relationship 900 between object sizes 905 and object address space pointers 910, in accordance with certain embodiments of the present disclosure. Table 2 below identifies non-limiting examples of aspects of the object address space pointer 910, in accordance with certain embodiments of the present disclosure. As indicated by Table 2, some example embodiments can support three pointer formats. The object address space format may be an object memory fabric native 128 bit format and can provide a single pointer with full addressability for any object and offset within object. Object memory fabric 700 can support additional formats, for example, two additional formats in 64 bit format to enable direct compatibility with x86-64 virtual memory and virtual address. Once a relationship between an object memory fabric object and a virtual address segment is established by object memory fabric API (which can be handled transparently to the application in Linux libc, in some embodiments), standard x86 Linux programs can directly reference data within an object (x86 segment) efficiently and transparently utilizing the x86-64 addressing mechanisms.

TABLE 2

Object Address Space Pointer Formats

| Pointer Type | Object memory fabric Pointer | Object Address Space Generation | Transformation to Virtual Address | Virtual Address Format |
|---|---|---|---|---|
| Object memory fabric Address | 128 bit Storage | Direct | None | None |
| Object Relative | Offset (64 bit) | ObjStart + ObjOffset | None | virtual address base + offset address mode |
| Object Virtual Address | Offset (64 bit) | ObjStart + ObjOffset | Add virtual address base to offset | 48 bit virtual address with 64 bit data type |

Table 3 below identifies non-limiting examples of aspects of the object address space pointers in relation to object sizes, in accordance with certain embodiments of the present disclosure. Embodiments of object address space can supports multiple segment sizes, for example, six segment sizes from 221 to 264 as illustrated in Table 3 below. The object sizes correspond to the x86-64 virtual memory segment and large page sizes. Objects can start on a modulo 0 object size boundary. Object address space pointers 910 may be broken into Obj Start and Obj Offset fields, the sizes of which are dependent on the object size as shown in the example below. The Obj Start field corresponds to the object address space start of the object and also the ObjectID. The Obj Offset is an unsigned value in a range from zero to (ObjectSize−1) with specifies the offset within an object. Object metadata can specify the object size and object memory fabric interpretation of the object address space pointer 910. Objects of arbitrary size and sparseness can be specified by only allocating storage for blocks of interest within an object.

Because of the nature of most applications and object nature of object memory fabric 700, most addressing can be relative to an object. In some embodiments, all the object memory fabric address pointer formats can be natively stored and loaded by the processor. Object Relative and Object Virtual Address can work directly with x86-64 addressing modes in some embodiments. Object Virtual Address pointer can be or include a process virtual address that works within the x86-64 segment and corresponding object memory fabric object. Object memory fabric object address space can be calculated by using the Object Virtual Address as an object offset. Object Relative pointer can be or include an offset into an x86-64 virtual address segment, thus base plus index addressing mode works perfectly. Object memory fabric object address space can be calculated by using the Object Relative as an object offset. Table 3 below identifies non-limiting examples of details of generating a 128 bit object address space from an Object Virtual Address or Object Relative pointer as a function of object size, in accordance with certain embodiments of the present disclosure.

TABLE 3

Object Address Space Generation

| Object Size | Object Address Space Generation from Object Relative and Object Virtual Address Pointers |
|---|---|
| $2^{21}$ | IA[127:00]=(ObjBase[127:21],zero[20:0]) + (zero[127:21],ObjOffset[20,0]) |
| $2^{30}$ | IA[127:00]=(ObjBase[127:30],zero[29:0]) + (zero[127:30],ObjOffset[29,0]) |
| $2^{39}$ | IA[127:00]=(ObjBase[127:39],zero[38:0]) + (zero[127:39],ObjOffset[38,0]) |
| $2^{48}$ | IA[127:00]=(ObjBase[127:48],zero[47:0]) + (zero[127:48],ObjOffset[47,0]) |
| $2^{57}$ | IA[127:00]=(ObjBase[127:57],zero[56:0]) + (zero[127:57],ObjOffset[56,0]) |
| $2^{64}$ | IA[127:00]=(ObjBase[127:21],zero[20:0]) + (zero[127:21],ObjOffset[20,0]) |

As disclosed herein, certain embodiments may include an object memory fabric distributed object memory and index. With the distributed index, individual nodes may index local objects and blocks of objects on a per-object basis. Certain embodiments of object memory fabric distributed object memory and index may be based at least in part on an intersection concept of cellular automata and fat trees. Prior distributed hardware and software systems with real-time dynamic indices used two approaches: a centralized index or a distributed single conceptual index. Embodiments of object memory fabric may use a new approach which overlays an independent local index function on top of a fat-tree hierarchical network.

Figure 10:
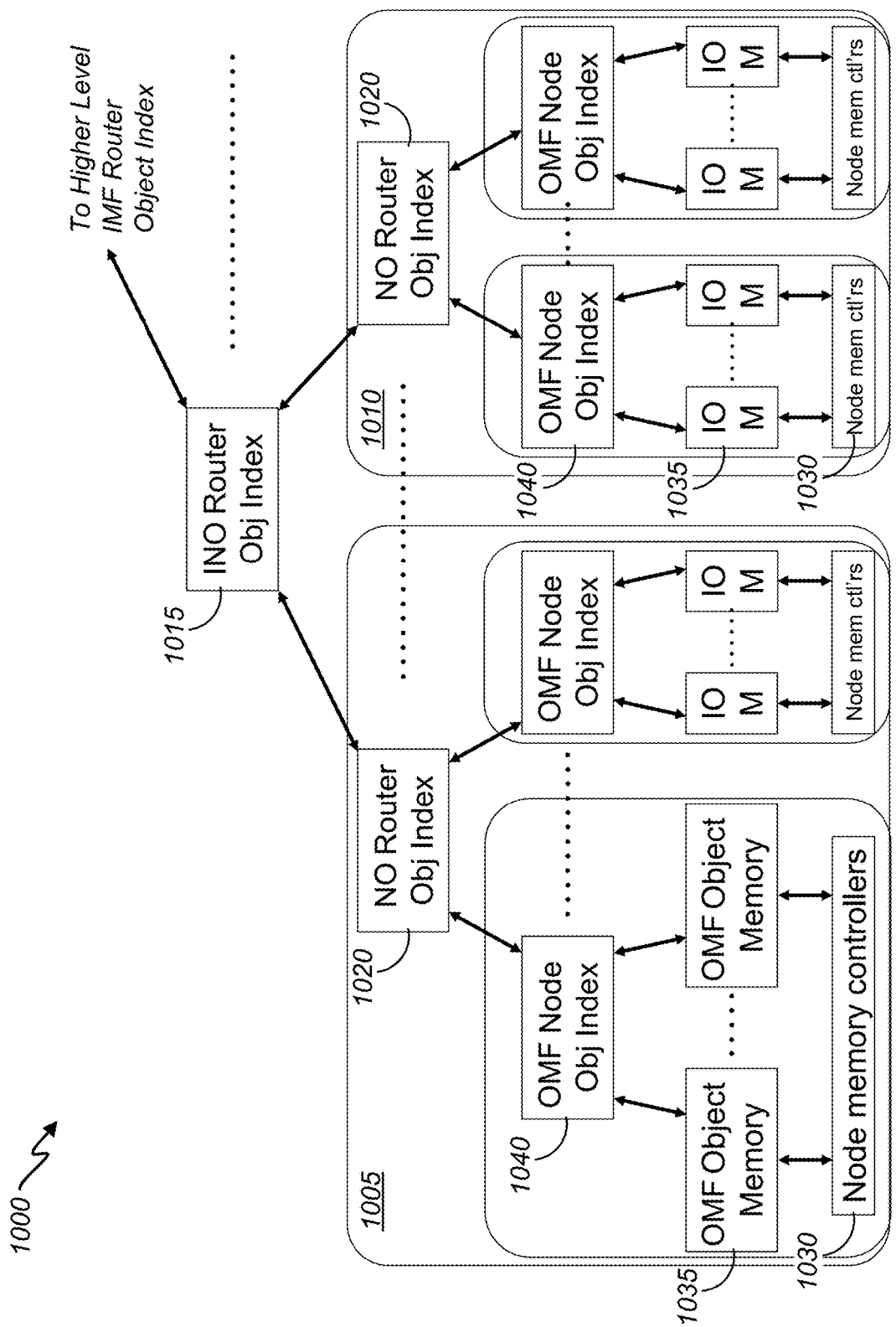
FIG. 10 is a block diagram illustrating aspects of an example object memory fabric distributed object memory and index structure, according to one embodiment of the present invention.

FIG. 10 is a block diagram illustrating an example object memory fabric distributed object memory and index structure 1000, in accordance with certain embodiments of the present disclosure. At leaves of the structure 1000 are any number of processing nodes 1005 and 1010 object memories 1035. These object memories 1035 may each have an object index that describes the objects and portions of objects currently stored locally in the object memories 1035. A number of object memories 1035, which in some embodiments may be DDR4-DIMM interface compatible cards within a single node are logically connected with an object memory fabric node object index 1040. The object memory fabric node object indices 1040 may each have an object index that describes the objects and portions of objects currently stored locally and/or currently stored in the object memories 1035. In some embodiments, the object memory fabric node object index 1040 can be instantiated as a PCIe card. With some embodiments, the object memory fabric object memory DDR4-DIMM and object memory fabric node object index PCIe card can communicate over PCIe and memory bus.

In some embodiments, the object memory fabric node object index 1040 works identically to the object index within the object memory 1035, except that the object memory fabric node object index 1040 tracks all objects and portions of objects that are within any of the connected object memories 1035 and maps the objects and portions of objects to particular object memory 1035. The next level up in the tree is an node object router object index 1020 that may be provided by an object memory fabric router that performs the same object index function for all the object memory fabric node object indices 1040 to which it is connected. The node object router object indices 1020 may each have an object index that describes the objects and portions of objects currently stored locally in lower levels (e.g., at 1040, 1035). Thus, according to some embodiments, router modules may have directory and router functions, whereas memory modules may have directory and router functions, as well as memory functions to store memory objects. However, other embodiments are possible, and, in alternative embodiments, the router modules may additionally have memory functions to store memory objects.

The pattern may illustrated by the structure 1000 may continue to another higher level inter-node object router object index 1015 that may be provided by an object memory fabric router that performs the same object index function for all the object memory fabric node object indices to which it is connected, and so on to the root of the tree. Thus, in certain embodiments, each object index and each level may perform the same function, independently, but, the aggregate of object indices and levels as a tree network may provide a real time dynamic distributed index, with great scalability properties, that efficiently tracks and localizes memory objects and blocks. An additional property may be that the combination of tree, distributed indices, and caching enable a significant reduction in bandwidth requirements. This may be illustrated by the hierarchically indicated neighborhoods that are delineated by object memory fabric router to leafs (down in this case). As the level of the defined hierarchy increases, so does the aggregate object memory caching capacity. So, as an application working set fits within the aggregate capacity of a given level, the bandwidth requirement at the level toward the root may go to zero.

As disclosed herein, each processing node is configured to utilize a set of algorithms to operatively couple to one or more additional processing nodes to operate as a set of processing nodes independently of a scale of the set of processing nodes. The set of nodes may operate so that all memory objects of the set of nodes are accessible by any node of the processing set of nodes. At the processing nodes, object memory modules may store and manage memory objects, each instantiated natively therein and managed at a memory layer, and object directories that index the memory objects and blocks thereof on a per-object basis. A memory module may process requests based at least in part on the one or more object directories, which requests may be received from an application layer. In some case, the requests may be received from one or more additional processing nodes. Responsive to the requests, a given memory module may process an object identifier corresponding to a given request and may determine whether the memory module has requested object data. If the memory module has the requested object data, the memory module may generate a response to the request based at least in part on the requested object data. If the memory module does not have the requested object data, an object routing module may routes the first request to another node in the tree. The routing of the request may be based at least in part on the object routing module making a determination about a location of object data responsive to the request. If the object routing module identifies the location based at least in part on the object routing module's directory function, the object routing module may rout the request down toward the location (i.e., a lower level node possessing the requested object data). However, if the object routing module determines that the location is unknown, the object routing module may rout the request toward a root node (i.e., to one or more higher level object routers—inter-node object routers) for further determinations at each level until the requested object is located, accessed, and returned to the original memory module.

In addition, as disclosed herein, triggers may be defined for objects and/or blocks within objects in object metadata. The object-based triggers may predict what operations will be needed and may provide acceleration by performing the operations ahead of time. When a node receives a request that specifies an object (e.g., with a 128-bit object address), the node uses an object directory to determine if the node has any part of the object. If so, the object directory points to a per-object tree (a separate one, where the size is based on the size of the object) which may be used to locate local the blocks of interest. There could be additional trigger metadata that indicates, for the particular blocks of interest, to interpret the particular addresses in a predefined manner as the blocks are transferred to/through the memory module. The triggers may specify one or more pre-defined hardware and/or software actions on a per-block basis with respect to one or more data blocks within an object (e.g., fetch a particular address, run a more complicated trigger program, perform pre-fetching, calculate these other three blocks and send signal to software, etc.). Triggers may correspond to a hardware way to dynamically move data and/or perform other actions ahead of when such actions are needed as objects flow through any memory module of the object memory fabric. Accordingly, such actions may be effected when a particular memory object having one or more trigger is located at a respective memory module and accessed as part of the respective memory module processing one or more other requests.

Figure 11:
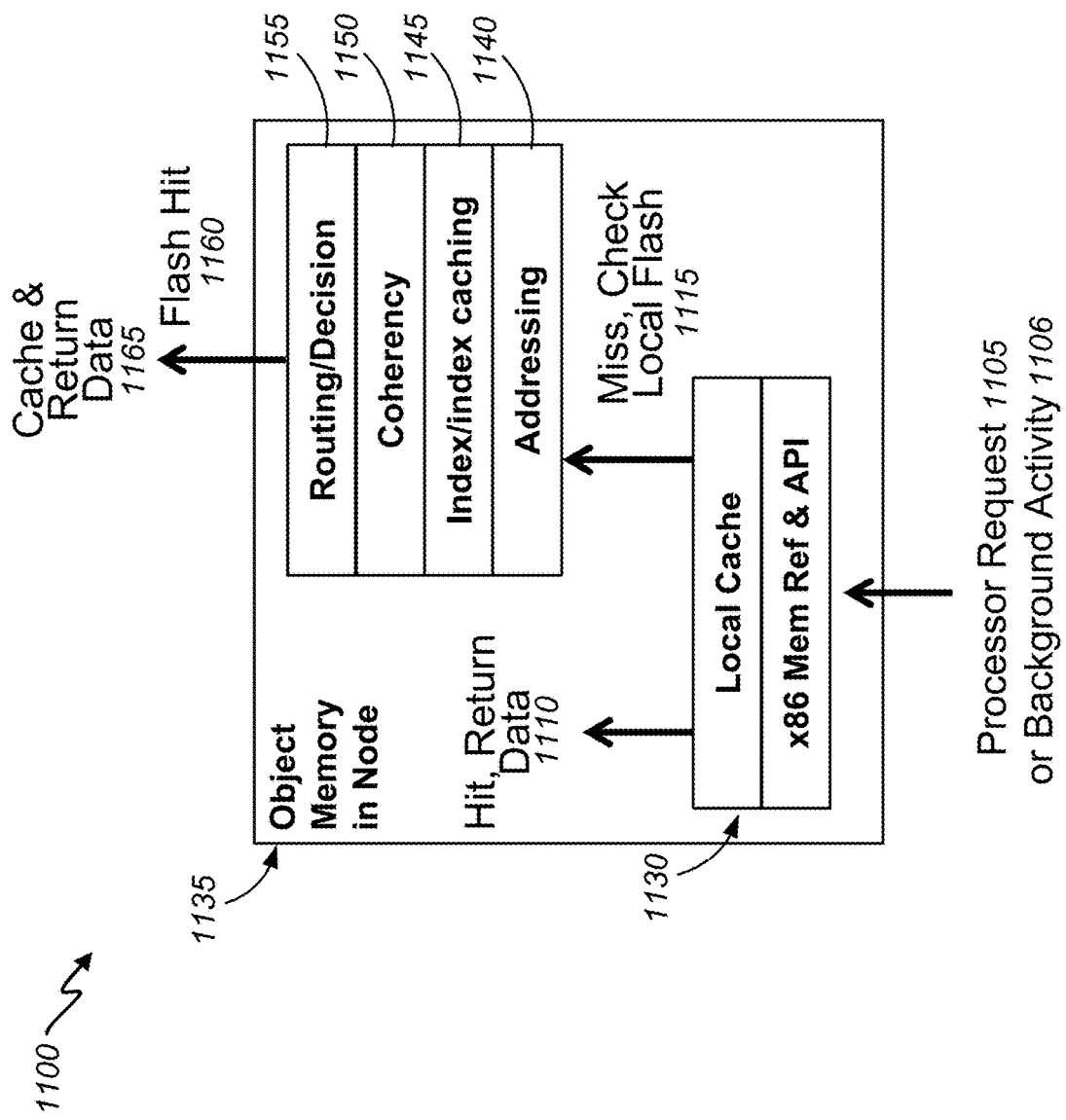
FIG. 11 illustrates aspects of an object memory hit case that executes completely within the object memory, according to one embodiment of the present invention.
Figure 12:
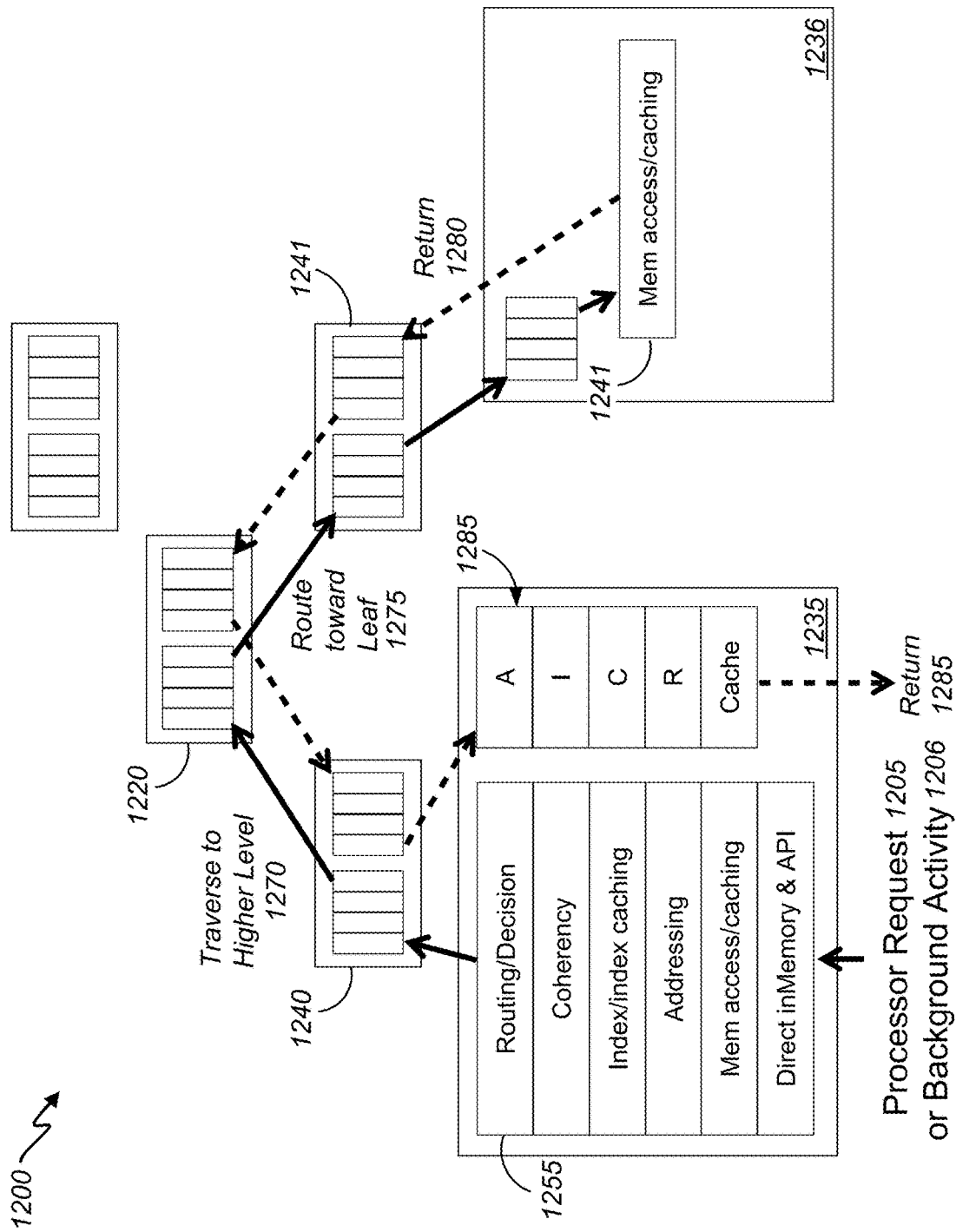
FIG. 12 illustrates aspects of an object memory miss case and the distributed nature of the object memory and object index, according to one embodiment of the present invention.

FIGS. 11 and 12 are block diagrams illustrating examples at a logical level of how the distributed nature of the object index operates and interoperates with the object memory fabric protocol layering, in accordance with certain embodiments of the present disclosure. Certain embodiments of object memory fabric protocol layering may be similar to, but have important differences from, a conventional layered communication protocol. A communications protocol may be essentially stateless, but embodiments of the object memory fabric protocol may maintain object state and directly enable distributed and parallel execution—all without any centralized coordination.

FIG. 11 illustrates an object memory hit case 1100 that executes completely within the object memory 1135, in accordance with certain embodiments of the present disclosure. Object memory 1135 may receive a processor request 1105 or background trigger activity 1106. The object memory 1135 may manage the local DRAM memory as a cache 1130, based on processor physical address. The most frequent case may be that the requested physical address is present and it gets immediately returned to the processor, as indicated at 1110. The object memory 1135 may use triggers to transparently move data from slower flash memory into the fast DRAM memory, as indicated at 1115.

For the case of a miss 1115 or background trigger activity 1106, some embodiments may include one or a combination of the following. In some embodiments, an object memory fabric object address may be generated from the physical address, as indicated by block 1140. The object index may generate the location in local flash memory from the object address space, as indicated by block 1145. Object index lookup can be accelerated by two methods: (1) a hardware-based assist for index lookup; and (2) results of the object index lookup being locally cached. Object memory fabric cache coherency may be used to determine whether the local state is sufficient of the intended operation, as indicated by block 1150. Based on the index, a lookup may be performed to determine whether the object and/or block within object are local, as indicated by block 1155. In the case of a hit 1160, the data corresponding to request 1105 or trigger activity 1106 may be transferred, as indicated by 1165. And, in some embodiments, when the cache state is sufficient, a decision may be made to cache the block into DRAM.

FIG. 12 illustrates an object memory miss case 1200 and the distributed nature of the object memory and object index, in accordance with certain embodiments of the present disclosure. The object memory 1235 may go through steps described previously, but the routing/decision stage 125 may determine that the object and/or block is not local. As a result, the algorithm may involve the request traversing 1270 up the tree toward the root, until the object/block is found. Any number of levels and corresponding node elements may be traversed until the object/block is found. In some embodiments, at each step along the path, the same or similar process steps may be followed to independently determine the next step on the path. No central coordination is required. Additionally, as disclosed herein, object memory fabric API and triggers normally get executed in the leafs, but can be executed in a distributed manner at any index.

As a simplified example, in the case depicted the request traverses 1270 up from the object memory fabric node object index 1240 corresponding to object memory 1235 to the object router 1220. The object router 1220, with its an object router object index, may identify the request object/block as being down the branch toward object memory fabric node object index 1241. Hence, at the index of object router 1220, the request may then be routed 1275 toward the leaf(s) that can supply the object/block. In the example depicted, the object memory 1236 can supply the object/block. At the object memory 1236, memory access/caching 1241 may be performed (which may include previously described process steps for a hit case being performed), and the object/block may be returned 1280 back to the original requesting leaf 1235 for the ultimate return 1290. Again, in some embodiments, at each step along the path, the same or similar process steps may be followed to independently determine the next step on the path. For example, the original requesting leaf 1235 may perform previously described process steps 1285 for a hit case, and then return 1290 the requested data.

As disclosed herein, the operation of a single object memory fabric index structure, the object memory fabric index structure may be based on several layers of the same tree implementation. Certain embodiments employing tree structure may have several uses within object memory fabric as described in Table 4 below. However, various other embodiments are possible.

TABLE 4

Tree Structure Uses

| Use | Object Memory | Node Object Index | Object Memory Fabric Router |
|---|---|---|---|
| Determine local location of objects and blocks comprising objects as function of object address space | Yes | | |
| Determine which children hold objects, and blocks | | Yes | Yes |

TABLE 4-continued

Tree Structure Uses

| Use | Object Memory | Node Object Index | Object Memory Fabric Router |
|---|---|---|---|
| comprising objects, as a function of object address space | | | |
| Generate object address space as function of local physical address (single level) | Yes | | |
| Object virtual address to object address space | | Yes | |
| Application defined | Yes | | |

Figure 13:
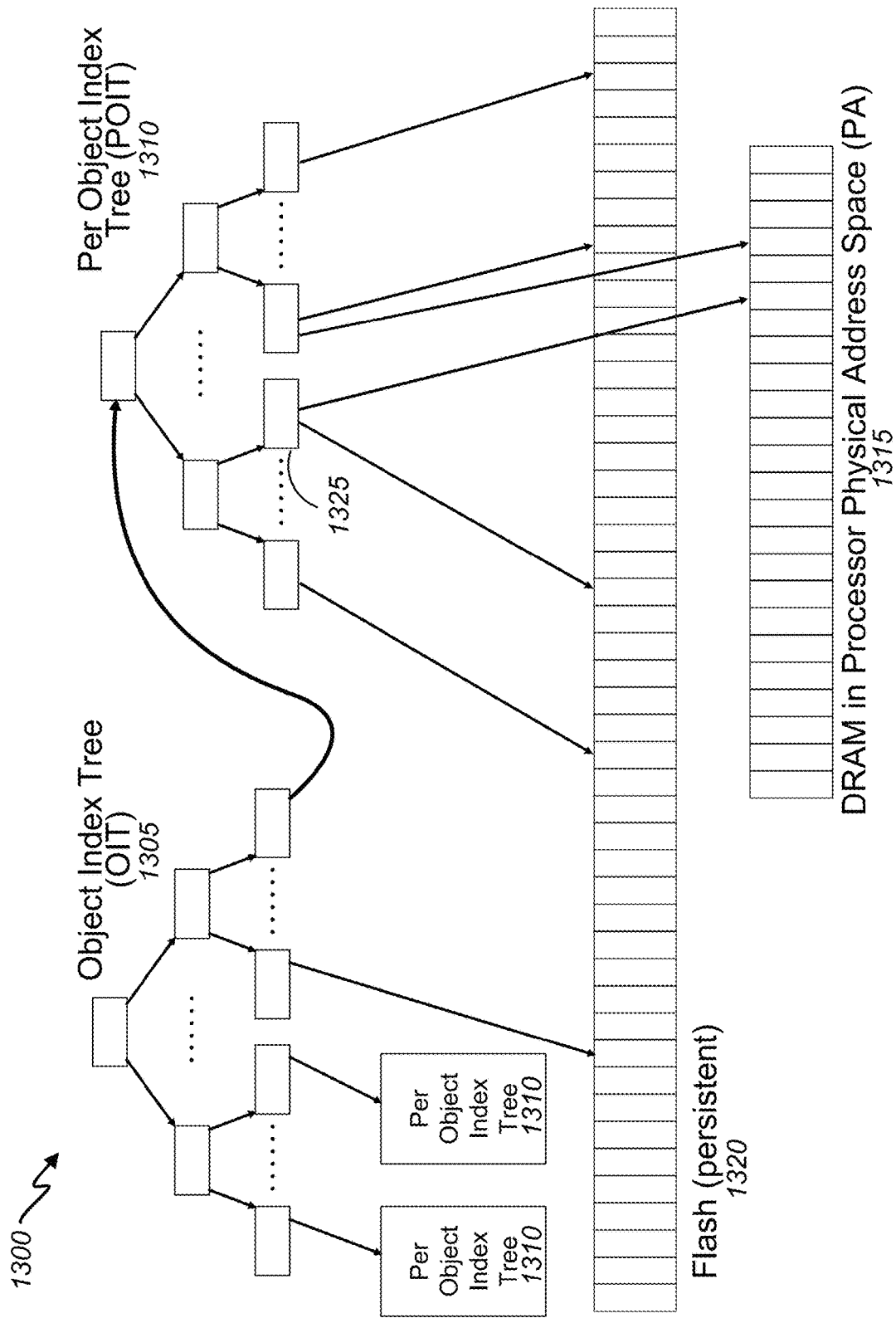
FIG. 13 is a block diagram illustrating aspects of an example of leaf level object memory in view of the object memory fabric distributed object memory and index structure, according to one embodiment of the present invention.

FIG. 13 is a block diagram illustrating an example of leaf level object memory structure 1300 in view of the object memory fabric distributed object memory and index structure, in accordance with certain embodiments of the present disclosure. In some embodiments, the leaf level object memory structure 1300 may include a nested set of B-trees. The root tree may be the object index tree (OIT) 1305, which may index objects locally present. The index for the object index tree 1305 may be the object memory fabric object address, since objects start at object size modulo zero. There may be one object index tree 1305 for each object that has at least a single block stored locally within the object memory.

The object index tree 1305 may provide one or more pointers (e.g., local pointers) to one or more per object index trees (POIT) 1310. For example, every local object may have a per object index tree 1310. A per object index tree 1310 may index object metadata and blocks belonging to the object that are locally present. The per object index tree 1310 leaves point to the corresponding metadata and blocks (e.g., based on offset within object) in DRAM 1315 and flash 1320. A leaf for a specific block can point to both DRAM 1315 and flash 1320, as in the case of leaf 1325, for example. Organization of object metadata and data is disclosed further herein.

The tree structure utilized may be a modified B-tree that is copy-on-write (COW) friendly. COW is an optimization strategy that enables multiple tasks to share information efficiently without duplicating all storage where most of the data is not modified. COW stores modified blocks in a new location which works well for flash memory and caching. In certain embodiments, the tree structure utilized may be similar to that of the open source Linux file system btrfs, with major differences being utilization for a single object/memory space, hardware acceleration, and the ability of independent local indices to aggregate as described previously. By utilizing multiple layers of B-trees, there can be a higher degree of sharing and less rippling of changes. Applications, such as file systems and database storage managers, can utilize this underlying efficient mechanism for higher level operation.

Figure 14:
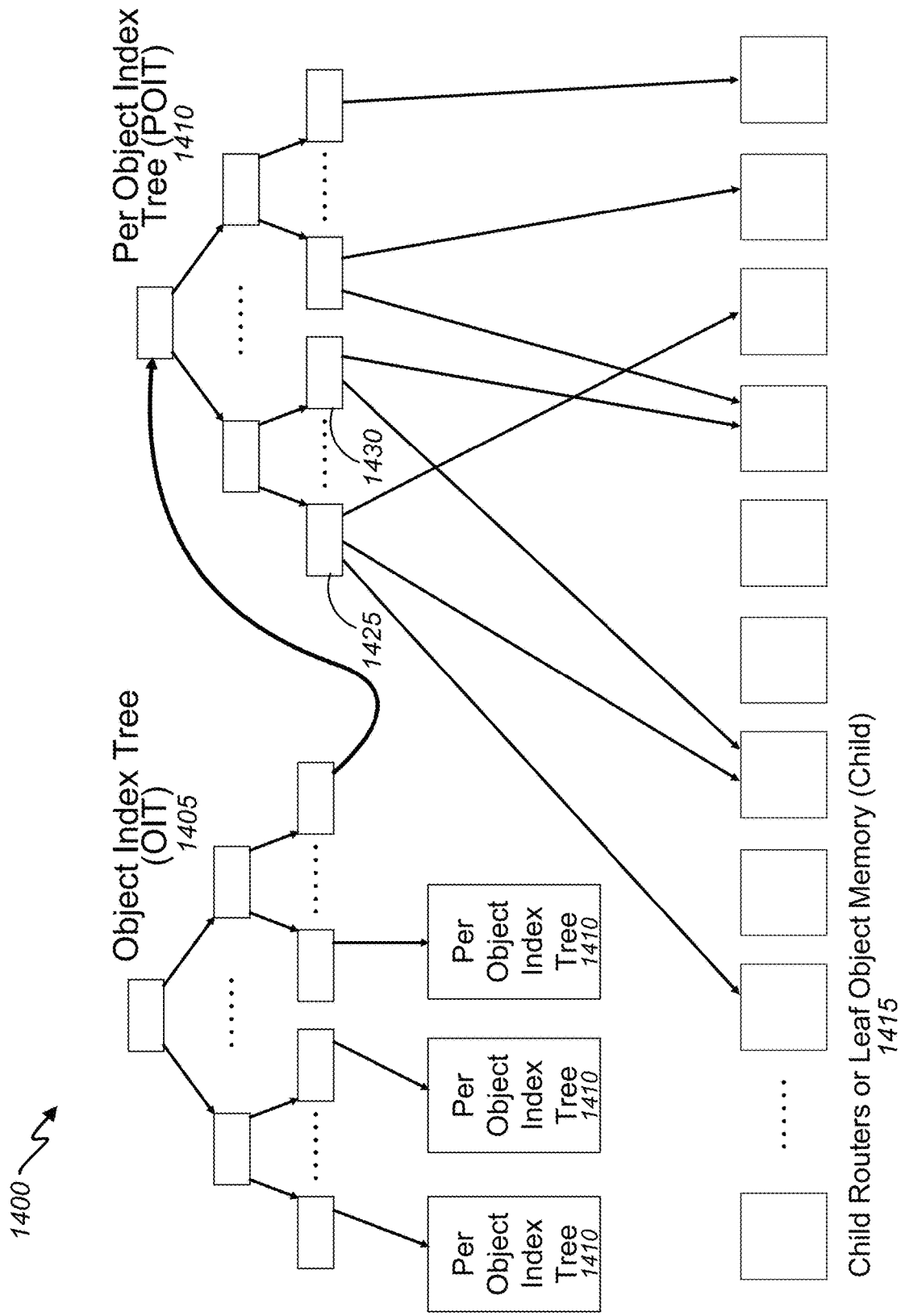
FIG. 14 is a block diagram illustrating aspects of an example of object memory fabric router object index structure, according to one embodiment of the present invention.

FIG. 14 is a block diagram illustrating an example of object memory fabric router object index structure 1400, in accordance with certain embodiments of the present disclosure. With some embodiments, the object memory fabric router object index and the node object index may use an almost identical structure of object index trees 1405 and per object index trees 1410 for each object. The object index trees 1405 may index objects locally present. Each object described in an object index tree 1405 may have a per object index tree 1410. The per object index trees 1410 may index blocks and segments that are locally present.

The object memory fabric router object index and the node object index may index objects and blocks within objects that are present in the children 1415 within the tree structure 1400, namely child router(s) or leaf object memory. An entry within a leaf in the per object index tree 1410 has the ability to represent multiple blocks within the object. Since blocks of an object may tend to cluster together naturally and due to background housekeeping, each object tends be represented much more compactly in object indices that are closer to the tree root. The object index trees 1405 and per object index trees 1410 may enable reduplication at the object and block level, since multiple leafs can point to the same blocks, as in the case of leaves 1425 and 1430, for example. Index Copy-On-Write (COW) support enables, for example, only modified blocks to be updated for an object.

Figure 15A:
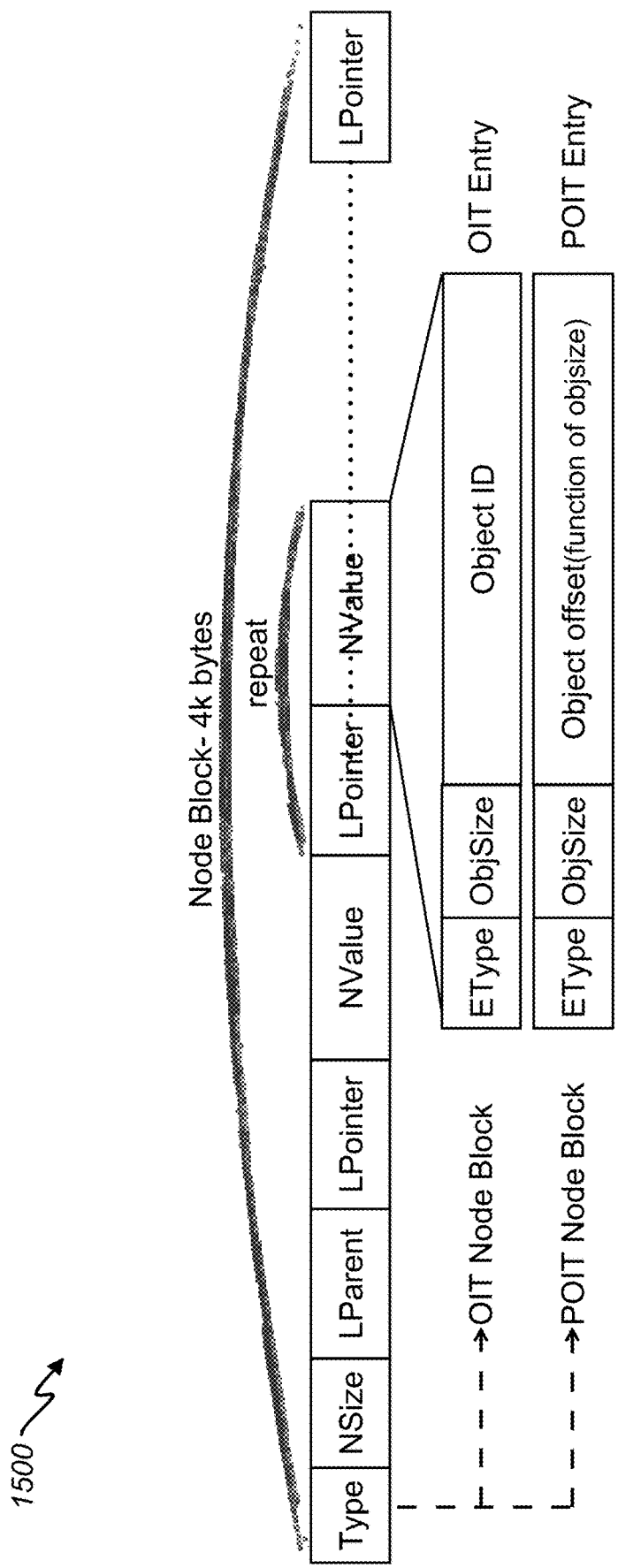
FIGS. 15A and 15B are block diagrams illustrating aspects of example index tree structures, including node index tree structure and leaf index tree, according to one embodiment of the present invention.
Figure 15B:
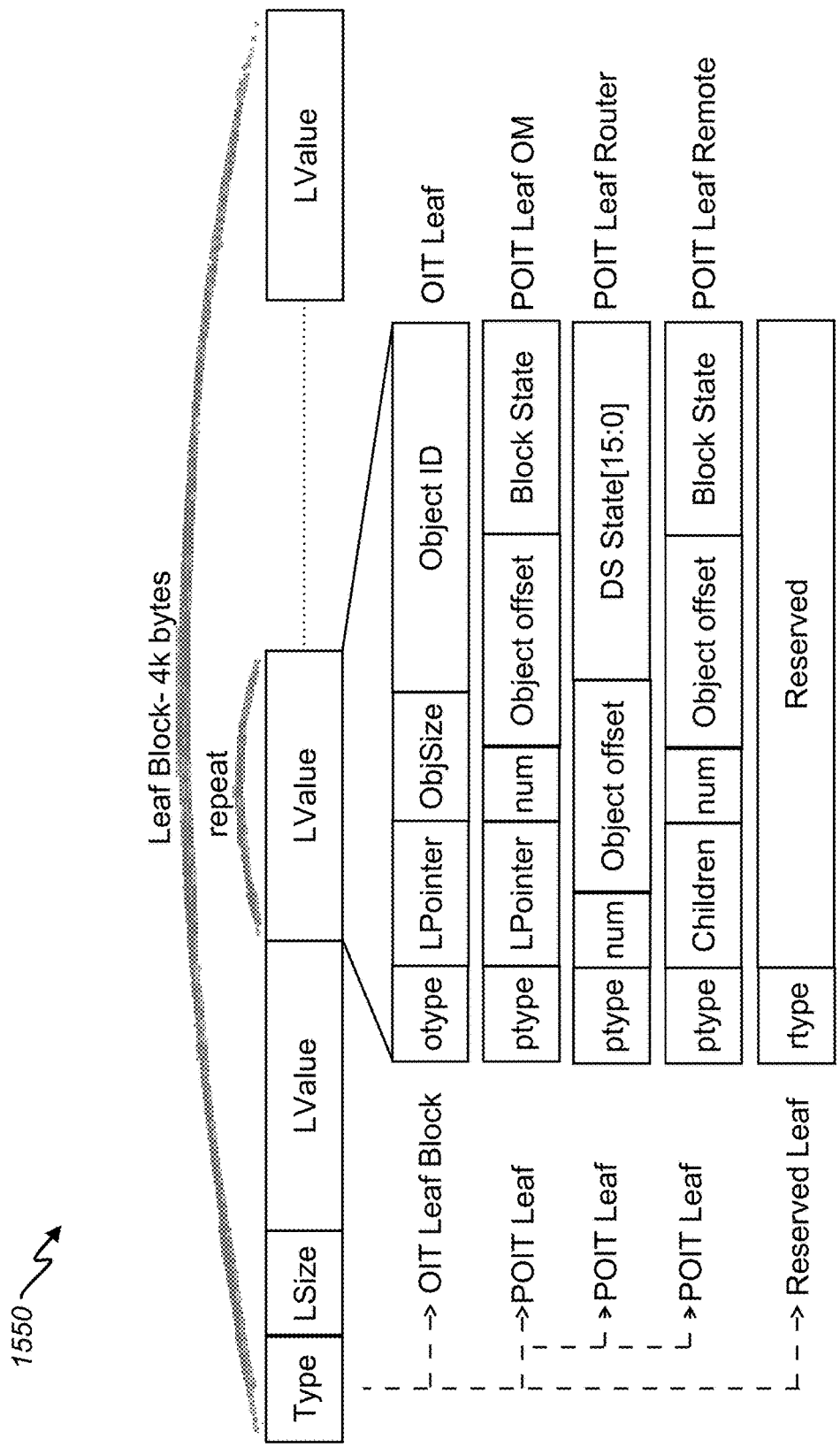

FIGS. 15A and 15B are block diagrams illustrating non-limiting examples of index tree structures, including node index tree structure 1500 and leaf index tree 1550, in accordance with certain embodiments of the present disclosure. Further non-limiting examples of various aspects of index tree fields are identified in Table 5 below. Other embodiments are possible. An individual index tree may include node blocks and leaf blocks. Each node or leaf block may include of a variable number of entries based on the type and size. Type specifies type of node, node block, leaf, and/or leaf block.

TABLE 5

Index Tree Fields

| Name | Description | Size |
|---|---|---|
| NSize | Encoded node size field. Single value for OIT node. Multiple values for POIT node based on object size corresponding to POIT index. Implies the size of NValue field. | 3 |
| ObjSize | Encoded Object Size | 3 |
| ObjectID | Maximum size object ID | 107 |
| Object Offset | 4k block Based on Object size corresponding to POIT index (9-52) | 52 |
| LPointer (LP) | References local 4k block in flash or dram. Includes 32 bits of pointer and a single bit specifying dram address space. | 32 |
| LParent (LPt) | Local Parent references the local 4k block of the parent node in flash or dram. Includes 32 bits of pointer and a single bit specifying dram address space. | 33 |
| LSize | Encoded leaf L Value size. | 3 |
| Otype | Type of OIT Leaf | 2 |

TABLE 5-continued

Index Tree Fields

| Name | Description | Size |
|---|---|---|
| Ptype | Type of POIT Leaf | 2 |
| Etype | Type of OIT or POIT Entry Node | 3 |
| Rtype | Type of reserved Leaf | 3 |
| num | May be utilized to increase the size of data that the leaf specifies to increase the efficiency of index tree and storage device. Values may include: 1 block 4 blocks (flash page) 512 blocks (minimum size object, 2 Mbyte) | 0 |
| Children | Specifies a remote device number | 32 |
| Block State | Encoding of 4k block cache coherency state | 8 |
|  | Block referenced count (unsigned) | 7 |
|  | Modified-Indicates that the block has been modified with respect to persistent store. Only valid for blocks while they are present in volatile memory. | 1 |
| DS State [15:0] | DownStream State [15:0]- Enumerates the state of for the block within object specified by Object Offset for each of 16 devices. | 128 |

Size specifies independently the size of the LPointer and IndexVal (or object offset). Within a balanced tree, a single block may point to all node blocks or all leaf blocks. In order to deliver highest performance, the tree may become un-balanced, such as for example where the number of levels for all paths through the tree are equivalent. Node blocks and leaf blocks may provide fields to support un-balanced trees. A background activity may re-balance the trees that are part of other background operations. For example, an interior node (non-leaf) in OIT may include L Pointer and NValue fields. NValue may include object size and object ID. Object ID requires 107 (128-21) bits to specify the smallest possible object. Each LPointer may point to the next level of interior node or a leaf node. LPointer may require enough bits to represent all the blocks within its local storage (approximately 32 bits representing 16 terabytes). For a node in the POIT, the NValue may consist of the object offset based on object size. The object size may be encoded within the NSize field. The size field may enable a node to hold the maximum number of LPointer and NValue fields based on usage. An index tree root node may be stored at multiple locations on multiple flash devices to achieve reliable cold boot of the OIT. Tree root block updates may be alternated among mirrors to provide wear leveling.

By default, each POIT Leaf entry may point to the location of a single block (e.g., 4 k bytes). POIT Leaf OM entry and POIT Leaf Router entry may contain a field to enable support beyond single block to enable more compressed index trees, higher resulting index tree performance and higher persistent storage performance by being able to match the page size for persistent storage.

Nodes and leafs may be differentiated by the Type field at the start of each 4 k block. The NNize field may encode the size of NValue field within a node, and LSize field may encode the size of the LValue field within a leaf. The size of the LPointer field may be determined by the physical addressing of local storage is fixed for a single devices (e.g., RDIMM, node router, or router). The LPointer may be only valid within a single device and not across devices. The LPointer may specify whether the corresponding block is stored in persistent memory (e.g., flash) or faster memory (e.g., DRAM). Blocks that are stored in DRAM may also have storage allocated within persistent memory, so that two entries are present to indicate the two storage locations for a block, node or leaf. Within a single block type, all NValue and/or LValue fields may be a single size.

The OIT Node may include several node level fields (Type, NSize, and LParent) and entries including OIT Node Entry or OIT Leaf Entry. Since an index tree can be un-balanced at times a node can include both node and leaf entries. The POIT Node may include one or more node level fields (e.g., Type, NSize, and/or LParent) and entries including OIT Leaf Entry. OIT Leaf types may be differentiated by the otype field. OIT Leaf (Object Index Table Leaf) may point to the head of a POIT (Per Object Index Table) that specifies object blocks and object metadata. OIT Leaf R may point to a remote head of an POIT. This may be utilized to reference an object that is residing on a remote device across a network. This leaf may enable the remote device to manage the object.

POIT Leaf types may be differentiated by the ptype field. POIT Leaf OM may point to a block of object memory or metadata. The Object offset field may be one bit greater than the number of bits to specify the offset for a specific object size to specify metadata. For example, for 221 object size 10 bits may be required (9 plus 1 bits). The implementation can choose to represent the offset in two's complement form (signed form, first block metadata is −1), or in one's complement where the additional bit indicates metadata (first block of metadata is represented by 1, with metadata bit set).

POIT Leaf Remote may point to an block of object memory or metadata that is remote from the local DIMM. This may be used to reference a block that is residing on a remote device across a network through the stream package interface. For example, this device could be a mobile device. This leaf may enable object memory fabric hardware to manage coherence on a block basis for the remote device.

POIT Leaf Router may be utilized within node object routers and inter-node object routers to specify the state of the corresponding object memory fabric Block Object Address for each of up to 16 downstream nodes. If within a node object router, up to 16 DIMMs may be specified in some embodiments (or more in other embodiments). If within an inter-node object router up to 16 downstream routers or node object routers (e.g., server nodes) may be specified in some embodiments (or more in other embodiments). The Block Object Address can be present in one or more downstream devices based on valid state combinations.

Index lookups, index COW updates, and index caching may be directly supported in object memory fabric hardware in Object Memory, node object index, and object memory fabric Router. In addition to the node formats for object memory fabric indices, application-defined indices may be supported. These may be initialized through the object memory fabric API. An advantage of application-defined indices may be that object memory fabric hardware-based index lookup, COW update, index caching, and parallelism may be supported Various embodiments may provide for background operations and garbage collection. As each DIMM and Router within object memory fabric may maintain its own directory and storage locally, background operations and garbage collection may be accomplished locally and independently.

Each DIMM or Router may have a memory hierarchy for storing index trees and data blocks, that may include on-chip cache, fast memory (e.g., DDR4 or HMC DRAM) and slower nonvolatile memory (e.g., flash) that it can manage, as well as index trees.

Each level within the hierarchy may perform the following operations: (1) Tree balancing to optimize lookup time; (2) Reference count and aging to determine when blocks are moved between different storage; (3) Free list updating for each local level of hierarchy as well as keeping a parameters of fill level of the major levels of the local hierarchy; (4) Delivering periodic fill levels to the next level of hierarchy to enable load balancing of storage between DIMMs on a local server and between levels of object memory fabric hierarchy; (5) If a Router, then load balancing between child nodes.

Block reference count may be utilized object memory fabric to indicate the relative frequency of access. Higher value may indicate more frequent use over time, lower less frequent use. When block reference count is associated with a block in persistent memory, blocks which have lowest values may be candidates to move to another DIMM or node that has more available space. Each time a block is accelerated into volatile memory, the reference count may be incremented. Low frequency background scanning may decrement the value if it is not in volatile memory and increments the value if it is in volatile memory. It may be expected that the scanning algorithm may evolve over time to increment or decrement based or reference value to provide appropriate hysteresis. Blocks that are frequently accelerated into or present in volatile memory may have higher reference count values.

When a block reference count is associated with a block in volatile memory, blocks which have lowest values may be candidates to move back to persistent memory or memory within another DIMM or node. When a block moves into volatile memory, reference count may be initialized based on the instruction or use case that initiated the movement. For example, a demand miss may set the value to a midpoint, and a speculative fetch may set it to a quarter point. Single use may set it to below the quarter point. Moderate frequency background scanning may decrement the referenced value. Thus, demand fetches may be initially weighted higher than speculative fetches. If a speculative fetch is not utilized, it may quickly fall to the lower referenced values that may be replaced first. Single use may be weighted low to be candidate for replacement sooner than other blocks. Thus, single use and speculative blocks may not replace other frequently accessed blocks.

Figure 16:
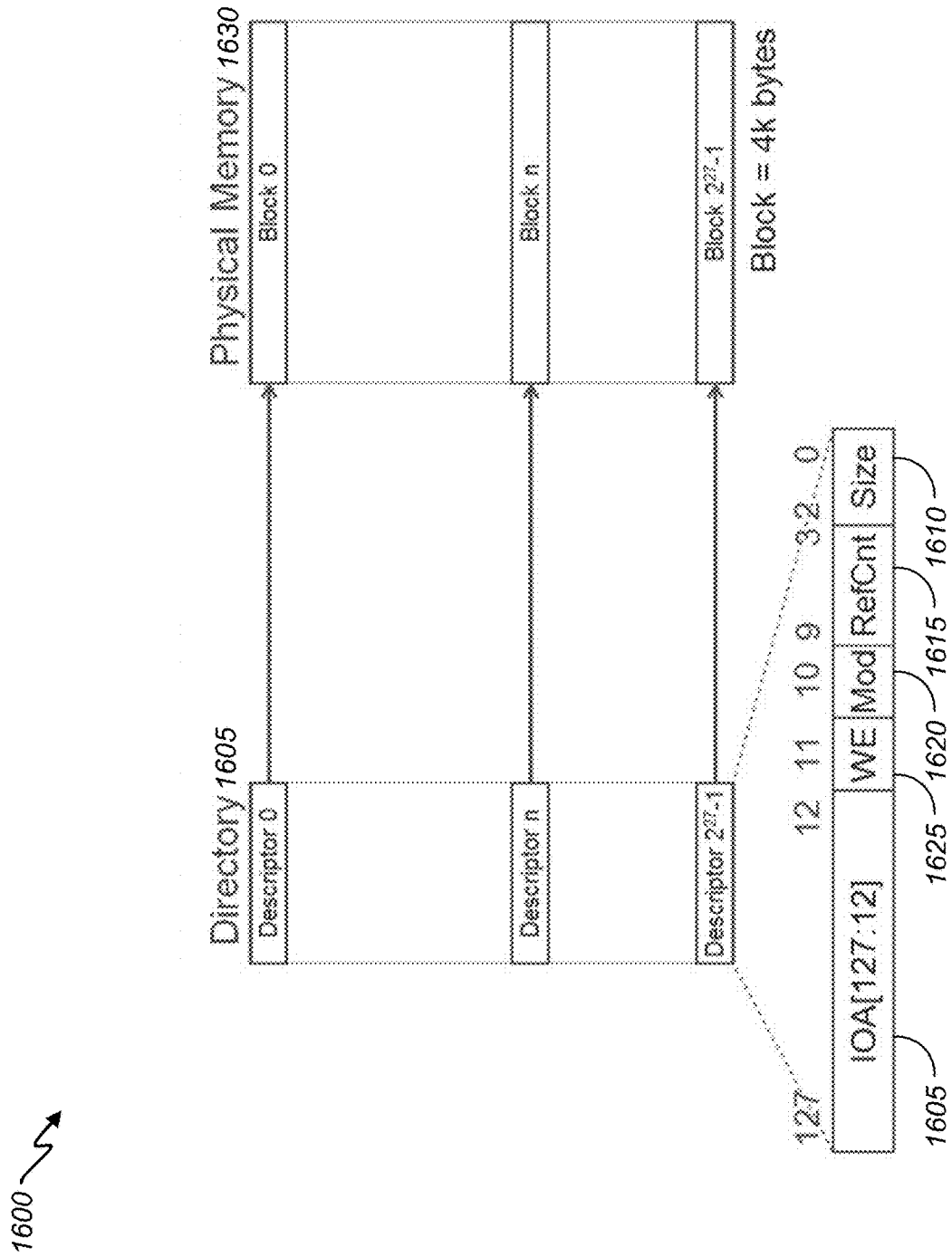
FIG. 16 is a block diagram illustrating aspects of an example physical memory organization, according to one embodiment of the present invention.

FIG. 16 is a block diagrams illustrating an aspect of example physical memory organization 1600, in accordance with certain embodiments of the present disclosure. Object memory fabric may provide multiple methods to access objects and blocks. For example, a direct method may be based on execution units within object memory fabric or devices that can directly generate full 128-bit memory fabric addresses may have full direct access.

An associated method may consider conventional servers having limited virtual address and physical address spaces. Object memory fabric may provide an API to dynamically associate objects (e.g., segments) and blocks (e.g., pages) with the larger object memory fabric 128-bit memory fabric address. The associations provided by AssocObj and AssocBlk operations may be utilized by object memory fabric driver (e.g., Linux driver) and object memory fabric system library (Syslib) interfacing with the standard processor memory management to enable object memory fabric to behave transparently to both the operating system and applications. Object memory fabric may provide: (a) an API to associate a processor segment and its range of virtual addresses with an object memory fabric object thus ensuring seamless pointer and virtual addressing compatibility; (b) an API to associate a page of virtual address space and the corresponding object memory fabric block with a page/block of local physical memory within an object memory fabric DIMM (which may ensure processor memory management and physical addressing compatibility); and/or (c) local physical memory divided into standard conventional server DIMM slots, with 512 Gbytes (239 bytes) per DIMM slot. On a per slot basis, object memory fabric may keep an additional directory indexed by physical address of the object memory fabric address of each block that has been associated with the corresponding physical address as illustrated in the following diagram.

FIG. 16 is a block diagram illustrating an example physical memory organization 1600, in accordance with certain embodiments of the present disclosure. A physical memory directory 1605 for physical memory 1630 may include: object memory fabric object block address 1610; object size 1615; a modified field 1625 which may indicate whether the block has been modified with respect to persistent memory; and/or write enable 1630 which may indicate whether local block cache state is sufficient for writing. For example, if the cache state were copy, writes may be blocked, and object memory fabric would may with sufficient state for writing. The physical address range may be assigned to each by system BIOS on boot based object memory fabric DIMM SPD (Serial Presence Detect) configuration.

Figure 17A:
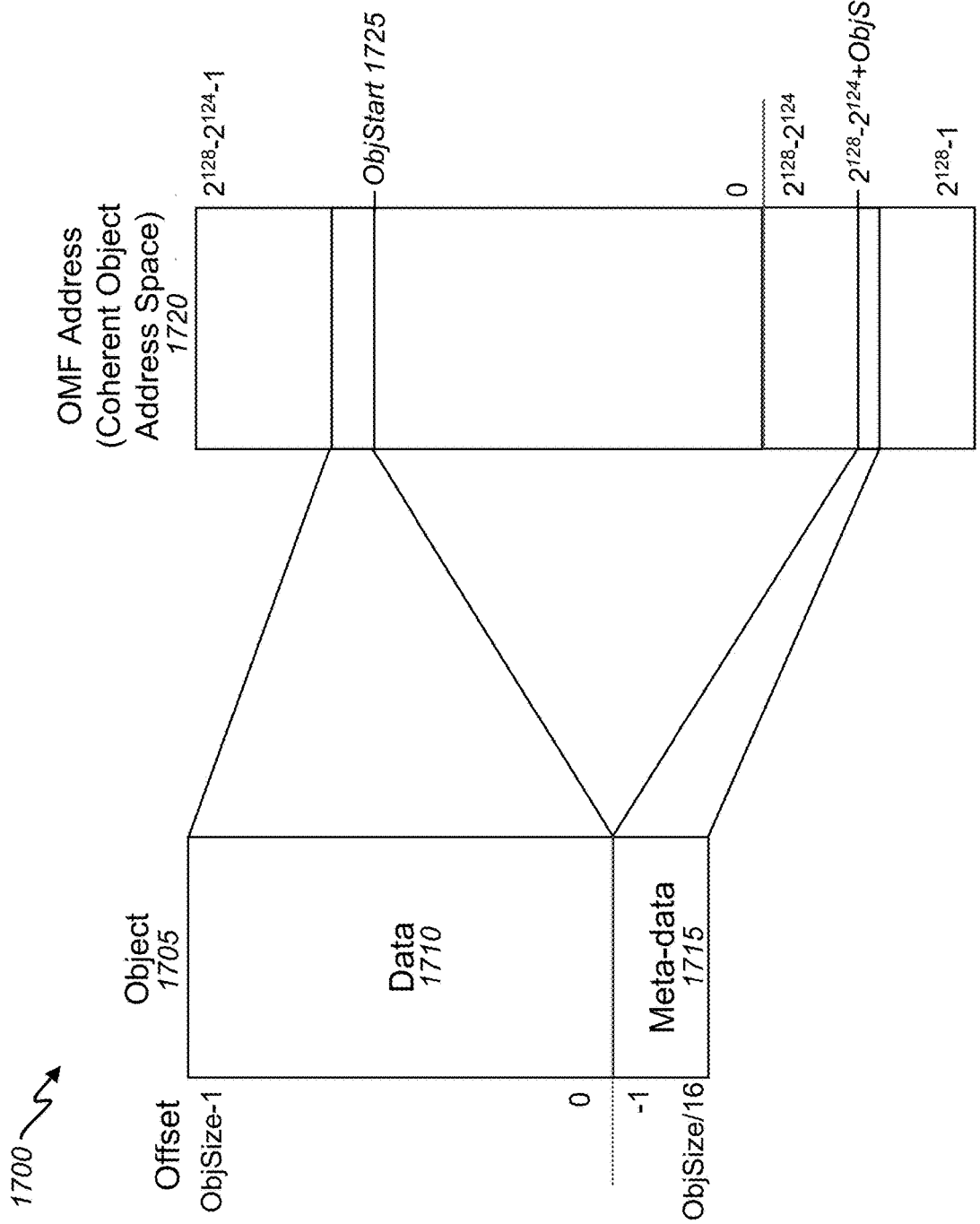
FIG. 17A is a block diagram illustrating aspects of example object addressing, according to one embodiment of the present invention.
Figure 17B:
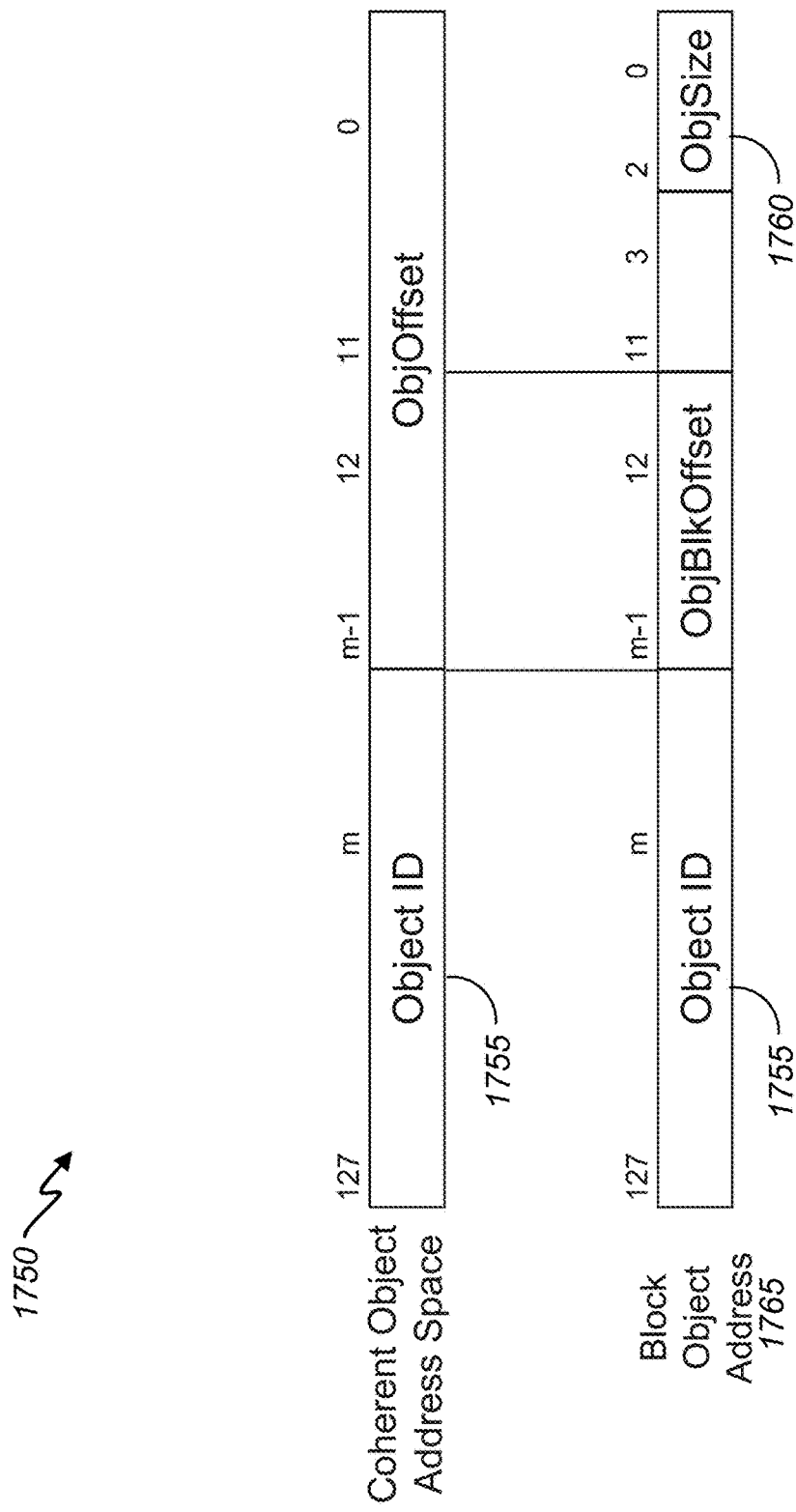
FIG. 17B is a block diagram illustrating aspects of example object memory fabric pointer and block addressing, according to one embodiment of the present invention.

FIG. 17A is a block diagram illustrating an example object addressing 1700, in accordance with certain embodiments of the present disclosure. FIG. 17B is a block diagram illustrating example aspects of object memory fabric pointer and block addressing 1750, in accordance with certain embodiments of the present disclosure. Object memory fabric objects 1705 may include object data 1710 and metadata 1715, both divided into 4 k blocks in some embodiments as one unit of storage allocation, referenced by the object memory fabric address space 1720. The object starting address may be the ObjectID 1755. Data 1710 may be accessed as a positive offset from ObjectID 1755. The largest offset may be based on ObjectSize 1760.

Object metadata 1715 may be accessed as a negative offset from ObjectStart 1725 (ObjectID). Metadata 1715 can be also referenced by an object memory fabric address in the top 1/16th of object address space 1720. The start of a specific objects metadata may be 2128-2124+Obj Start/16. This arrangement may enable the POIT to compactly represent metadata 1715 and the metadata 1715 to have an object address space so it can be managed coherently just like data. Although the full object address space may be allocated for object data 1710 and metadata 1715, storage may be sparsely allocated on a block basis. At a minimum, an object 1705 has a single block of storage allocated for the first block of metadata 1715, in some embodiments. Object access privilege may be determined through object memory fabric Filesystem ACL or the like. Since object memory fabric manages objects in units of 4 k blocks, addressing within the object memory fabric object memory are block addresses, called Block Object Address 1765 (BOA), which corresponds to object address space [127:12]. BOA [11:0] may be utilized by the object memory for ObjectSize (BOA[7:0]) and object metadata indication (BOA[2:0]).

Figure 18:
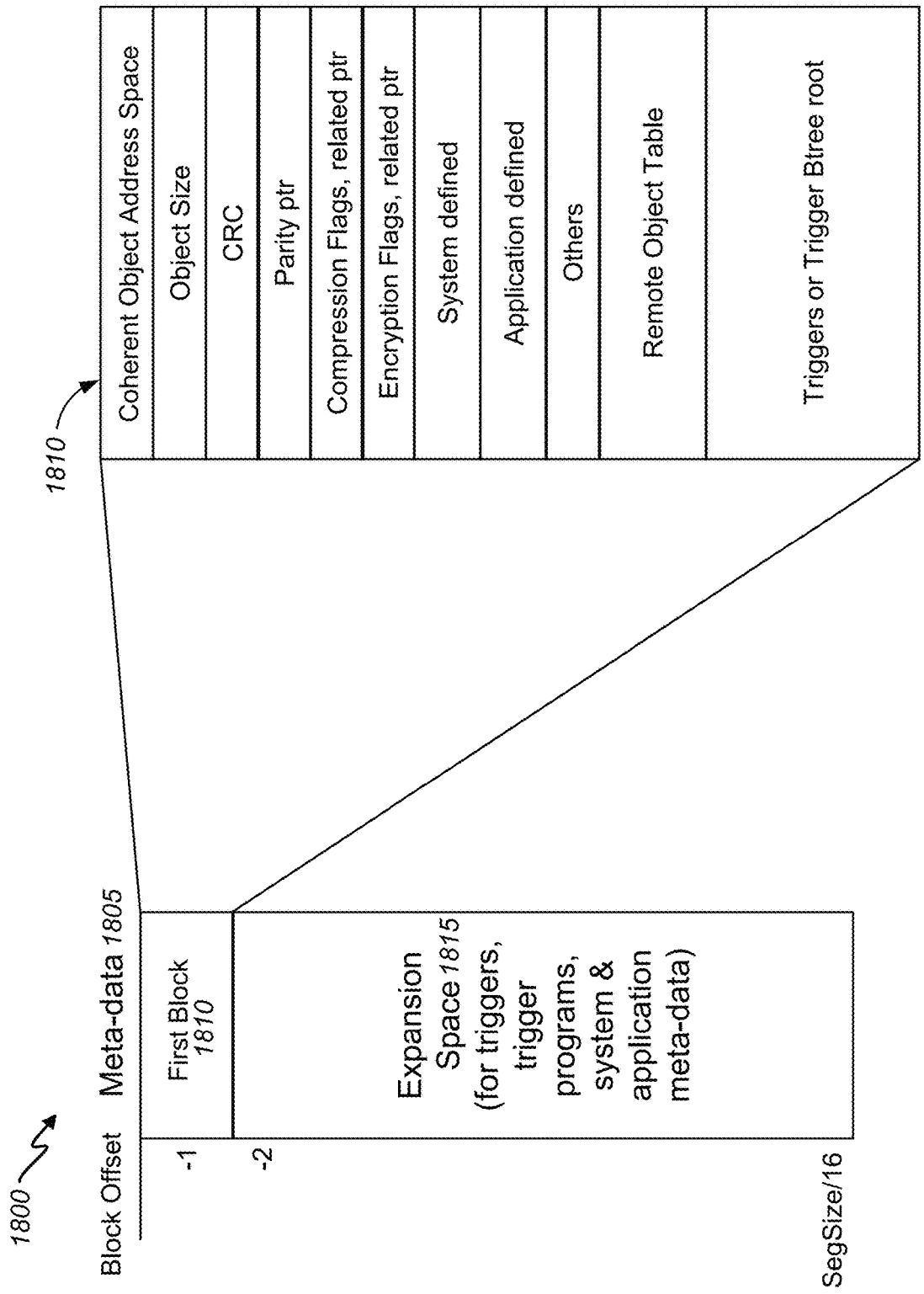
FIG. 18 is a block diagram illustrating aspects of example object metadata, according to one embodiment of the present invention.

FIG. 18 is a block diagram illustrating example aspects 1800 of object metadata 1805, in accordance with certain embodiments of the present disclosure. Table 6 below indicates metadata of the first block 1810 of metadata 1805 per certain embodiments. In some embodiments, the first block 1810 of metadata 1805 may hold metadata for an object as depicted.

TABLE 6

Metadata First Block

| Name | Description | Size |
|---|---|---|
| Object address space | Object ID. Number of significant bits determined by object size | 16 |
| Object size | Object Size | |
| CRC | Reserved for optional object crc | 16 |
| Parity pointer | Pointer to pages used for optional object block parity | 16 |
| Compression Flags | OID of compression object | 16 |
| Encryption Flags | OID of encryption object | 16 |
| System Defined | Reserved for software defined OS functions | 256 |
| Application Defined | Reserved for software defined owning application functions | 256 |
| Others | | 432 |
| Remote Object Table | Specifies Objects accessible from this object. Specifies 64 OIDs (128 bit). The zero entry is used to specify object or metadata within this | 1024 |
| Triggers | Triggers or Trigger B-Tree root | 2048 |
| | | 4096 |

System-defined metadata may include any Linux-related data to coordinate use of certain objects seamlessly across servers. Application-defined metadata may include application related data from a file system or database storage manager to enable searches and/or relationships between objects that are managed by the application.

For an object with a small number of triggers, base triggers may be stored within the first block; otherwise, a trigger B-tree root may reference metadata expansion area for the corresponding object. Trigger B-tree leaf may specify base triggers. A base trigger may be a single trigger action. When greater than a single action is required, a trigger program may be invoked. When trigger programs are invoked, they may reside in the expansion area. The remote object table may specify objects that are accessible from this object by the extended instruction set.

Certain embodiments may provide for an extended instruction execution model. One goal of the extended execution model may be to provide a lightweight dynamic mechanism to provide memory and execution parallelism. The dynamic mechanism enables a dataflow method of execution that enables a high degree of parallelism combined with tolerance of variation in access delay of portion of objects. Work may be accomplished based on the actual dependencies, not a single access delay holding up the computation.

Various embodiments may include one or a combination of the following. Loads and memory references may be split transactions, with separate request and response so that the thread and memory path are not utilized during the entire transaction. Each thread and execution unit may be able to issue multiple loads into object memory fabric (local and remote) prior to receiving a response. Object memory fabric may be a pipeline to handle multiple requests and responses from multiple sources so that memory resources can be fully utilized. The execution unit may be able to accept responses in a different order from that the requests were issued. Execution units can switch to different threads to be fully utilized. Object memory fabric can implement policies to dynamically determine when to move objects or portions of objects versus moving a thread versus creating a thread.

Figure 19:
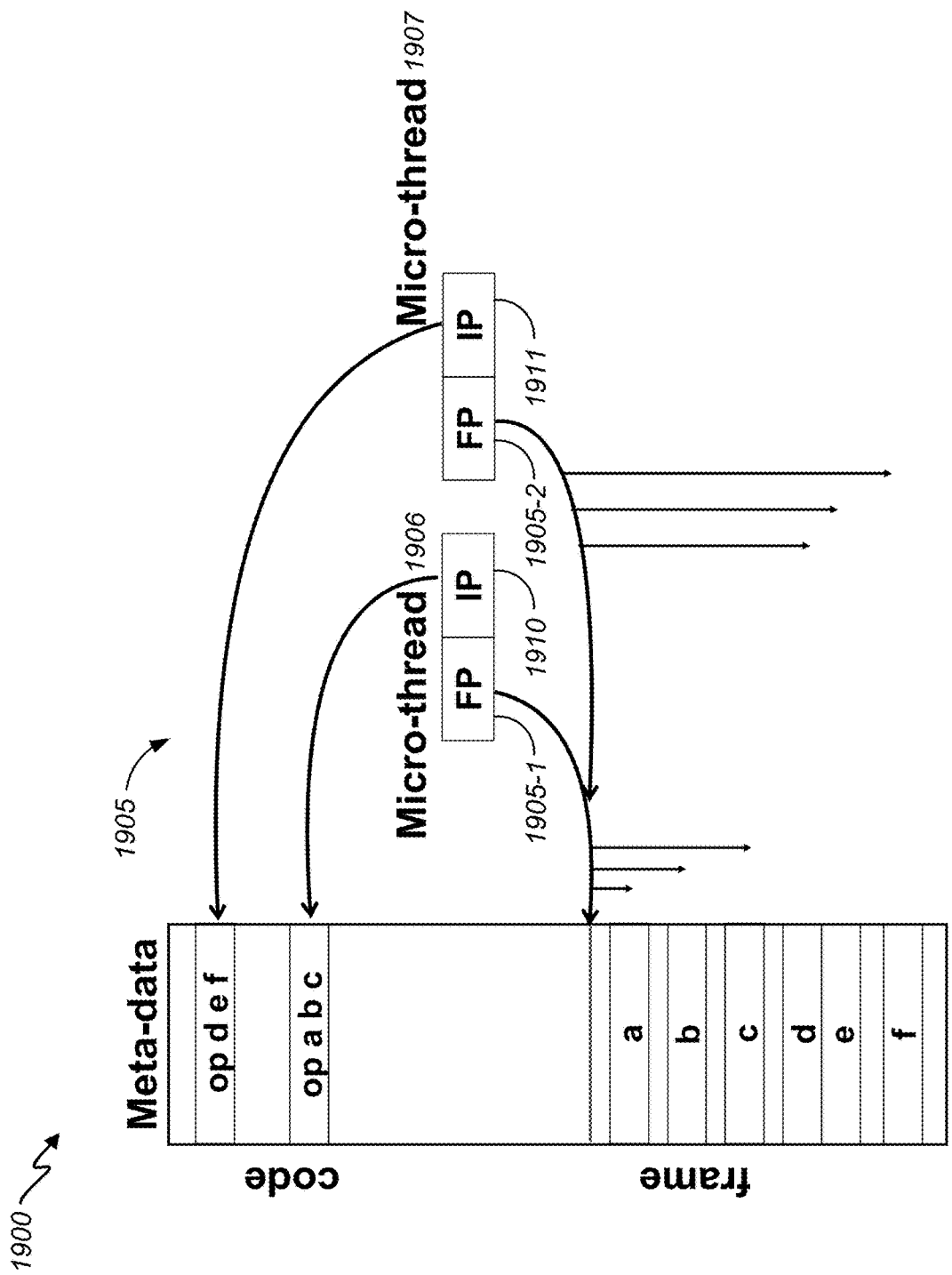
FIG. 19 is a block diagram illustrating aspects of an example micro-thread model, according to one embodiment of the present invention.

FIG. 19 is a block diagram illustrating aspects of an example micro-thread model 1900, in accordance with certain embodiments of the present disclosure. A thread may be the basic unit of execution. A thread may be defined at least in part by an instruction pointer (IP) and a frame pointer (FP). The instruction pointer may specify the current instruction that is being executed. The frame pointer may specify the location of the current execution state of the thread.

A thread can include multiple micro-threads. In the example depicted, the thread 1905 include micro-threads 1906 and 1907. However, a thread can include greater numbers of micro-threads. The micro-threads of a particular thread may share the same frame pointer but have different instruction pointers. In the example depicted, frame pointers 1905-1 and 1905-2 specify the same location, but instruction pointers 1910 and 1911 specify different instructions.

One purpose of micro-threads may be to enable data-flow like operation within a thread by enabling multiple asynchronous pending memory operations. Micro-threads may be created by a version of the fork instruction and may be rejoined by the join instruction. The extended instruction set may treat the frame pointer as a top of stack or register set by performing operations on offsets from the frame pointer. Load and store instructions may move data between the frame and the object.

Figure 20:
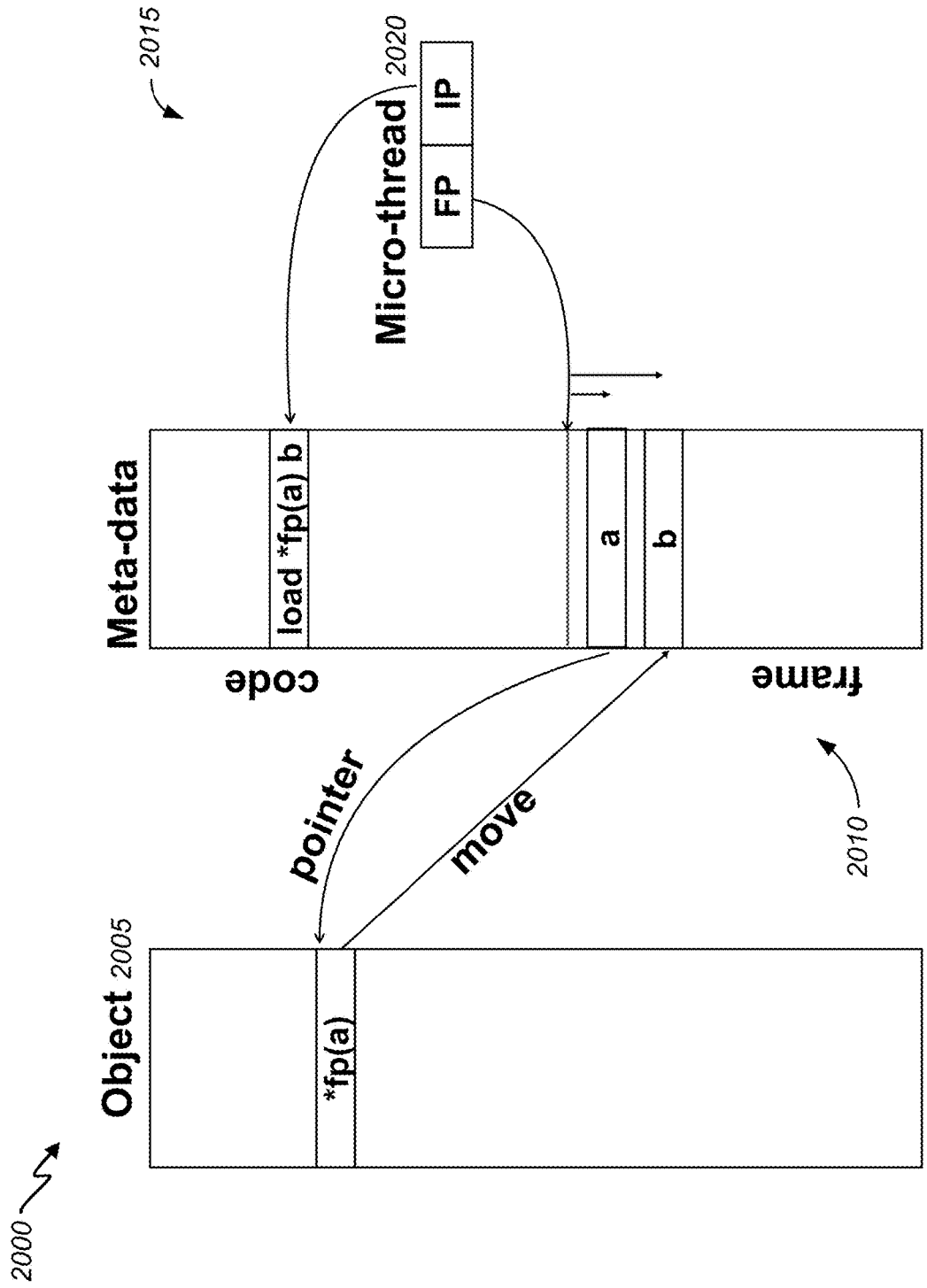
FIG. 20 is a block diagram illustrating aspects of an example relationship of code, frame, and object, according to one embodiment of the present invention.

FIG. 20 is a block diagram illustrating aspects of an example relationship 2000 of code, frame, and object, in accordance with certain embodiments of the present disclosure. Specifically, FIG. 20 illustrates how object data 2005 is referenced through the frame 2010. The default may be for load and store instructions to reference the object 2005 within local scope. Access to object 2005 beyond local scope can be given in a secure manner by access control and security policies. Once this access is given, objects 2005 within local and non-local scope can be accessed with equal efficiency. Object memory fabric encourages strong security by encouraging efficient object encapsulation. By sharing the frame, micro-threads provide a very lightweight mechanism to achieve dynamic and data-flow memory and execution parallelism, for example, on the order of 10-20 micro-threads or more. The multiple threads enable virtually unlimited memory based parallelism.

Figure 21:
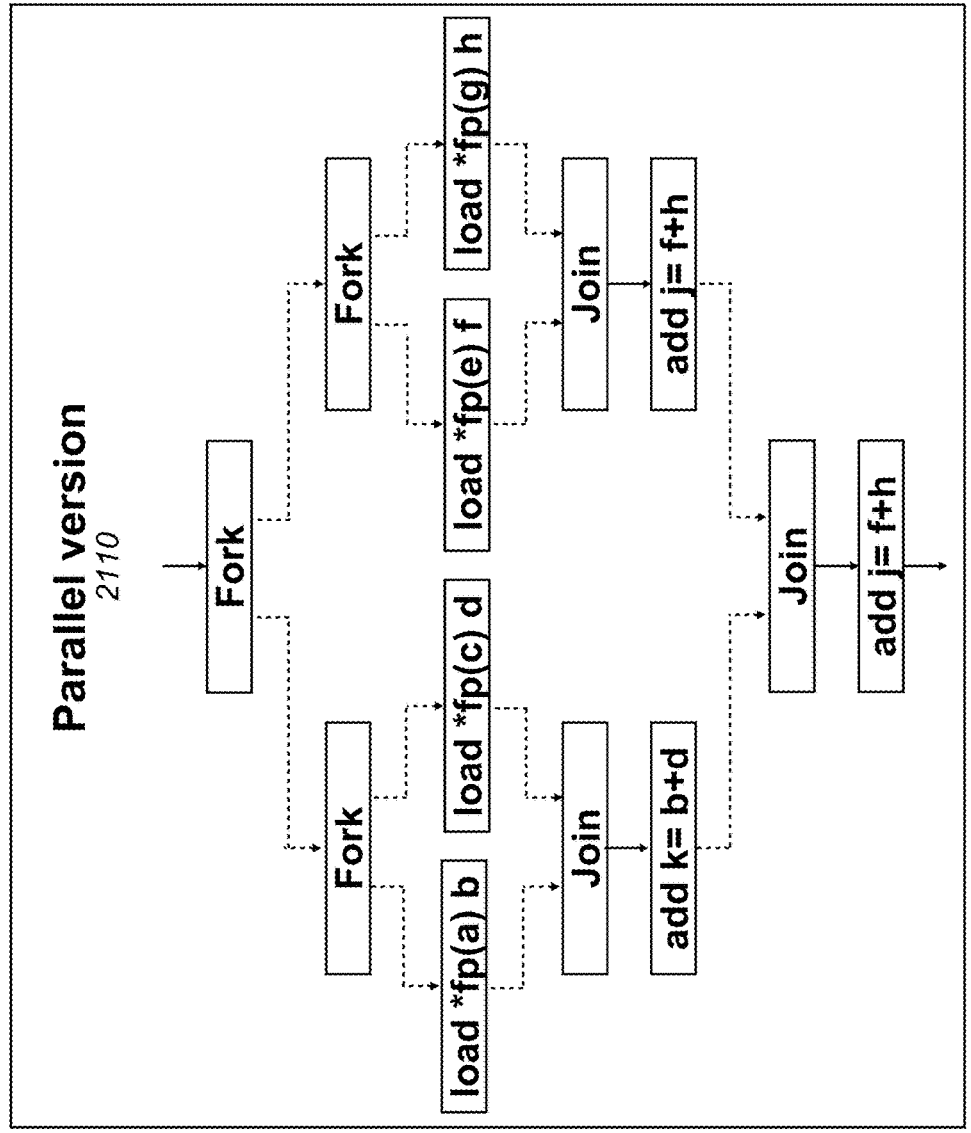
FIG. 21 is a block diagram illustrating aspects of an example of micro-thread concurrency, according to one embodiment of the present invention.
Figure 21:
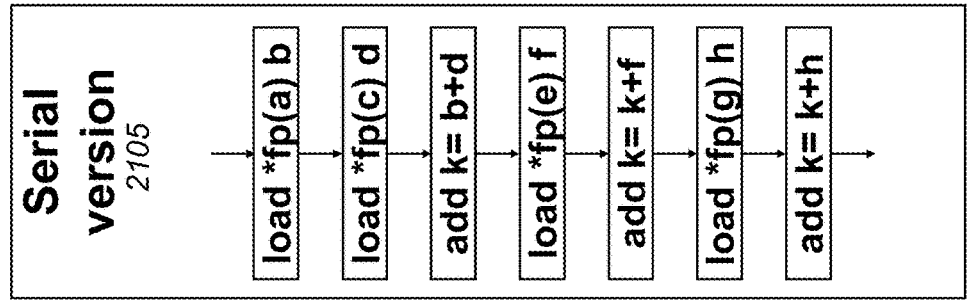

FIG. 21 is a block diagram illustrating aspects of an example of micro-thread concurrency 2100, in accordance with certain embodiments of the present disclosure. Specifically, FIG. 21 illustrates the parallel data-flow concurrency for a simple example of summing several randomly located values. A serial version 2105 and a parallel version 2110 are juxtaposed, in accordance with certain embodiments of the present disclosure. The parallel version 2110 can be almost n times faster since loads are overlapped in parallel.

Referring again to FIG. 20, the approach can be extended to interactive and recursive approaches in a dynamic manner. The advantages of prefetching ahead can now be achieved in cases with minimal locality without using prefetch. When an object is created, a single default thread 2015 (single micro-thread 2020 is created) may be waiting to start with a start message to the default thread 2015. The default thread 2015 then can create micro-threads with the thread or use a version of the fork instruction to create a new thread.

In some embodiments, both the instruction pointer and the frame pointer may be restricted to the expansion metadata region 1815 starting at block two and extending to SegSize/16. As the number of objects, object size, and object capacity increase, the thread and micro-thread parallelism may increase. Since threads and micro-threads may be tied to objects, as objects move and distribute so may the threads and micro-threads. Embodiments of object memory fabric may have the dynamic choice of moving objects or portions of objects to threads or distributing threads to the object(s). This may be facilitated by the encapsulated object methods implemented by the extended execution model.

As further noted above, embodiments of the present invention may also include an object memory fabric instruction set which can provide a unique instruction model based on triggers that support core operations and optimizations and allow the memory intensive portion of applications to be more efficiently executed in a highly parallel manner within the object memory fabric.

The object memory fabric instruction set can be data-enabling due to several characteristics. First, the sequence of instructions can be triggered flexibly by data access by a conventional processor, object memory fabric activity, another sequence or an explicit object memory fabric API call. Second, sequences can be of arbitrary length, but short sequences can be more efficient. Third, the object memory fabric instruction set can have a highly multi-threaded memory scale. Fourth, the object memory fabric instruction set can provide efficient co-threading with conventional processors.

Embodiments of the present invention include two categories of instructions. The first category of instructions is trigger instructions. Trigger instructions include a single instruction and action based on a reference to a specific Object Address (OA). A trigger instruction can invoke extended instructions. The second category of instructions is extended instructions. Extended instructions define arbitrary parallel functionality ranging from API calls to complete high level software functions. After a discussion of the instruction set model, these two categories of instructions will be discussed in turn. As noted, trigger instructions enable efficient single purpose memory related functions with no context outside of the trigger.

Using the metadata and triggers defined above an execution model based on memory data flow can be implemented. This model can represent a dynamic dataflow method of execution in which processes are performed based on actual dependencies of the memory objects. This provides a high degree of memory and execution parallelism which in turn provides tolerance of variations in access delays between memory objects. In this model, sequences of instructions are executed and managed based on data access. These sequences can be of arbitrary length but short sequences are more efficient and provide greater parallelism.

The extended instruction set enables efficient, highly threaded, in-memory execution. The instruction set gains it's efficiency in several manners. First, the instruction set can include direct object address manipulation and generation without the overhead of complex address translation and software layers to manage differing address spaces. Second, the instruction set can include direct object authentication with no runtime overhead that can be set based on secure third party authentication software. Third, the instruction set can include object related memory computing. For example, as objects move, the computing can move with them. Fourth, the instruction set can include parallelism that is dynamic and transparent based on scale and activity. Fifth, the instruction set can include an object memory fabric operation that can be implemented with the integrated memory instruction set so that memory behavior can be tailored to application requirements. Sixth, the instruction set can handle functionality for memory-intensive computing directory in the memory. This includes adding operations as memory is touched. Possible operations may include, but are not limited to, searching, image/signal processing, encryption, and compression. Inefficient interactions with conventional processors are significantly reduced.

The extended instruction capability can be targeted at memory intensive computing which is dominated with memory references for interesting size problems that are larger than caches or main memory, and simple operations based on these references. Some examples can include but are not limited to:

Defining API macros from conventional processors.

Defining the streams of interaction between hierarchical components of the object memory fabric. Each component can use a core set of instruction sequences to implement object memory fabric functionality.

Short sequences for macros to accelerate key application kernels such as BFS (Breath First Search), etc. BFS is a core strategy for searching a graph and is heavily used by graph databases and graph applications. For example, BFS is used across a wide variety of problem spaces to find a shortest or optimal path. It is a representative algorithm that illustrates the challenges for analyzing large scale graphs namely, no locality because graphs are larger than caches and main memory and virtually all the work is through memory references. In the case of BFS, the extended instruction capability described herein coupled with threads handles almost the entire BFS by recursive instantiation of threads to search adjacency lists based on graph size and available nodes. Highly parallel direct in-memory processing and high-level memory operations reduce software path-length. When combined with object memory fabric capability described above to bring all data in-memory and localize it ahead of use, the performance and efficiency per node is significantly increased.

Complete layer functionality, such as:
  Storage engine for hierarchical file system built on top of a flat object memory. A storage engine is, for example, what stores, handles, and retrieves the appropriate object(s) and information from within an object. For MySQL, the object may be a table. For a file system, the object may be a file or directory. For a graph database, the object may be a graph and information may consist of vertices and edges. Operators supported may be, for example, based on type of object (file, graph, SQL, etc.).
  Storage engine for structured database such as MySQL
  Storage engine for unstructured data such as graph database
  Storage engine for NoSQL key-value store
Complete application: Filesystem, structured database such as MySQL, unstructured data such as graph database or NoSQL key-value store User programmable.

According to one embodiment, a base trigger may invoke a single trigger action based on reference to a specific OA. There can be a single base trigger per OA. When greater than a single action is required, a trigger program can be invoked with the TrigFunction base trigger. Base triggers may consist of the instructions included in Table 7 below.

TABLE 7

Example Base Trigger Instruction Set

| Base Trigger | Description |
| --- | --- |
| Trigger | Fetch the block specified in the pointer at the specified object offset based on specified trigger conditions and actions |
| TrigFunction | Execute the trigger program starting at specified meta-data offset when the specified data object offset and specified trigger conditions. |

As noted, the Trigger instruction set can include fetching the block specified in the pointer at the specified object offset based on the specified trigger conditions and actions. The Trigger instruction binary format can be expressed as:

| Trigger | PtrType | TrigType | TrigAction | RefPolicy | ObjOffset |
| --- | --- | --- | --- | --- | --- |

An example set of operands for the Trigger instruction set are included in Tables 8-12 below.

TABLE 8

PrtType—Pointer Type

| Encoding | Symbol | Description |
| --- | --- | --- |
| | None | No pointer |
| | OA | Object Address |
| | ObjReg | Object Relative |
| | ObjVA | Object Virtual Address |
| | Reserved | Reserved |

TABLE 9

TrigType—Trigger Type

| Encoding | Symbol | Description |
| --- | --- | --- |
| | None | |
| | demand | Trigger by demand miss for block |
| | prefetch | Trigger by preached block |
| | access | Triggered by actual processor access to cache block |
| | emptyfill | Trigger by empty or fill instructions. Enables trigger on specific processor action |
| | any | Any trigger type |
| | reserved | Reserved |

TABLE 10

TrigAction—Trigger Action

| Encoding | Symbol | Description |
|---|---|---|
| | None | |
| | Cache | Trigger by demand miss for block |
| | Clean | Trigger by preached block |
| | reserved | Triggered by actual processor access to cache trigger |

TABLE 11

RefPolicy—Reference Count and Policy

| Encoding | Symbol | Description |
|---|---|---|
| | InitLowA | Initial reference count of prefetch page to low value, policy A |
| | InitMidA | Initial reference count of prefetch page to mid value, policy A |
| | InitHighA | Initial reference count of prefetch page to high value, policy A |
| | InitLowB | Initial reference count of prefetch page to low value, policy B |
| | InitMidB | Initial reference count of prefetch page to mid value, policy B |
| | InitHighB | Initial reference count of prefetch page to high value, policy B |

TABLE 12

ObjOffset—Object Offset

| Description |
|---|
| Object offset based on Object size. Trigger can be evaluated based on TriggerType and trigger action taken if TriggerType is satisfied is define by TriggerAction and RefPolicy. |

As noted, the TrigFunction (or TriggerFunct) instruction set can include executing the trigger program starting at specified meta-data offset when the specified data object offset and specified trigger conditions. TriggerFunct can enable more complex sequences than a single Trigger instruction to be executed. The TrigFunct Instruction binary format can be expressed as:

| TrigFunct | PtrType | TrigType | MetaDataOffset | ObjOffset |
|---|---|---|---|---|

An example set of operands for the Trigger instruction set are included in Tables 13-16 below.

TABLE 13

PrtType—Pointer Type

| Encoding | Symbol | Description |
|---|---|---|
| | None | No pointer |
| | OA | Object Address |
| | ObjReg | Object Relative |
| | ObjVA | Object Virtual Address |
| | Reserved | Reserved |

TABLE 14

TrigType—Trigger Type

| Encoding | Symbol | Description |
|---|---|---|
| | None | |
| | demand | Trigger by demand miss for block |
| | prefetch | Trigger by preached block |
| | access | Triggered by actual processor access to cache block |
| | emptyfill | Trigger by empty or fill instructions. Enables trigger on specific processor action |
| | any | Any trigger type |
| | reserved | Reserved |

TABLE 15

MetaDataOffset—Meta-Data Offset

Description

Meta-Data offset based on Object size. TriggerFunction can be evaluated based on TriggerType. The trigger program starting at MetaDataOffset is executed if TriggerType is satisfied.

TABLE 16

ObjOffset—Object Offset

Description

Object offset based on Object size. TriggerFunction can be evaluated based on TriggerType at ObjOffset. The trigger program starting at MetaDataOffset is executed if TriggerType is satisfied.

According to one embodiment, extended instructions can be interpreted in 64 bit word chunks in 3 formats, including short (2 instructions per word), long (single instruction per word), and reserved.

TABLE 17

Extended Instruction Format

| Format | bits[63:62] | bits[61:31] | bits[30:0] |
|---|---|---|---|
| Short | 0 × 00 | s_instruction[1] (31 bits) | s_instruction[0] (31 bits) |
| Long | 0 × 01 | l_instruction (62 bits) | |
| Reserved | 0 × 1* | | |

Generally speaking, triggers in combination with the extended instruction set can be used to define arbitrary, parallel functionality such as: direct object address manipulation and generation without the overhead of complex address translation and software layers to manage differing address space; direct object authentication with no runtime overhead that can be set based on secure 3rd party authentication software; object related memory computing in which, as objects move between nodes, the computing can move with them; and parallelism that is dynamically and transparent based on scale and activity. These instructions are divided into three conceptual classes: memory reference including load, store, and special memory fabric instructions; control flow including fork, join, and branches; and execute including arithmetic and comparison instructions.

A list of the different types of memory reference instructions are shown in Table 18 below.

TABLE 18

Memory Reference Instructions

| Instruction | [30:23] Encoding/ Options | [22:17] FPA | [16:11] FPB | [10:5] FPC | [4:0] Predicate |
|---|---|---|---|---|---|
| Pull | encode[7:0] | oid | offset | prior, plstate | src_pred |
| Push | encode[7:0] | oid | offset | prior, plstate | src_pred |
| Ack | encode[7:0] | oid | offset | | src_pred |
| Load | encode[4:0], osize[2:0] | src oid | src offset | dst fp | src_pred |
| Store | encode[4:0], osize[2:0] | dst oid | dst offset | src fp | src_pred |
| ReadPA | encode[7:0] | | src pa | dst fp | src_pred |

TABLE 18-continued

Memory Reference Instructions

| Instruction | [30:23] Encoding/ Options | [22:17] FPA | [16:11] FPB | [10:5] FPC | [4:0] Predicate |
|---|---|---|---|---|---|
| WritePA | encode[7:0] | | dst pa | src fp | src_pred |
| Empty | encode[7:0] | src oid | src offset | dst fp | src_pred |
| Fill | encode[7:0] | dst oid | dst offset | src fp | src_pred |
| Pointer | encode[5:0], opt[1:0] | dst oid | dst offset | | src_pred |
| PrePtrChn | encode[4:0], opt[2:0] | src oid | src offset st | src offset end | src_pred |
| ScanEF | encode[4:0], opt[2:0] | src oid | src offset | dst fp | src_pred |
| Create | | | | | src_pred |
| CopyObj | | | | | src_pred |
| CopyBlk | | | | | src_pred |
| Allocate | | | | | src_pred |
| Deallocate | | | | | src_pred |
| Destroy | | | | | src_pred |
| Persist | | | | | src_pred |
| AssocObj | | | | | src_pred |
| DeAssocObj | | | | | src_pred |
| AssocBlk | encode[5:0], opt[1:0] | src oid | src pa | dst ls | src_pred |
| DeAssocBlk | encode[7:0] | | | | src_pred |
| OpenObj | | | | | src_pred |
| OpenBlk | | | | | src_pred |
| Btree | | | | | src_pred |

The pull instruction may be utilized within the object memory fabric as a request to copy or move the specified block to (e.g. local) storage. The 4 k byte block operand in the object specified by src_oid at the object offset specified by src_offset may be requested with the state specified by pull_state with the priority specified by priority. The data may be subsequently moved by a push instruction. The Pull instruction binary format can be expressed as:

| Pull Instruction (binary format) | | | | | |
|---|---|---|---|---|---|
| [30:23] | [22:17] | [16:11] | [10:9] | [8:5] | [4:0] |
| src old | src offset | priority | pull_state | Predicate | |

An example set of operands for the Pull instruction set are included in Tables 19-23 below.

TABLE 19 predicate—Predicate

Description

Specifies a single bit predicate register. If the predicate value is true, the instruction executes, if false the instruction does not execute.

TABLE 20 src_oid—Source Object Identifier

Description

Index into the remote object table to specify the specific object identifier for this memory operation. Index value of 0 always corresponds to local object.

TABLE 21 src_off - Source Object Offset

Description

Specifies the unsigned offset from the thread frame pointer to read the source operand corresponding to the object offset.

TABLE 22 priority - How object memory fabric treats the requests

| Encoding | Symbol | Description |
|---|---|---|
| 0x0 | required-high | Highest priority handling of requests. Highest priority requests are always handled in the order received. |
| 0x1 | required-low | Can be optionally reordered with respect to required-high by object memory fabric only to prioritize required-high requests for short time periods. Must be completed. Typically most requests are of required-low priority. |
| 0x2 | optional-high | Requests can be considered optional by object memory fabric and can be delayed or deleted as required to manage object memory fabric load. Optionalhigh requests are always considered ahead of optional-low requests. |
| 0x3 | optional-low | Request can be considered optional by object memory fabric and can be delayed or deleted as required to manage object memory fabric load. Optional-low requests are treated at the lowest priority. Typically most optional requests are o the optional-low priority. |

TABLE 23 pull_state - Requested object memory fabric state for block
States can be listed in order of weakest to strongest. State can be returned in a stronger state.
Modified with respect to persistent memory can be indicated by _m suffix.

| Encoding | Symbol | Description |
|---|---|---|
| 0x0 | invalid | |
| 0x1 | snapcopy | Snapshot copy. This copy can be updated when a block is persisted. Utilized for object fault tolerance. Can be configured on an object basis redundancy and geographic dispersion. |
| 0x2 | shadcopy | Shadow copy. Can be updated on a lazy basis (eventually consistent), usually after a period of time or some number of writes and/or transactions. Can also be used for fault tolerant block copies. |
| 0x3 | copy | Read-only copy. Will be updated for owner modifications as they occur. Insures sequential consistency. |
| 0x4 | own_snapcopy | Exclusive owner with snapshot copy. Enables local write |
| 0x8 | own-snapcopy_m | privilege without any updates required. Snapshot copies may exist, but are only updated when corresponding block is persisted and through and push instruction with push_state = pstate_sncopy. |
| 0x5 | own_shadcopy | Non-exclusive owner with shadow copies. Enables write |
| 0x9 | own-shadcopy_m | privilege shadow copies or snapshot copies to exist which are updated from writes on a lazy basis- eventually consistent. |
| 0x6 | own_copy | Non-exclusive owner with copies. Enables write privilege and |
| 0xa | own_copy_m | copies, shadow copies or snapshot copies to exist which are updated from writes. Multiple writes to the same block can occur with a single update. |
| 0x7 | own | Exclusive owner. Enables local write privilege. No copies, |
| 0xb | own_m | shadow copies or snapshot copies exist. |

TABLE 23-continued pull_state - Requested object memory fabric state for block
States can be listed in order of weakest to strongest. State can be returned in a stronger state.
Modified with respect to persistent memory can be indicated by _m suffix.

| Encoding | Symbol | Description |
|---|---|---|
| 0xc | error | Error has been encountered on corresponding block. |
| 0xd-0xf | reserved | Reserved |

Push instruction may be utilized to copy or move the specified block from local storage to a remote location. The 4 k byte block operand in the object specified by src_oid at the object offset specified by src_offset may be requested with the state specified by pull_state with the priority specified by priority. The data may be previously requested by a pull instruction. The Push instruction binary format can be expressed as:

| Push Instruction (binary format) | | | | |
|---|---|---|---|---|
| [30:23] | [22:17] | [16:11] | [10:9] | [8:5] | [4:0] |
| src_oid | src_offset | priority | push_state | Predicate |

An example set of operands for the Push instruction set are included in Tables 24-28 below.

TABLE 24 predicate- Predicate
Description

Specifies a single bit predicate register. If the predicate value is true, the instruction executes, if false the instruction does not execute.

TABLE 25 src_oid - Source Object Identifier
Description

Index into the remote object table to specify the specific object identifier for this memory operation. Index value of 0 always corresponds to local object.

TABLE 26 src_off - Source Object Offset
Description

Specifies the unsigned offset from the thread frame pointer to read the source operand corresponding to the object offset.

TABLE 27 priority - How object memory fabric treats the requests

| Encoding | Symbol | Description |
|---|---|---|
| 0x0 | required-high | Highest priority handling of requests. Highest priority requests are always handled in the order received. |
| 0x1 | required-low | Can be optionally reordered with respect to required-high by object memory fabric only to prioritize required-high requests for short time periods. Must be completed. Typically most requests are of required-low priority. |
| 0x2 | optional-high | Requests can be considered optional by object memory fabric and can be delayed or deleted as required to manage object memory fabric load. Optional-high requests are always considered ahead of optional-low requests. |
| 0x3 | optional-low | Request can be considered optional by object memory fabric and can be delayed or deleted as required to manage object memory fabric load. Optional-low requests are treated at the lowest priority. Typically most optional requests are o the optional-low priority. |

TABLE 28 push_state - Requested object memory fabric state for block
Modified with respect to persistent memory can be indicated by _m suffix.

| Encoding | Symbol | Description |
|---|---|---|
| 0x0 | invalid | |
| 0x1 | snapcopy | Snapshot copy. This copy can be updated when a block is persisted. Utilized for object fault tolerance. Can be configured on an object basis redundancy and geographic dispersion. |
| 0x2 | shadcopy | Shadow copy. Will be updated on a lazy basis- eventually consistent, usually after a period of time or some number of writes and/or transaction. Can also be used for fault tolerant block copies. |
| 0x3 | copy | Read-only copy. Can be updated for owner modifications as they occur. Insures sequential consistency. |
| 0x4 | own_snapcopy | Exclusive owner with snapshot copy. Enables local write privilege without any updates required. Snapshot copies may exist, but are only updated when corresponding block is persisted and through and push instruction with push_state = pstate_sncopy. |
| 0x8 | own_snapcopy_m | |

TABLE 28-continued push_state - Requested object memory fabric state for block
Modified with respect to persistent memory can be indicated by _m suffix.

| Encoding | Symbol | Description |
|---|---|---|
| 0x5 | own_shadcopy | Non-exclusive owner with shadow copies. Enables write |
| 0x9 | own_shadcopy_m | privilege shadow copies or snapshot copies to exist which are updated from writes on a lazy basis- eventually consistent. |
| 0x6 | own_copy | Non-exclusive owner with copies. Enables write privilege and |
| 0xa | own_copy_m | copies, shadow copies or snapshot copies to exist which are updated from writes. Multiple writes to the same block can occur with a single update. |
| 0x7 | own | Exclusive owner. Enables local write privilege. No copies, |
| 0xb | own_m | shadow copies or snapshot copies exist. |
| 0xc | error | Error has been encountered on corresponding block. |
| 0xd-0xf | reserved | |

PushAck or Ack instruction may be utilized to acknowledge that the block associated with a Push has been accepted at one or more locations. The 4 k byte block operand in the object specified by src_oid at the object offset specified by src_offset may be acknowledged. The Ack instruction binary format can be expressed as:

Ack Instruction (binary format)

| [30:23] | [22:17] | [16:11] | [10:9] | [8:5] | [4:0] |
|---|---|---|---|---|---|
| | src_oid | src_offset | | | Predicate |

An example set of operands for the Push instruction set are included in Tables 29-31 below.

TABLE 29 predicate- Predicate
Description

Specifies a single bit predicate register. If the predicate value is true, the instruction executes, if false the instruction does not execute.

TABLE 30 src_oid - Source Object Identifier
Description

Index into the remote object table to specify the specific object identifier for this memory operation. Index value of 0 always corresponds to local object.

TABLE 31 src_off - Source Object Offset
Description

Specifies the unsigned offset from the thread frame pointer to read the source operand corresponding to the object offset.

The Load instruction set includes the osize operand in the object specified by src_oid at the object offset specified by src_offset. src_offset can be written to the word offset from the frame pointer specified by dst_fp. The load instruction ignores the empty state.

Load Instruction (binary format)

| [30:26] | [25:23] | [22:17] | [16:11] | [10:5] | [4:0] |
|---|---|---|---|---|---|
| osize | src_oid | src_offset | | dst_fp | Predicate |

An example set of operands for the Load instruction set are included in Tables 32-36 below.

TABLE 32 osize- Object operand size

| Encoding | Symbol | Description |
|---|---|---|
| 0x0 | 8 bit unsigned | 8 bit source is zero extended to 64 bit dst_fp |
| 0x1 | 16 bit unsigned | 16 bit source is zero extended to 64 bit dst_fp |
| 0x2 | 32 bit unsigned | 32 bit source is zero extended to 64 bit dst_fp |
| 0x3 | 64 bit | 64 bit source is loaded into 64 bit dst_fp |
| 0x4 | 8 bit signed | 8 bit source is sign extended to 64 bit dst_fp |
| 0x5 | 16 bit signed | 16 bit source is sign extended to 64 bit dst_fp |
| 0x6 | 32 bit signed | 32 bit source is sign extended to 64 bit dst_fp |
| 0x7 | reserved | |

TABLE 33 predicate- Predicate
Description

Specifies a single bit predicate register. If the predicate value is true, the instruction executes, if false the instruction does not execute.

TABLE 34 src_oid- Source Object Identifier
Description

Index into the remote object table to specify the specific object identifier for this memory operation. Index value of 0 always corresponds to local object.

TABLE 35 src_off- Source Object Offset  
Description

Specifies the unsigned offset from the thread frame pointer to read the source operand corresponding to the object offset.

TABLE 36 dst_fp- Destination offset from frame pointer  
Description

Specifies the unsigned offset from the thread frame pointer to write the source operand.

The Store instruction set includes the word specified by src_fp can be truncated to the size specified by osize and stored into the object specified by dst_oid at offset of dst_offst. For example, only the ssize bytes are stored. The store instruction ignores the empty state. The Store instruction binary format can be expressed as:

Store Instruction (binary format)

| [30:25] | [24:23] | [22:17] | [16:11] | [10:5] | [4:0] |
|---|---|---|---|---|---|
| ssize | dst_oid | dst_offset | src_fp | | Predicate |

An example set of operands for the Store instruction set are included in Tables 37-41 below.

TABLE 37 ssize- Store Object operand size

| Encoding | Symbol | Description |
|---|---|---|
| 0x0 | 8 bit | Least significant 8 bits are stored |
| 0x1 | 16 bit | Least significant 16 bits are stored |
| 0x2 | 32 bit | Least significant 32 bits are stored |
| 0x3 | 64 bit | Least significant 64 bits are stored |

TABLE 38 predicate- Predicate  
Description

Specifies a single bit predicate register. If the predicate value is true, the instruction executes, if false the instruction does not execute.

TABLE 39 dst_oid- Source Object Identifier  
Description

Index into the remote object table to specify the specific object identifier for this memory operation. Index value of 0 always corresponds to local object.

TABLE 40 dst_off- Source Object Offset  
Description

Specifies the unsigned offset from the thread frame pointer to read the source operand corresponding to the object offset.

TABLE 41 src_fp- Destination offset from frame pointer  
Description

Specifies the unsigned offset from the thread frame pointer to read the source operand.

The ReadPA instruction reads 64 bytes by physical address of the local memory module. The operand in the object specified by src_pa can be written to the word offset from the frame pointer specified by dst_fp. The ReadPA instruction binary format can be expressed as:

ReadPA Instruction (binary format)

| [30:26] | [25:23] | [22:17] | [16:11] | [10:5] | [4:0] |
|---|---|---|---|---|---|
| | | | src_pa | dst_fp | Predicate |

An example set of operands for the ReadPA instruction set are included in Tables 42-44 below.

TABLE 42 predicate- Predicate  
Description

Specifies a single bit predicate register. If the predicate value is true, the instruction executes, if false the instruction does not execute.

TABLE 43 src_pa- Source Physical Address  
Description

Specifies a physical address local to the current node/server.

TABLE 44 dst_fp- Destination offset from frame pointer  
Description

Specifies the unsigned offset from the thread frame pointer to write the source operand.

The WritePA instruction writes 64 bytes by physical address of the local memory module. The 64 bytes specified by src_fp is stored into the physical address specified by dst_pa. The ReadPA instruction binary format can be expressed as:

WritePA Instruction (binary format)

| [30:25] | [24:23] | [22:17] | [16:11] | [10:5] | [4:0] |
|---|---|---|---|---|---|
| | | | dst_pa | src_fp | Predicate |

An example set of operands for the WritePA instruction set are included in Tables 45-47 below.

TABLE 45 predicate- Predicate
Description

Specifies a single bit predicate register. If the predicate value is true, the instruction executes, if false the instruction does not execute.

TABLE 46 dst_pa- Destination physical address
Description

Specifies a physical address local to the current node/server

TABLE 47 src_fp- Source frame pointer
Description

Specifies the unsigned offset from the thread frame pointer to read the source operand.

Each word within an object memory fabric object can include an state to indicate empty or full states. An empty state conceptually means that the value of the corresponding word has been emptied. A full state conceptually means the value of the corresponding word has been filled. This state can be used by certain instructions to indivisibly insure that only a single thread can read or write the word. Empty instructions can operate similar to a load, as shown below in Table 48.

TABLE 48

| State | Result |
|---|---|
| Empty | Memory doesn't respond until word transitions to full state |
| Full | Completes as load and indivisibly transitions state to empty |

The osize operand in the object specified by src_oid at the object offset specified by src_offset can be written to the word offset from the frame pointer specified by dst_fp. The Empty instruction binary format can be expressed as:

| Empty Instruction (binary format) | | | | | |
|---|---|---|---|---|---|
| [30:26] | [25:23] | [22:17] | [16:11] | [10:5] | [4:0] |
| | | src_oid | src_offset | dst_fp | Predicate |

An example set of operands for the Empty instruction set are included in Tables 49-52 below.

TABLE 49 predicate- Predicate
Description

Specifies a single bit predicate register. If the predicate value is true, the instruction executes, if false the instruction does not execute.

TABLE 50 src_oid- Source Object Identifier
Description

Index into the remote object table to specify the specific object identifier for this memory operation. Index value of 0 always corresponds to local object.

TABLE 51 src_off- Source Object Offset
Description

Specifies the unsigned offset from the thread frame pointer to read the source operand corresponding to the object offset.

TABLE 52 dst_fp- Destination offset from frame pointer
Description

Specifies the unsigned offset from the thread frame pointer to write the source operand.

Each word within a memory fabric object can include an state to indicate empty or full states. Empty state conceptually means that the value of the corresponding word has been emptied. Full state conceptually means the value of the corresponding word has been filled. This state can be used by certain instructions to indivisibly insure that only a single thread can read or write the word. The Fill instruction binary format can be expressed as:

| Fill Instruction (binary format) | | | | | |
|---|---|---|---|---|---|
| [30:25] | [24:23] | [22:17] | [16:11] | [10:5] | [4:0] |
| | | dst_oid | dst_offset | src_fp | Predicate |

Fill instruction operates similar to a store, as shown below in Table 53.

TABLE 53

| State | Result |
|---|---|
| Empty | The fill instruction completes as a store and transitions state to full. |
| Full | The fill instruction |

The word specified by src_fp can be stored into the object specified by dst_oid at offset of dst_offst. Only the ssize bytes are stored. Store ignores empty state. An example set of operands for the Fill instruction set are included in Tables 54-57 below.

TABLE 54 predicate- Predicate
Description

Specifies a single bit predicate register. If the predicate value is true, the instruction executes, if false the instruction does not execute.

TABLE 55 dst_oid- Source Object Identifier
Description

Index into the remote object table to specify the specific object identifier for this memory operation. Index value of 0 always corresponds to local object.

TABLE 56 dst_off- Source Object Offset
Description

Specifies the unsigned offset from the thread frame pointer to read the source operand corresponding to the object offset.

TABLE 57 src_fp- Destination offset from frame pointer
Description

Specifies the unsigned offset from the thread frame pointer to read the source operand.

The Pointer instruction set can specify to the object memory fabric that a pointer of ptr_type can be located in the object specified by scrod at object offset specified by src_offset. This information can be utilized by the object memory fabric to pre-stage data movement. The Pointer instruction binary format can be expressed as:

| Pointer Instruction (binary format) | | | | | |
|---|---|---|---|---|---|
| [30:26] | [24:23] | [22:17] | [16:11] | [10:5] | [4:0] |
|  | ptr_type | src_oid | src_offset |  | Predicate |

An example set of operands for the Pointer instruction set are included in Tables 58-61 below.

TABLE 58 ptr_type- Pointer Type

| Encoding | Symbol | Description |
|---|---|---|
| 0x0 | none | No pointer at this object offset |
| 0x1 | MF Address | Full 128 Memory Fabric Address pointer at this object offset |
| 0x2 | Object Relative | 64 bit object relative pointer at this object offset. The range of the object relative pointer can be determined by object size |
| 0x3 | Object-VA | 64 bit object virtual address pointer at this object offset. The range of the object relative pointer can be determined by object size. |

TABLE 59 predicate- Predicate
Description

Specifies a single bit predicate register. If the predicate value is true, the instruction executes, if false the instruction does not execute.

TABLE 60 src_oid- Source Object Identifier
Description

Index into the remote object table to specify the specific object identifier for this memory operation. Index value of 0 always corresponds to local object.

TABLE 61 src_off- Source Object Offset
Description

Specifies the unsigned offset from the thread frame pointer to read the source operand corresponding to the object offset.

The Prefetch Pointer Chain instruction set can be based on the policy specified by policy in the object specified by src_oid, in the range specified by src_offset_st to src_offset_end. The osize operand in the object specified by src_oid at the object offset specified by src_offset can be written to the word offset from the frame pointer specified by dst_fp. Load ignores empty state. The PrePtrChn instruction binary format can be expressed as:

| PrePtrChn Instruction (binary format) | | | | | |
|---|---|---|---|---|---|
| [30:26] | [25:23] | [22:17] | [16:11] | [10:5] | [4:0] |
|  | policy | src_oid | src_offset_st | src_offset_end | src_pred |

An example set of operands for the Prefetch Pointer Chain instruction set are included in Tables 62-66 below.

TABLE 62

Policy- Prefetch PointerChain Policy

| Encoding | Symbol | Description |
|---|---|---|
| 0x0 | none_ahead | Just prefetch blocks corresponding to pointers in chain |
| 0x1 | breath_1ahead | Breath first prefetch. Fetch each pointer in chain then fetch one ahead of each pointer |
| 0x2 | breath_2ahead | Breath first prefetch. Fetch each pointer in chain then recursively fetch two ahead of each pointer |
| 0x3 | breath_3ahead | Breath first prefetch. Fetch each pointer in chain then recursively fetch three ahead of each pointer |
| 0x4 | reserved | reserved |
| 0x5 | depth_1ahead | Depth first prefetch 1 deep. |

TABLE 62-continued

Policy- Prefetch PointerChain Policy

| Encoding | Symbol | Description |
|---|---|---|
| 0x6 | depth_2ahead | Depth first prefetch 2 deep. |
| 0x7 | depth_3ahead | Depth first prefetch 3 deep. |

TABLE 63 predicate- Predicate Description

Specifies a single bit predicate register. If the predicate value is true, the instruction executes, if false the instruction does not execute.

TABLE 64 src_oid- Source Object Identifier Description

Index into the remote object table to specify the specific object identifier for this memory operation. Index value of 0 always corresponds to local object.

TABLE 65 src_off_st- Source Object Offset Description

Specifies the unsigned offset from the thread frame pointer to read the source operand corresponding to starting object offset..

TABLE 66 src_off_end- Destination offset from frame pointer Description

Specifies the unsigned offset from the thread frame pointer to read the source operand corresponding to ending object offset.

The Scan and Set Empty or Full instruction set can be initialed in an object specified by src_oid, at offset specified by src_offset with specified policy. Scan can be used to do a breath first or depth first search and empty or fill the next available location. The ScanEF instruction binary format can be expressed as:

ScanEF Instruction (binary format)

| [30:26] | [25:23] | [22:17] | [16:11] | [10:5] | [4:0] |
|---|---|---|---|---|---|
| | policy | src_oid | src_offset | dst_fp | Predicate |

An example set of operands for the Scan and Set Empty or Full instruction set are included in Tables 67-71 below.

TABLE 67 osize- Object operand size

| Encoding | Symbol | Description |
|---|---|---|
| 0x0 | scan_empty | Scan object until empty state and set to full. Terminates on full with null value. The object offset when the condition was met can be placed into dst_fp. If the scan terminated |

TABLE 67-continued osize- Object operand size

| Encoding | Symbol | Description |
|---|---|---|
| | | without condition being met, a value of −0x1 can be placed into dst_fp. |
| 0x1 | scan_full | Scan object to full state and set to empty. Terminates on empty with null value. The object offset when the condition was met can be placed into dst_fp. If the scan terminated without condition being met, a value of −0x1 can be placed into dst_fp. |
| 0x2 | ptr_full | Follow pointer chain until full and set to empty. Terminates on null pointer. The object offset when the condition was met can be placed into dst_fp. If the scan terminated without condition being met, a value of −0x1 can be placed into dst_fp. |
| 0x3 | ptr_empty | Follow pointer chain until empty and set to full. Terminates on null pointer. The object offset when the condition was met can be placed into dst_fp. If the scan terminated without condition being met, a value of −0x1 can be placed into dst_fp. |

TABLE 68 predicate- Predicate Description

Specifies a single bit predicate register. If the predicate value is true, the instruction executes, if false the instruction does not execute.

TABLE 69 src_oid- Source Object Identifier Description

Index into the remote object table to specify the specific object identifier for this memory operation. Index value of 0 always corresponds to local object.

TABLE 70 src_off- Source Object Offset Description

Specifies the unsigned offset from the thread frame pointer to read the source operand corresponding to the object offset.

TABLE 71 dst_fp- Destination offset from frame pointer Description

Specifies the object offset when the condition was met. If the scan terminated without condition being met, a value of −0x1 can be placed into dst_fp.

The Create instruction set includes an object memory fabric object of the specified Obj Size with an object ID of OA and initialization parameters of DataInit and Type. No data block storage can be allocated and storage for the first meta-data block can be allocated. The Create instruction binary format can be expressed as:

| Create | Type | Redundancy | ObjSize | OID |
|---|---|---|---|---|

An example set of operands for the Create instruction set are included in Tables 72-75 below.

TABLE 72

Type

| Encoding | Symbol | Description |
|---|---|---|
| | volatile | temp object that does not need to be persisted |
| | persistant | object must be persisted |
| | reserved | reserved |

TABLE 73

Redundancy

| Encoding | Symbol | Description |
|---|---|---|
| | nonredundant | Object memory fabric does not provide object redundancy |
| | redundant | Object memory fabric guarantees that object can be persisted in at least 2 separate nodes |
| | remote_redundant | Object memory fabric guarantees that object can be persisted in at least 2 separate nodes which are remote with respect to each other |
| | reserved | reserved |

TABLE 74

ObjSize- Object Size
Description

Specifies the object size.

TABLE 75

OID- Object Id
Description

Object memory fabric object ID which also the starting address for the object.

The CopyObj instruction set includes copies source object specified by SOID to destination object specified by DOID. If DOID is larger object than SOID, all DOID blocks beyond SOID size are copied as unallocated. If SOID is larger object than DOID, then the copy ends at DOID size. The CopyObj instruction binary format can be expressed as:

| CopyObj | Ctype | SOID | DOID |
|---|---|---|---|

An example set of operands for the CopyObj instruction set are included in Tables 76-78 below.

76. Ctype- Copy type

| Encoding | Symbol | Description |
|---|---|---|
| | copy | One time copy from SOID to DOID. Allocated blocks are one time copied and non-allocated block SOID blocks become unallocated DOID blocks, object memory fabric has the option of treating the copy initially as cow and executing the copy in the background. |

76. Ctype- Copy type

| Encoding | Symbol | Description |
|---|---|---|
| | cow | All allocated blocks are treated as copy on write. Newly allocated blocks after cow are considered modified. |
| | reserved | reserved |

TABLE 77

SOID- Source Object ID
Description

Object memory fabric object ID which is the source for the copy.

TABLE 78

DOID- Destination Object ID
Description

Object memory fabric object ID which is the destination for the copy.

The CopyBlk instruction set includes copies cnum source blocks starting at SourceObjectAddress (SOA) to destination starting at DestinationObjectAddress (DOA). If cnum blocks extends beyond the object size associated with SOA, then the undefined blocks are copied as unallocated. The CopyBlk instruction binary format can be expressed as:

| CopyBlk | ctype | cnum | SOA | DOA |
|---|---|---|---|---|

An example set of operands for the CopBlk instruction set are included in Tables 79-82 below.

TABLE 79

Ctype- Copy type

| Encoding | Symbol | Description |
|---|---|---|
| | copy | One time copy of cnum blocks starting at SOA to destination blocks starting at DOA. Allocated blocks are one time copied and non-allocated SOA blocks become unallocated SOA blocks, object memory fabric has the option of treating the copy initially as cow and executing the copy in the background. |
| | cow | All allocated blocks are treated as copy on write. Newly allocated blocks after cow are considered modified. |
| | reserved | reserved |

TABLE 80 cnum- Number of blocks to copy
Description

Specifies the number of blocks to copy.

TABLE 81

SOA- Source object memory fabric Block Object Address
Description

Object memory fabric block object address which is the source for the copy.

TABLE 82

DOA- Destination object memory fabric Block Object Address
Description

Object memory fabric block object address which is the destination for the copy.

The Allocate instruction set includes storage to the object specified by OID. The Allocate instruction binary format can be expressed as:

| Allocate | init | ASize | OID |
|---|---|---|---|

An example set of operands for the Allocate instruction set are included in Tables 83-85 below.

TABLE 83 init- Initialization

| Encoding | Symbol | Description |
|---|---|---|
| | zero | Zero all data |
| | random | Random data. |
| | reserved | reserved |

TABLE 84

ASize- Allocation Size

| Encoding | Symbol | Description |
|---|---|---|
| | block | single block |
| | object | full object |
| | size21 | $2^9$ blocks |
| | size30 | $2^{18}$ blocks |
| | size39 | $2^{27}$ blocks |

TABLE 85

OID- Object ID
Description

Object memory fabric object ID for which storage is allocated.

The Deallocate instruction set includes storage for cnum blocks starting at OA. If deallocation reaches the end of the object, the operation ends. The Deallocate instruction binary format can be expressed as:

| Deallocate | cnum | OA |
|---|---|---|

An example set of operands for the Deallocate instruction set are included in Tables 86 and 87 below.

TABLE 86 cnum- Number of blocks to copy
Description

Specifies the number of blocks to deallocate.

TABLE 87

OA- Object Address
Description

Object memory fabric block object address which is starting block number for deallocation.

The Destroy instruction set includes completely deleting all data and meta-data corresponding to object specified by OID. The Destroy instruction binary format can be expressed as:

| Destroy | OID |
|---|---|

An example set of operands for the Destroy instruction set are included in Table 88 below.

TABLE 88

OID - Object ID
Description

Object ID of the object to be deleted.

The Persist instruction set includes persisting any modified blocks for the specified OID. The Persist instruction binary format can be expressed as:

| Persist | OID |
|---|---|

An example set of operands for the Persist instruction set are included in Table 89 below.

TABLE 89

OID - Object ID
Description

Object ID of the object to be persisted.

The AssocObj instruction set includes associating the object OID with the VaSegment and ProcessID. Associating an OID and VaSegment enables ObjectRelative and ObjectVA addresses to be properly accessed by the object memory fabric. The AssocObj instruction binary format can be expressed as:

| AssocObj | OID | ProcessID | VaSegment |
|---|---|---|---|

An example set of operands for the AssocObj instruction set are included in Tables 90-92 below.

TABLE 90

| OID - Object ID |
| --- |
| Description |
| Object ID of the object to be associated. |

TABLE 91

| ProcessID - Process ID |
| --- |
| Description |
| Process ID associated with the VaSegment. |

TABLE 92

| OID - Object ID |
| --- |
| Description |
| Object ID of the object to be associated. |

The DeAssocObj instruction set includes de-associating the object OID with the VaSegment and ProcessID. An error can be returned if the ProcessID and VaSegment do not match those previously associated with the OID. The DeAssocObj instruction binary format can be expressed as:

| DeAssocObj | OID | ProcessID | VaSegment |
| --- | --- | --- | --- |

An example set of operands for the DeAssocObj instruction set are included in Tables 93-95 below.

TABLE 93

| OID - Object ID |
| --- |
| Description |
| Object ID of the object to be de-associated. |

TABLE 94

| ProcessID - Process ID |
| --- |
| Description |
| Process ID associated with the VaSegment. |

TABLE 95

| OID - Object ID |
| --- |
| Description |
| Object ID of the object to be de-associated. |

The AssocBlk instruction set includes associating the block OA with the local physical address PA. This enables an Object Memory to associate an object memory fabric block with a PA block for local processor access. The AssocBlk instruction binary format can be expressed as:

| AssocBlk | place | OA | PA | LS[15:00] |
| --- | --- | --- | --- | --- |

An example set of operands for the AssocBlk instruction set are included in Tables 96-99 below.

TABLE 96 place - Physical Placement

| Encoding | Symbol | Description |
| --- | --- | --- |
| 0x0 | match | Associate PA must match physical DIMM with allocated block. If currently not allocated on any physical DIMM will associate and allocate on DIMM specified. Returns status within ack_detail package file of SUCCESS or NOT_ALLOC If not allocated the LS field provides a bitmap of current physical |
| 0x1 | force | Force associate and implicit allocate on DIMM specified. |
| 0x2 | dynamic | Memory fabric associates a free PA with the OA and returns PA. |
| 0x3 | reserved | reserved |

TABLE 97

| OA - object memory fabric Block Object Address |
| --- |
| Description |
| Object ID of the object to be associated. |

TABLE 98

| PA - Physical block Address |
| --- |
| Description |
| Local physical block address of the block to be associated. |

TABLE 99

| LS[15:00] - Local State[15:00] |
| --- |
| Description |
| Valid for ackdetail::NOT_ASSOC which indicates that the OA is allocated on a different physical DIMM. Local state specifies a single bit indicating which DIMM(s) have currently allocated the corresponding OA. Value is return in operand3, with bit0 corresponding to DIMM0. |

The DeAssocBlk instruction set includes de-associating the block OA with the local physical address PA. This OA will then no longer be accessible from a local PA. The DeAssocBlk instruction binary format can be expressed as:

| DeAssocBlk | OA | PA |
| --- | --- | --- |

An example set of operands for the DeAssocBlk instruction set are included in Tables 100 and 101 below.

TABLE 100

| OA - object memory fabric Block Object Address |
| --- |
| Description |
| Block object address of block to be de-associated. |

TABLE 101

| PA - Physical block Address |
| --- |
| Description |
| Local physical block address of the block to be de-associated. Corresponds to Operand2 within the package header. |

The OpenObj instruction set includes caching the object specified by OID in the manner specified by TypeFetch and CacheMode on an advisory basis. The OpenObj instruction binary format can be expressed as:

| OpenObj | TypeFetch | CacheMode | OID |
|---------|-----------|-----------|-----|

An example set of operands for the OpenObj instruction set are included in Tables 102-104 below.

TABLE 102

| OID - Object ID |
|---|
| Description |
| Object ID of the object to be associated. |

TABLE 103

TypeFetch- Type of Prefetch

| Encoding | Symbol | Description |
|---|---|---|
| | MetaData | Cache MetaData only |
| | First 8 Blocks | Cache MetaData and first 8 data blocks |
| | First 32 Blocks | Cache MetaData and first 32 data blocks |
| | Reserved | Reserved |

TABLE 104

CacheMode- Advisory Block State

| Encoding | Symbol | Description |
|---|---|---|
| | copy | Copy block state if possible. All updates can be propagated immediately |
| | shadcopy | Shadow copy block state if possible. Updates can be propagated in a lazy manner |
| | snapcopy | Snapshot copy. Copy only updated on persist. |
| | own | Own block state is possible. No other copies in memory fabric |
| | owncopy | Own block state with 0 or more copies if possible. |
| | own_shadcopy | Own block state with 0 or more shadow copies (no copy block state) |
| | own_snapcopy | Own block state with 0 or more snapshot copes. (no copy or shadow copy block state) |

The OpenBlk instruction set includes caching the block(s) specified by OID in the manner specified by TypeFetch and CacheMode. The prefetch terminates when it's beyond the end of the object. The OpenBlk instruction binary format can be expressed as:

| OpenBlk | TypeFetch | CacheMode | OID |
|---------|-----------|-----------|-----|

An example set of operands for the OpenBlk instruction set are included in Tables 105-107 below.

TABLE 105

| OID - Object ID |
|---|
| Description |
| Object ID of the object to be associated. |

TABLE 106

TypeFetch- Type of Prefetch

| Encoding | Symbol | Description |
|---|---|---|
| | 1 Block | Cache MetaData only |
| | First 8 Blocks | Cache MetaData and 8 data blocks starting at OID |
| | First 32 Blocks | Cache MetaData and 32 data blocks starting at OID |
| | Reserved | Reserved |

TABLE 107

CacheMode- Advisory Block State

| Encoding | Symbol | Description |
|---|---|---|
| | copy | Copy block state if possible. All updates can be propagated immediately |
| | shadcopy | Shadow copy block state if possible. Updates can be propagated in a lazy manner |
| | snapcopy | Snapshot copy. Copy only updated on persist. |
| | own | Own block state is possible. No other copies in memory fabric |
| | owncopy | Own block state with 0 or more copies if possible. |
| | own_shadcopy | Own block state with 0 or more shadow copies (no copy block state) |
| | own_snapcopy | Own block state with 0 or more snapshot copes. (no copy or shadow copy block state) |

An example set of operands for the Control Flow (short instruction format) instruction set are included in Table 108 below.

TABLE 108

| | [30:23] | [22:17] | [16:11] | [10:5] | [4:0] |
|---|---|---|---|---|---|
| Instruction | Encoding/Options | FPA | FPB | FPC | Predicate |
| Fork | encode[6:0], fpobj[0] | IP | FP | count | src_pred |
| Join | encode[6:0], fpobj[0] | IP | FP | count | src_pred |
| Branch | | | | disp[5:0] | src_pred |
| BranchLink | | | | | src_pred |

The fork instruction set provides an instruction mechanism to create a new thread or micro-thread. Fork specifies the New Instruction Pointer (NIP) and new Frame Pointer for the newly created thread. At the conclusion of the fork instruction, the thread (or micro-thread) which executed the instruction and the new thread (e.g. micro-thread) are running with fork_count (count) incremented by one. If the new FP has no relationship to the old FP, it may be considered a new thread, or otherwise a new micro-thread. The Fork instruction binary format can be expressed as:

| Fork Instruction (binary format) | | | | | |
|---|---|---|---|---|---|
| [30:24] | [23] | [22:17] | [16:11] | [10:5] | [4:0] |
| | where | NIP | NFP | count | Predicate |

An example set of operands for the Fork instruction set are included in Tables 109-113 below.

TABLE 109 where-Where fork join count can be stored

| Encoding | Symbol | Description |
|---|---|---|
| 0x0 | frame | Fork count can be stored directly on the frame. Faster, but only accessible to micro-threads within the same thread on a single node |
| 0x1 | object | Fork count can be stored within the object which enables distributed operation. |

TABLE 110 predicate- Predicate Description

Specifies a single bit predicate register. If the predicate value is true, the instruction executes, if false the instruction does not execute.

TABLE 111

NIP- New micro-thread Instruction Pointer Description

Specifies the unsigned offset from the thread frame pointer to read the IP of the newly spawned micro-thread. The IP can be a valid object meta-data expansion space address.

TABLE 112

New micro-thread Frame Pointer Description

Specifies the unsigned offset from the thread frame pointer to read the FP of the newly spawned micro-thread. The FP can be a valid object meta-data expansion space address.

TABLE 113 count- Fork count variable Description

The fork_count variable keeps track of the number of forks that have not been paired with joins. If the where options indicates frame, the count specifies the unsigned offset from the thread frame pointer where fork_count can be located. If the where option indicates object, the count specifies the unsigned offset from the thread frame pointer to read the pointer to fork_count.

Join is the instruction mechanism to create a new thread or micro-thread. The join instruction set enables a micro-thread to be retired. The join instruction decrements fork_count (count) and fork_count is greater than zero there is no further action. If fork_count is zero, then this indicates the micro-thread executing the join is the last spawned micro-thread for this fork_count and execution continues at the next sequential instruction with the FP specified by FP. The Join instruction binary format can be expressed as:

| [30:24] | [23] | [22:17] | [16:11] | [10:5] | [4:0] |
|---|---|---|---|---|---|
| | where | | FP | count | Predicate |

An example set of operands for the Join instruction set are included in Tables 114-117 below.

TABLE 114 where-Where fork join count can be stored

| Encoding | Symbol | Description |
|---|---|---|
| 0x0 | frame | Fork count can be stored directly on the frame. Faster, but only accessible to micro-threads within the same thread on a single node |
| 0x1 | object | Fork count can be stored within the object which enables distributed operation. |

TABLE 115 predicate- Predicate Description

Specifies a single bit predicate register. If the predicate value is true, the instruction executes, if false the instruction does not execute.

TABLE 116

NFP- Post join Frame Pointer Description

Specifies the unsigned offset from the thread frame pointer to read the FP of the post join micro-thread. The FP can be a valid object meta-data expansion space address.

TABLE 117 count- Fork count variable Description

The fork_count variable keeps track of the number of forks that have not been paired with joins. If the where options indicates frame, the count specifies the unsigned offset from the thread frame pointer where fork_count can be located. If the where option indicates object, the count specifies the unsigned offset from the thread frame pointer to read the pointer to fork_count.

The branch instruction set allows for branch and other conventional instructions to be added. The Branch instruction binary format can be expressed as:

| Branch Instruction (binary format) | | | | | |
|---|---|---|---|---|---|
| [30:24] | [23] | [22:17] | [16:11] | [10:5] | [4:0] |
| | | | | | Predicate |

An example set of operands for the Execute (short instruction format) instruction set are included in Table 118 below

TABLE 118

Short Instruction Format-Execute

| | [30:23] | [22:17] | [16:11] | [10:5] | [4:0] |
|---|---|---|---|---|---|
| Instruction | Encoding/Options | FPA | FPB | FPC | Predicate |
| Add | encode[5:0], esize[1:0] | srcA | srcB | dst | src_pred |
| Compare | encode[5:0], esize[1:0] | srcA | srcB | dpred | src_pred |

Object Memory Fabric Streams and APIs

Object memory fabric streams facilitate a mechanism that object memory fabric utilizes to implement a distributed coherent object memory with distributed object methods. According to certain embodiments, object memory fabric streams may define a general mechanism that enables hardware and software modules in any combination to communicate in a single direction. Ring streams may support a pipelined ring organization, where a ring of two modules may be just two one-way streams.

A stream format API may be defined at least in part as two one-way streams. Thus, as part of providing the infinite memory fabric architecture in some embodiments, communication between two or more modules may be executed with the stream format API, which at least partially defines the communication according to the object memory fabric stream protocol so that the communication is based on different unidirectional streams.

Each stream may be logically composed of instruction packages. Each instruction package may contain an extended instruction and associated data. In some embodiments, each stream may interleave sequences of requests and responses. Streams may include short and long packages. The short package may be referenced herein as simply an "instruction package," which may be descriptive of the instruction packages containing bookkeeping information and commands. The short package may include either the Pull or Ack instructions and object information. The long package may be referenced herein as an "object data package," which may be descriptive of the object data packages carrying object data, as distinguished from the short package ("instruction packages") which do not carry object data. The object data package may include one or more push instructions, object information, and a single block specified by the object address space block address. All other instructions and data may be communicated within the block.

In some embodiments, for example, the short package may be 64 bytes (1 chunk), and the long package may be 4160 bytes (65 chunks). However, other embodiments are possible. In some embodiments, there may be a separator (e.g., a 1 byte separator). Object memory fabric streams may be connectionless in a manner similar to UDP and may be efficiently embedded over UDP or a UDP-type protocol having certain characteristics common with, or similar to, UDP. In various embodiments, attributes may include any one or combination of:

- Transaction-oriented request-response to enable efficient movement of object memory fabric-named (e.g., 128-bit object memory fabric object address) data blocks.
- Packages may be routed based on the location of block, the request object memory fabric object address (object address space), and object memory fabric instruction—not be based on a static IP-like node address.
- Coherency and object memory fabric protocol may be implemented directly.
- Reliability may be provided within the object memory fabric end-to-end protocol.
- Connectionless.
- The only state in the system may be the individual block coherency state at each end node, which may be summarized at object memory fabric routing nodes for efficiency.

Table 119 below identifies non-limiting examples of various aspects of a short package definition, in accordance with certain embodiments of the present disclosure.

TABLE 119

Short Package Definition

| Name | Description | Size(bytes) |
|---|---|---|
| Instruction | For the short extended instruction format, only s_instruction[0] may be utilized. Pull and Ack may be short extended instructions. | 8 |
| ObjID, ObjOff, ObjSize | ObjSize (bit[7:0]) may define the ObjID and ObjOff fields as defined in object memory fabric Coherent Object Address (Object Address Space) Space disclosure above. Bit [11] set specifies meta-data. | 16 |
| NodeID | Hierarchical node number. Nodes can be hardware and/or software based. May utilize to route a response back to the original requestor. | 8 |
| Acknowledge | Accumulated acknowledge fields. These may be utilized to signal acknowledgement across objects as defined below. | 1 |
| Operand2 | Utilized for PA address for PA instructions. Utilized for optional streaming block count for other instructions | 8 |
| Operand3 | | 8 |
| Checksum | Checksum of the package. This assures correctness all package chunks and correct number of chunks per package. | 8 |
| Acknowledge Detail | This may include status or error codes specific to each instruction, shown in the Table CIII below. | 1 |
| Local use | Source of the incoming package | 1 |
| Local destination | Destination of the outgoing package | 1 |
| Local mod_ref | Utilized to locally pass modified and referenced information | 1 |
| Reserved | Reserved. | 2 |
| Total Size | Short package size. | 64 |

Table 120 below identifies non-limiting examples of various aspects of a long package definition, in accordance with certain embodiments of the present disclosure.

TABLE 120

| Long Package Definition | | |
| --- | --- | --- |
| Name | Description | Size(bytes) |
| Short package | Push may be long package instruction. | 64 |
| Block Data | | 4096 |
| Total Size | Short package size. | 128 |

Table 121 below identifies non-limiting examples of various aspects of object size encoding, in accordance with certain embodiments of the present disclosure.

TABLE 121

| Object Size Encoding | |
| --- | --- |
| Encoding | ObjSize |
| 0x0 | $2^{21}$ |
| 0x1 | $2^{30}$ |
| 0x2 | $2^{39}$ |
| 0x3 | $2^{48}$ |
| 0x4 | $2^{57}$ |
| 0x5 | $2^{64}$ |
| 0x6-0xff | reserved |

Software and/or hardware based objects may interface to 2 one-way streams, one in each direction. Depending on the object, there can be additional lower level protocol layering including encryption, checksum, and reliable link protocol. The object memory fabric stream protocol provides for matching request response package pairs (and timeouts) to enforce reliability for packages that traverse over an arbitrary number of streams.

In certain cases, each request-response package pair is approximately 50% short package and 50% long package on the average, the average efficiency relative to a block transfer is 204%, with the equation:

$$efficiency = 1/(50\% * 4096/(40+4136))$$

$$= 1/(50\% * blocksize/(smallpackagesize + largepackagesize))$$

For links with stochastic error rates, a reliable link protocol may be utilized to detect the errors locally.

Node ID

Object address spaces (object memory fabric object addresses) can be dynamically present in any object memory within object memory fabric, as well as dynamically migrate. There still can be (or, for example, needs to be) a mechanism that enables object memory's and routers (collectively nodes) to communicate with each other for several purposes including bookkeeping the original requestor, setup and maintenance. The NodeID field within packages can be utilized for these purposes. DIMMs and routers can be addressed based on their hierarchical organization. Non-leaf nodes can be addressed when the lesser significant fields are zero. The DIMM/software/mobile field can enable up to 256 DIMMs or more and the remainder proxied software threads and/or mobile devices. This addressing scheme can support up to $2^{40}$ servers or server equivalents, up to $2^{48}$ DIMMs and up to $2^{64}$ mobile devices or software threads. Examples of these fields are shown below in Tables 122-124.

TABLE 122

| Package NodeID Field | | | | | |
| --- | --- | --- | --- | --- | --- |
| [63:56] | [55:48] | [47:40] | [39:32] | [31:24] | [23:00] |
| Level5 | Level4 | Level3 | Level2 | Level1 Inter-Node Object Router | DIMM/software/ mobile |

TABLE 123

| Leveln Field (n = 1 to 5) | |
| --- | --- |
| Encoding | Description |
| 0x00-0xfd | Node address with hierarchy |
| 0xfe | Add this router ID to NodeID when it first leaves this level toward root. |
| 0xff | Indicates that the NodeID Field specifies an interior node that is one level above the field in which this value is specified. All fields lower than this Leveln Field should be specified as 0xff. |

TABLE 124

| DIMM/SW/Mobile NodeID Field | |
| --- | --- |
| Encoding | Description |
| 0x000000-0x0000fe | Up to 256 DIMMs per logical server |
| 0xfe | Add this router ID to NodeID when it first leaves this level toward root. |
| 0x0000ff | Indicates that the NodeID Field specifies an interior node that is one level above the field in which this value is specified. All fields lower than this Leveln Field should be specified as 0xff. |
| 0x000100-0xffffff | Up $2^{24}$-$2^8$ (16,776,960) SW threads or Mobile Devices per logical server |

Table 125 and 126 below identifies non-limiting examples of various aspects of acknowledge fields and detail, in accordance with certain embodiments of the present disclosure.

TABLE 125

| Acknowledge Fields | | | |
| --- | --- | --- | --- |
| Name | Description | Position | Size(bits) |
| Ack | Cleared when package first inserted into ring from another ring. Set by an object when it is able to respond to the request. | 0 | 1 |
| BusyAck | Cleared when package first inserted into ring from another ring. Set by an object when it is unable to evaluate or perform | 1 | 1 |

TABLE 125-continued

Acknowledge Fields

| Name | Description | Position | Size(bits) |
|---|---|---|---|
| SnapCopyAck | appropriate action on the Object Block Address. BusyAck may cause the package to be re-transmitted around the local ring. Cleared when package first inserted into ring from another ring. Set by an object to indicate it still has a snapshot copy of the Object Block Address. This information may be used to enable the proper state to be set when an object transfers the package between rings (hierarchy levels). | 2 | 1 |
| ShadCopyAck | Cleared when package first inserted into ring from another ring. Set by an object to indicate it still has a shadow copy of the Object Block Address. This information may be used to enable the proper state to be set when an object transfers the package between rings (hierarchy levels). | 3 | 1 |
| CopyAck | Cleared when package first inserted into ring from another ring. Set by an object to indicate it still has a copy of the Object Block Address. This information is used to enable the proper state to be set when an object transfers the package between rings (hierarchy levels). | 4 | 1 |
| ToRoot | Function may be to enable the uplink ring object that provides streams toward the root to not require a directory. Signals the uplink object that a package has traversed once around the ring and can now be sent toward the root. | 4 | 1 |
| Reserved | Reserved. | | 3 |
| Total Size | Acknowledge field size. | | 8 |

Table 126 below identifies non-limiting examples of various aspects of the Acknowledge detail field, in accordance with certain embodiments of the present disclosure. The Acknowledge detail field may provide detailed status information of the corresponding request based on the package instruction field.

TABLE 126

Acknowledge Detail

| Instructions | Acknowledge Field Definition |
|---|---|
| Pull, Push, Ack Load, Store | previous block state. Utilized for diagnostic and 0x0- Success 0x1- Fail |
| Empty, Fill | 0x0- Success 0x1- Fail |
| Pointer, PrePtrChn, ScanEF | 0x0- Success 0x1- Fail |
| Create | 0x0- Success 0x1- Already created (fail) 0x2- Fail |
| Destroy | 0x0- Success 0x1- Not valid (nothing to destroy) 0x2- Fail |
| Allocate | 0x0- Success 0x1- Already allocated (fail) 0x2- Fail |
| Deallocate | 0x0- Success 0x1- not allocated (fail) 0x2- Fail |
| CopyObj | 0x0- Success 0x1- Object doesn't exist (fail) 0x2- Fail |
| CopyBlk | 0x0- Success 0x1- Block doesn't exist (fail) 0x2- Fail |

TABLE 126-continued

Acknowledge Detail

| Instructions | Acknowledge Field Definition |
|---|---|
| Persist | 0x0- Success 0x1- Object doesn't exist (fail) 0x2- Fail |
| AssocObj | 0x0- Success 0x1- Object doesn't exist (fail) 0x2- Fail |
| DeAssocObj | 0x0- Success 0x1- Object doesn't exist (fail) 0x2- Object not associated (fail) 0x3- Fail |
| AssocBlk | 0x0- Success 0x1- Object or block doesn't exist (fail) 0x2- Fail |
| DeAssocBlk | 0x0- Success 0x1- Object or block doesn't exist (fail) 0x2- Block not associated (fail) 0x3- Fail |
| OpenObj | 0x0- Success 0x1- Object doesn't exist (fail) 0x2- Object already open 0x3- Fail |
| Btree | 0x0- Success 0x1- Object doesn't exist (fail) 0x2- Fail |

In some embodiments, the topology used within object memory fabric may be a unidirectional point-to-point ring. However, in various embodiments, the stream format would support other topologies. A logical ring may include any combination of hardware, firmware, and/or software stream object interfaces. A two-object ring may include two one-way streams between the objects. An object that connects to multiple rings may have the capability to move, translate, and/or generate packages between rings to create the object memory fabric hierarchy.

Figure 22A:
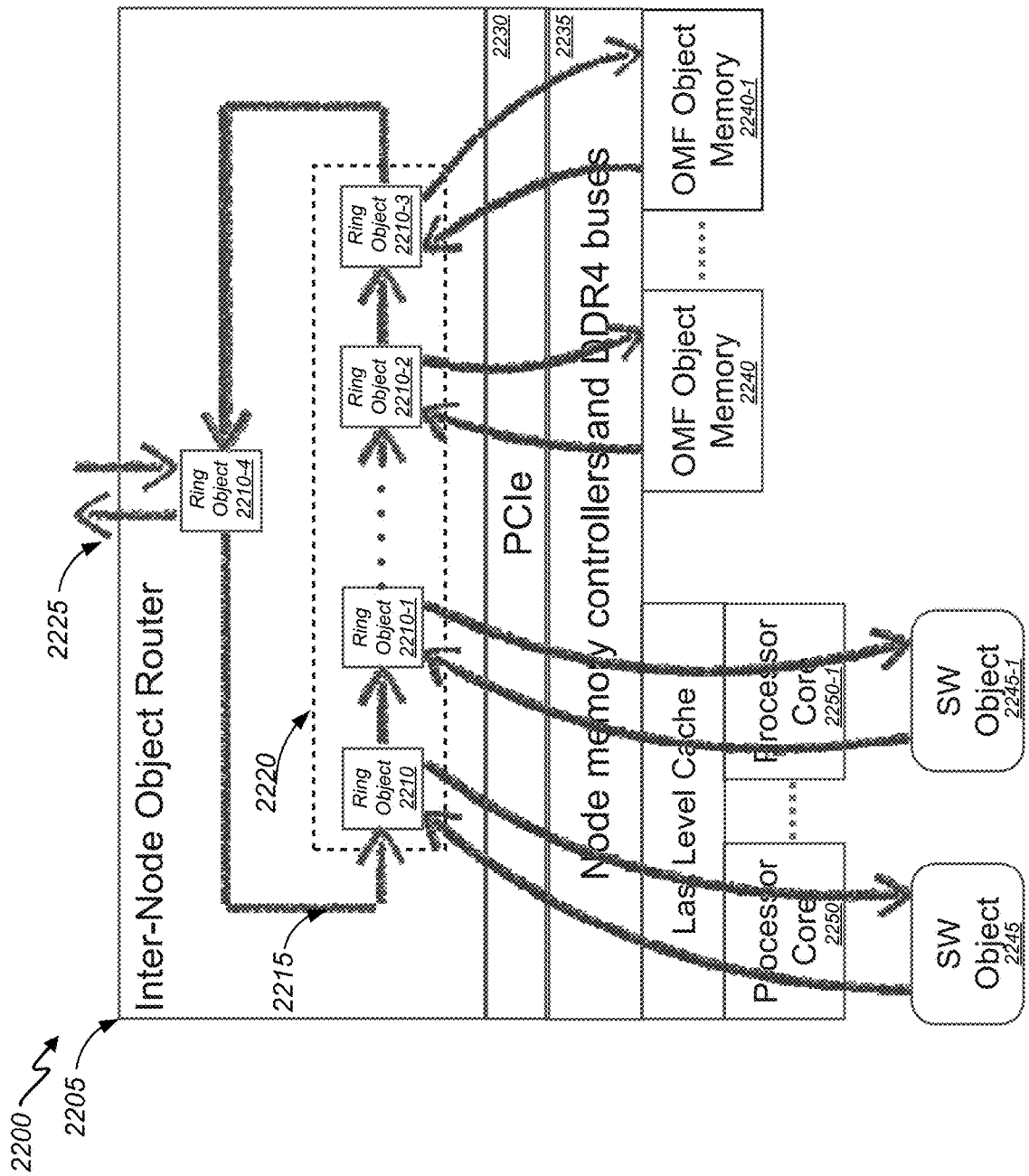
FIG. 22A is a block diagram illustrating an example of streams present on a node with a hardware-based object memory fabric inter-node object router, in accordance with certain embodiments of the present disclosure.

FIG. 22A is a block diagram illustrating an example of streams present on a node 2200 with a hardware-based object memory fabric inter-node object router 2205, in accordance with certain embodiments of the present disclosure. In some embodiments, the node 2200 may correspond to a server node. The inter-node object router 2205 may include ring objects 2210 which are connected with physical streams 2215 in a ring orientation. In various embodiments, the ring objects may be connected in a ring 2220, which may be a virtual (Time Division Multiplexed) TDM ring in some embodiments. The ring objects 2210 and streams 2215 can be any combination of physical objects and streams or TDM ring objects and streams when hardware is shared. As depicted, one ring object 2210 may connect within the inter-node object router ring 2220 and to a stream 2225 that goes toward the object memory fabric router. In some embodiments, more than one ring object 2210 may connect within the inter-node object router ring and corresponding streams.

As depicted, the node 2200 may include a PCIe 2230, node memory controllers and DD4 memory buses 2235, and object memory fabric object memories 2240. Each object memory fabric object memory 2240 may have at least one pair of streams that connect to a inter-node object router ring object 2210 over the DD4 memory bus 2235 and PCIe 2230, running at hardware performance. As depicted, there can be software objects 2245 running on any processor core 2250 that can be functioning as any combination of routing agent and/or object memory. The software objects 2245 may have streams that connect ring objects 2210 within the inter-node object router 2205. Thus, such software objects 2245 streams may stream over the PCIe 2230.

Figure 22B:
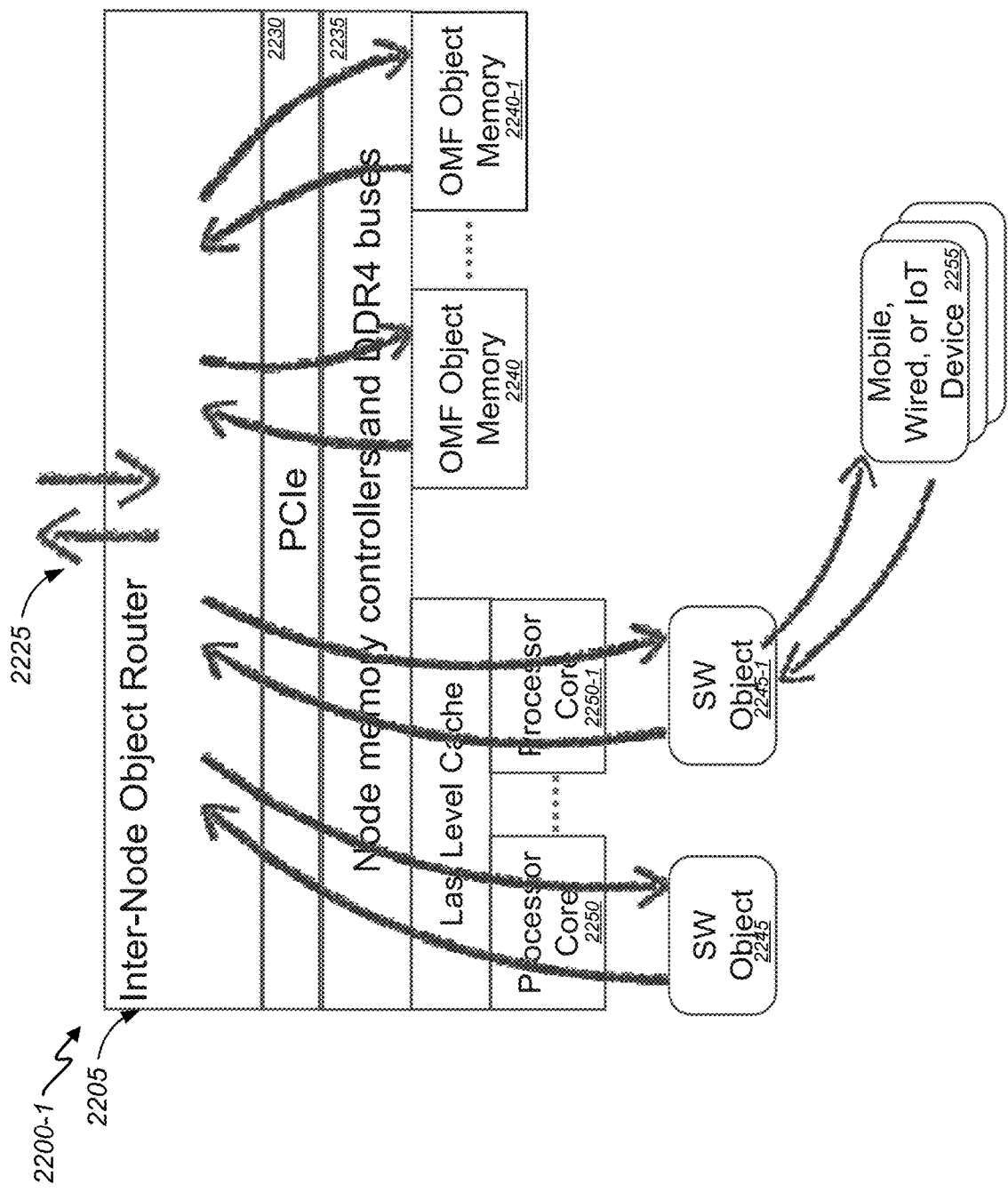
FIG. 22B is a block diagram illustrating an example of software emulation of object memory and router on the node, in accordance with certain embodiments of the present disclosure.

FIG. 22B is a block diagram illustrating an example of software emulation of object memory and router on the node 2200-1, in accordance with certain embodiments of the present disclosure. The software object 2245 may, for example, emulate object memory fabric object memory 2240. The software object 2245 may include the same data structures to track objects and blocks and respond to requests from the inter-node object router 2205 identically to the actual object memory fabric object memory 2240. The software object 2245-1 may, for example, correspond to a routing agent by emulating the inter-node object router 2205 functionality. In so doing, the software object 2245-1 may communicate streams over standard wired and/or wireless networks, for example, to mobile, wired, and/or Internet of Things (IoT) devices 2255.

In some embodiments, the entire inter-node object router function could be implemented in one or more software objects 2245 running on one or more processing cores 2250, with the only difference being performance. And, as noted, one or more processing cores 2250 can also directly access object memory fabric object memory per conventional memory reference.

Figure 23:
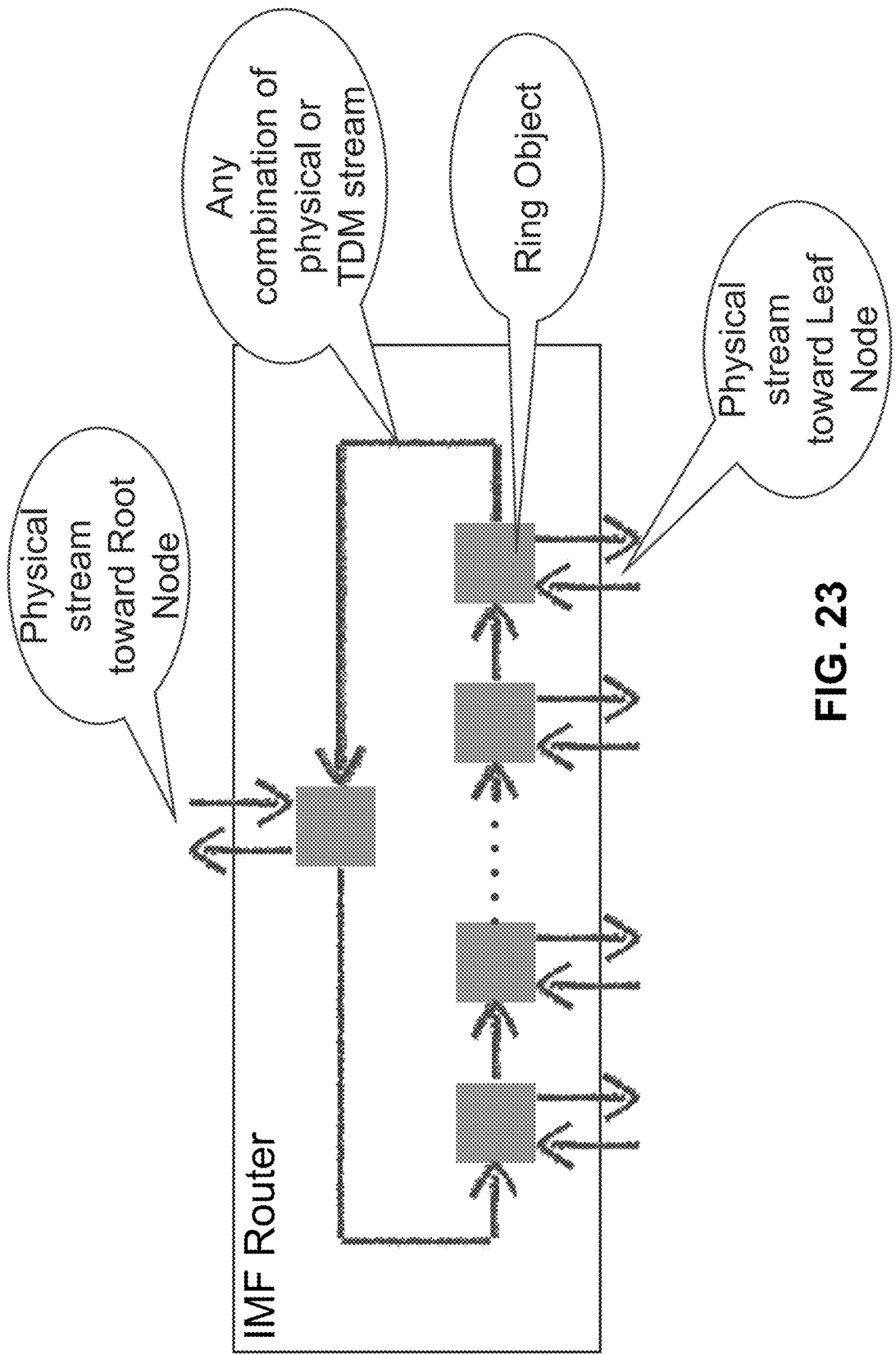
FIG. 23 is a block diagram illustrating an example of streams within an IMF Router, in accordance with certain embodiments of the present disclosure.

FIG. 23 is a block diagram illustrating an example of streams within an object memory fabric node object router 2300, in accordance with certain embodiments of the present disclosure. The object memory fabric router 2300 may include ring objects 2305 which are connected with streams 2310. As depicted, ring objects 2305 may be connected by streams 2310 in a ring topology. The ring objects 2305 and streams 2310 can be any combination of physical or TDM. One or more ring objects 2305 may connect to a physical stream 2315 that goes toward a leaf node. As depicted, one ring object 2305 may connect to a physical stream 2320 that goes toward a root node. In some embodiments, more than one ring object 2305 may connect to a respective physical stream 2320 that goes toward a root node.

API Background

Although API which stands for Applications Programming Interface, sounds like it should be about how software interfaces to object memory fabric, the main interface to object memory fabric may correspond to memory in some embodiments. In some embodiments, the object memory fabric API may correspond to how object memory fabric is set up and maintained transparently for applications, e.g., by modified Linux libc. Applications such as a SQL database or graph database can utilize the API to create object memory fabric objects and provide/augment meta-data to enable object memory fabric to better manage objects.

In various embodiments, overall capabilities of the API may include:
1. Creating objects and maintaining objects within object memory fabric;
2. Associating object memory fabric objects with local virtual address and physical address;
3. Providing and augmenting meta-data to enable object memory fabric to better manage objects; and/or
4. Specifying extended instruction functions and methods.

API functions may utilize the last capability to implement all capabilities. By being able to create functions and methods, entire native processor sequences can be offloaded to object memory fabric, gaining efficiencies such as those disclosed above with respect to the extended instruction environment and extended instructions.

The API interface may be through the PCIe-based Server Object Index, also referred to as object memory fabric inter-node object router. The API Programming model may directly integrate with the application. Multi-threading (through in memory command queue) may be provided so that each application is logically issuing commands. Each command may provide return status and optional data. The API commands may be available as part of trigger programs.

As noted regarding "IMF Distributed Object Memory and Index" (e.g. with respect to FIGS. 10-12 described herein), three components where introduced to describe the data structures and operation of the Object memory and index. The three components are shown below in Table 127. This section will discuss the physical instantiations in more depth.

TABLE 127

| Logical Abstraction | Physical Device | Form Factor |
| --- | --- | --- |
| Object Memory | IMF-DIMM | DDR4 DIMM |
| Server Object Index | IMF-uRouter | PCIe Card(half height & length) |
| IMF Router Object Index | IMF-Router | 0.5 U Rack mount |

Since all three form factors share a common functionality with respect to Object Memory and Index, the underlying design objects may be reused in all three (a common design).

Figure 24:
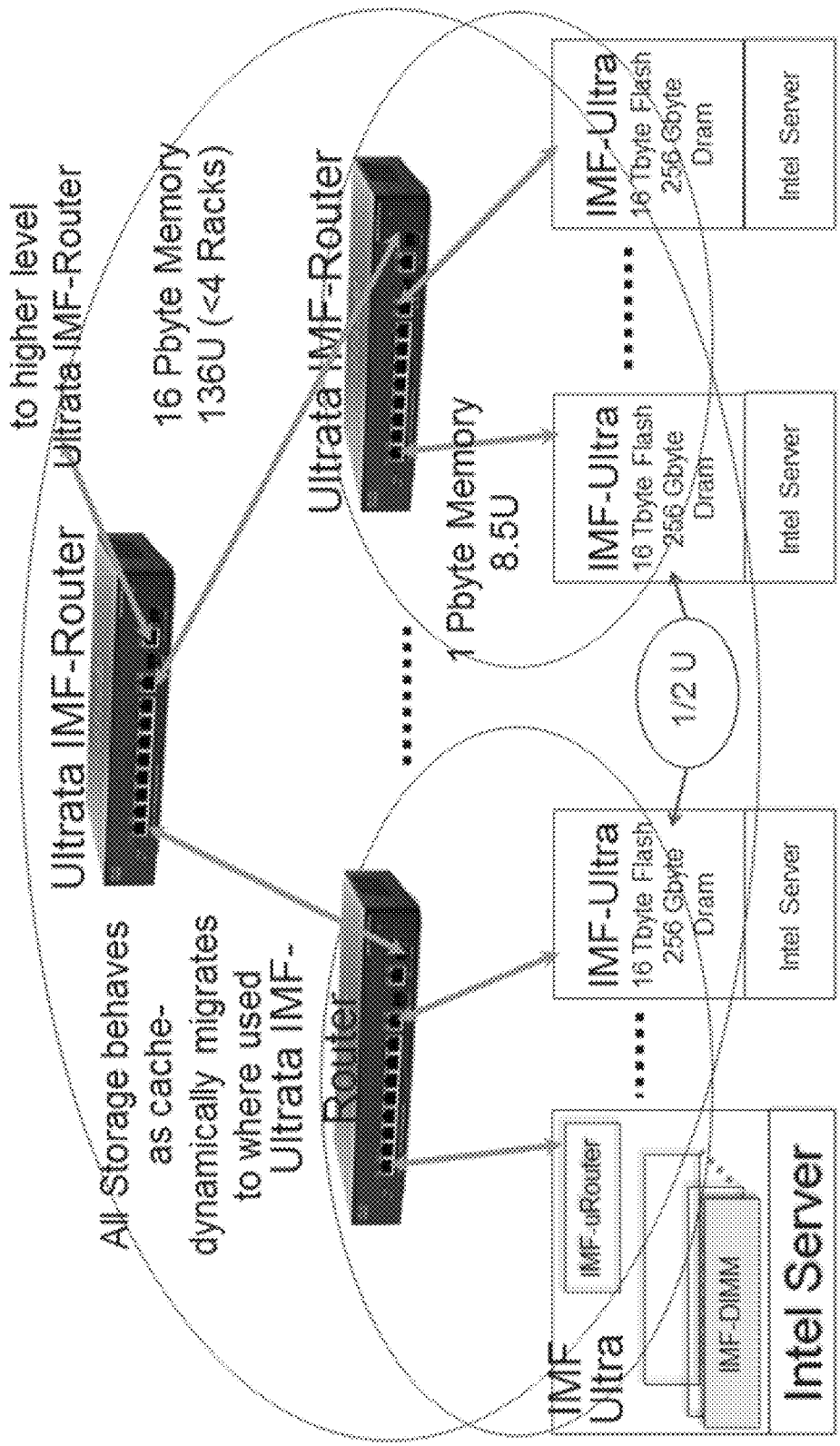
FIG. 24 is a block diagram illustrating a product family 1 hardware implementation architecture, in accordance with certain embodiments of the present disclosure.

FIG. 24 is a block diagram illustrating a product family hardware implementation architecture, in accordance with certain embodiments of the present disclosure.

Within a server, IMF-DIMMs may plug into standard DDR4 memory sockets. Each IMF-DIMM may independently manage both dram memory (fast and relatively expensive) and flash memory (not as fast, but much less expensive) in a manner that the processor thinks that there is the flash amount of fast dram (see, for example, "Object Memory Caching" section herein). There may be eight memory sockets per processor socket or sixteen for a two-socket server. The IMF-uRouter may communicate with the IMF-DIMM(s) with direct memory access over PCIe and memory bus. IMF may reserve a portion of each IMF-DIMM physical memory map to enable communication to and from the PCIe based uRouter. Thus the combination of PCIe, memory bus and IMF private portion of IMF-DIMM memory may form a virtual high bandwidth link. This may all be transparent to application execution.

The IMF-uRouter may connect with IMF-Router over 25/100GE fiber that uses several layers of Gigabit Ethernet protocol. IMF-Routers may connect with same 25/100GE fiber. IMF-Router may provide sixteen downlinks and two uplinks toward root. Product 1 (IMF Rev1) may require dedicated IMF links. Product2 may interoperate with standard 100GE links and routers.

Figure 25:
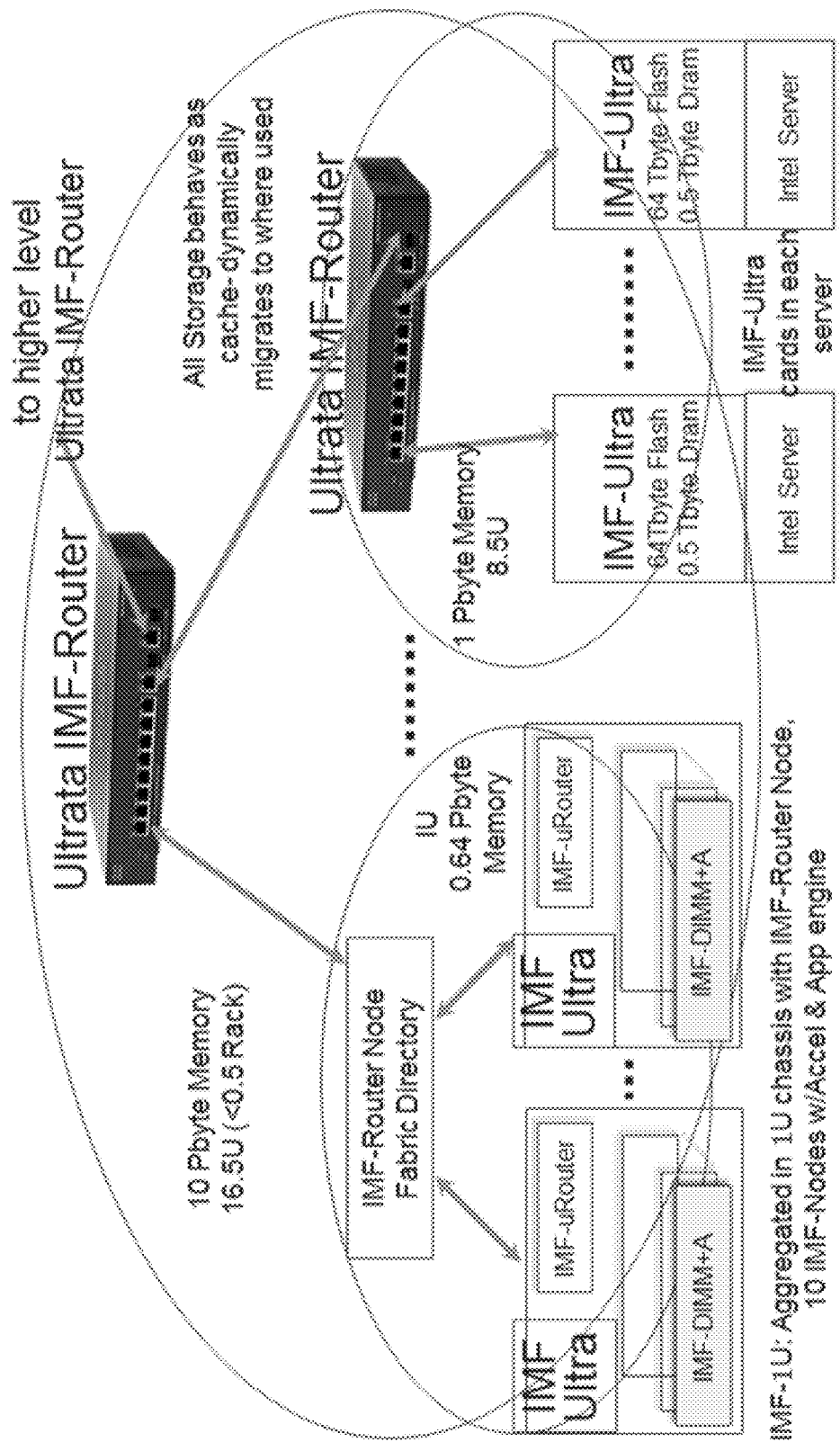
FIG. 25 is a block diagram illustrating a product family 2 hardware implementation architecture, in accordance with certain embodiments of the present disclosure.

FIG. 25 is a block diagram illustrating a product family 2 hardware implementation architecture, in accordance with certain embodiments of the present disclosure. Product family 2 (IMF Rev2) may provide an additional memory trigger instruction set and extended object method execution resources. This may enable a reduction in the number of servers that are required because more of the database storage manager and engine can execute within Object Memory without need of server processor resources. A server-less IMF node may consist of sixteen Object Memories with a IMF-uRouter. Ten nodes may be packaged into a single 1 U rack mount enclosure, providing sixteen times reduction in space and up to five-times the performance improvement over IMF-Rev1.

Server Node

The server may consist of a single IMF-uRouter and one or more IMF-DIMMs. The IMF-uRouter may implement the object index covering all objects/blocks held within the Object Memory(s) (IMF-DIMM) within the same server. The IMF-DIMM may hold the actual objects and blocks within objects, corresponding object meta-data and object index covering objects currently stored locally. Each IMF-DIMM independently manages both dram memory (which may be, for example, fast and relatively expensive) and flash memory (which may be, for example, not as fast, but much less expensive) in a manner that the processor thinks that there is the flash amount of fast dram. Both IMF-DIMM and IMF-uRouter may both manage free storage through a free storage index, which may be implemented in the same manner as for other indexes.

Figure 26:
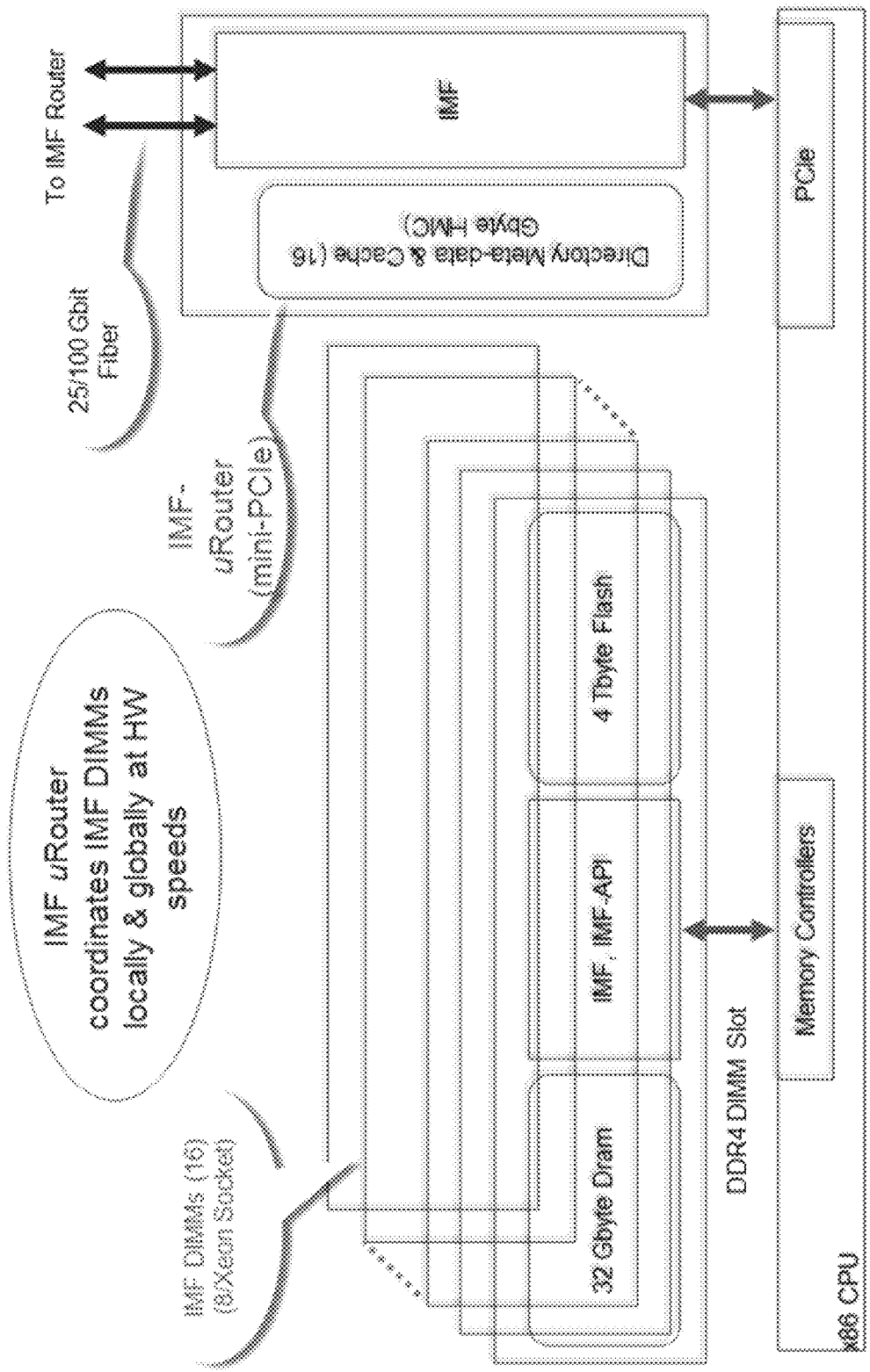
FIG. 26 is a block diagram illustrating an IMF server view of a hardware implementation architecture, in accordance with certain embodiments of the present disclosure.

FIG. 26 is a block diagram illustrating an IMF server view of a hardware implementation architecture, in accordance with certain embodiments of the present disclosure.

Objects may be created and maintained through the IMF-API as described herein. The API may communicate to the IMF-uRouter through the IMF version of libc and IMF driver. The IMF-uRouter may then update the local object index, send commands toward the root as required and communicate with the appropriate IMF-DIMM to complete the API command (e.g. locally). IMF-DIMM may communicate an administrative request back to the IMF-uRouter, which may handle them appropriately both with respect to IMF and the local Linux. The IMF-uRouter and IMF-DIMM may participate in moving objects and blocks (e.g. in the manner described in the "Object Memory Miss" with respect to FIG. 12.

RDIMM

The RDIMM may consist of dram (e.g. 32 Gbyte), flash memory (e.g. 4 Terabytes) and FPGA and DDR4 compatible buffers (first generation product capacities per IMF-DIMM). The FPGA may include all the resources, structure, and internal data structures to manage the dram and flash as Object Memory integrated within the IMF whole.

Figure 27:
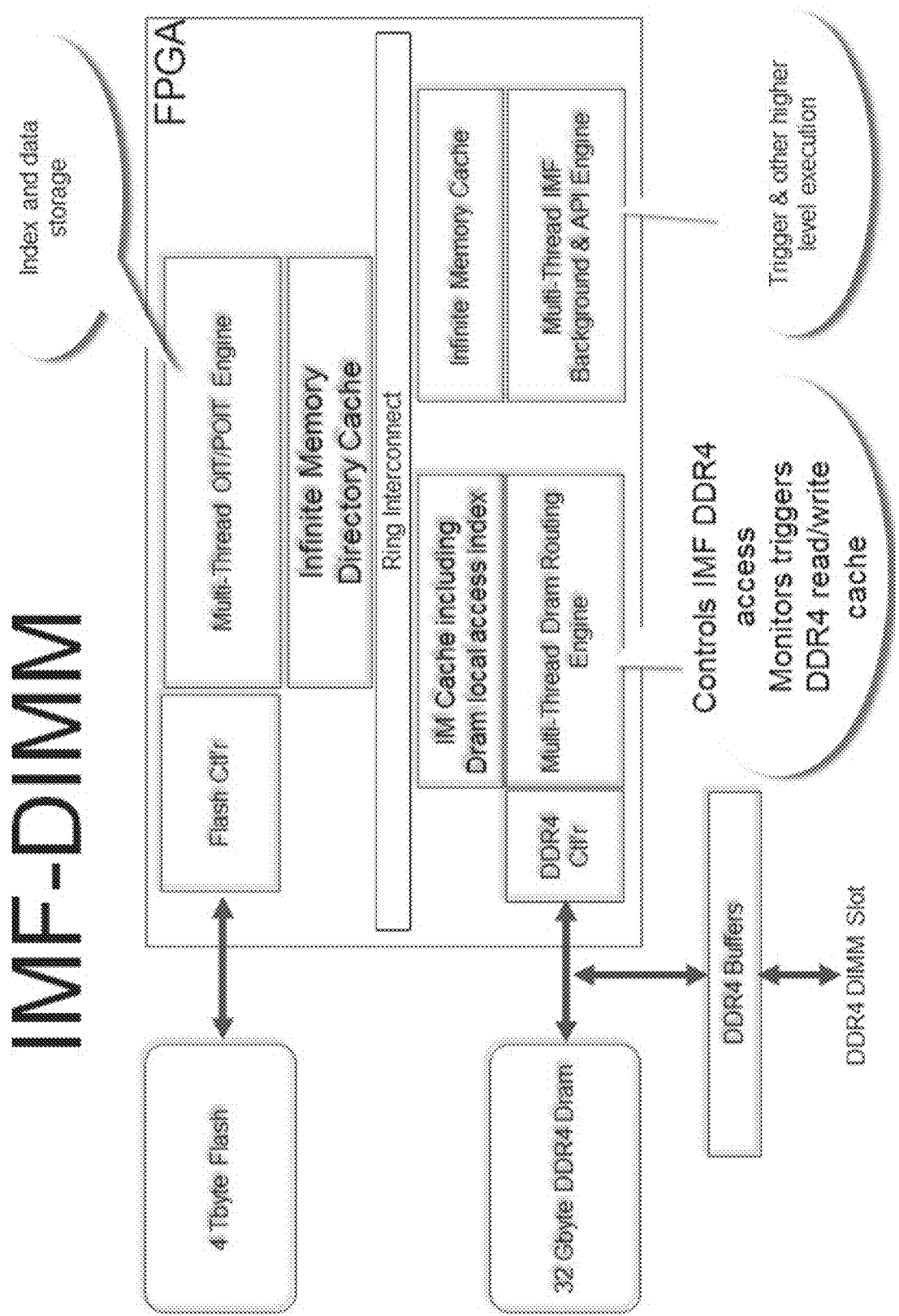
FIG. 27 is a block diagram illustrating an IMF-DIMM view of a hardware implementation architecture, in accordance with certain embodiments of the present disclosure.

FIG. 27 is a block diagram illustrating an IMF-DIMM view of a hardware implementation architecture, in accordance with certain embodiments of the present disclosure.

A single scalable and parametrizable architecture may be used to implement IMF on IMF-DIMM as well as IMF-uRouter and IMF-Router.

The internal architecture may be organized around a high performance, scalable ring interconnect that may implement a local version of IMF coherency protocol. Each subsystem may connect the ring through a coherent cache. The type of meta-data, data and objects stored may depend on the functionality of the subsystem. The routing engines in all three subsystems may be synthesized from a common design, may be highly multi-threaded, and may have no long term threads or state. An example set of routing engines may be as follows:

1. Dram Routing Engine (StreamEngine): Controls IMF DDR4 access, monitors triggers for processor access data and includes DDR4 cache. StreamEngine may monitor DDR4 operations for triggers and validate DDR4 cache access through an internal table that maps the 0.5 Tbyte physical DIMM address space. This table has several possible implementations including:

a. Fully associative: Table that may convert each page physical number (excludes low 12 bits of address) to a page offset in DDR4. This has the advantage that any arbitrary set of pages can be cached.

b. Partially associative: Same as associative technique except that RAS address bits for the associative set and give the StreamEngine time to do the translation. This enables associativity level of 16-32 way, which is very close to the performance of fully associative. This technique requires a table of approximately 128 k×4 bits (512 k bits).

2. IMF Background & API Engine (ExecuteEngine): May provides core IMF algorithms such as coherency, triggers, IMF APIs to accelerate graph and other big data as well as higher level IMF instruction sequences. May provide higher level API and IMF trigger execution. Also may handle background maintenance.

3. OIT/POIT Engine: Manages OIT/POIT and provides this service to the other engines. The engine can process a level within an index in 2 cycles providing high performance index search and management. Manages flash storage for objects, meta-data blocks, data blocks and indices.

Figure 28:
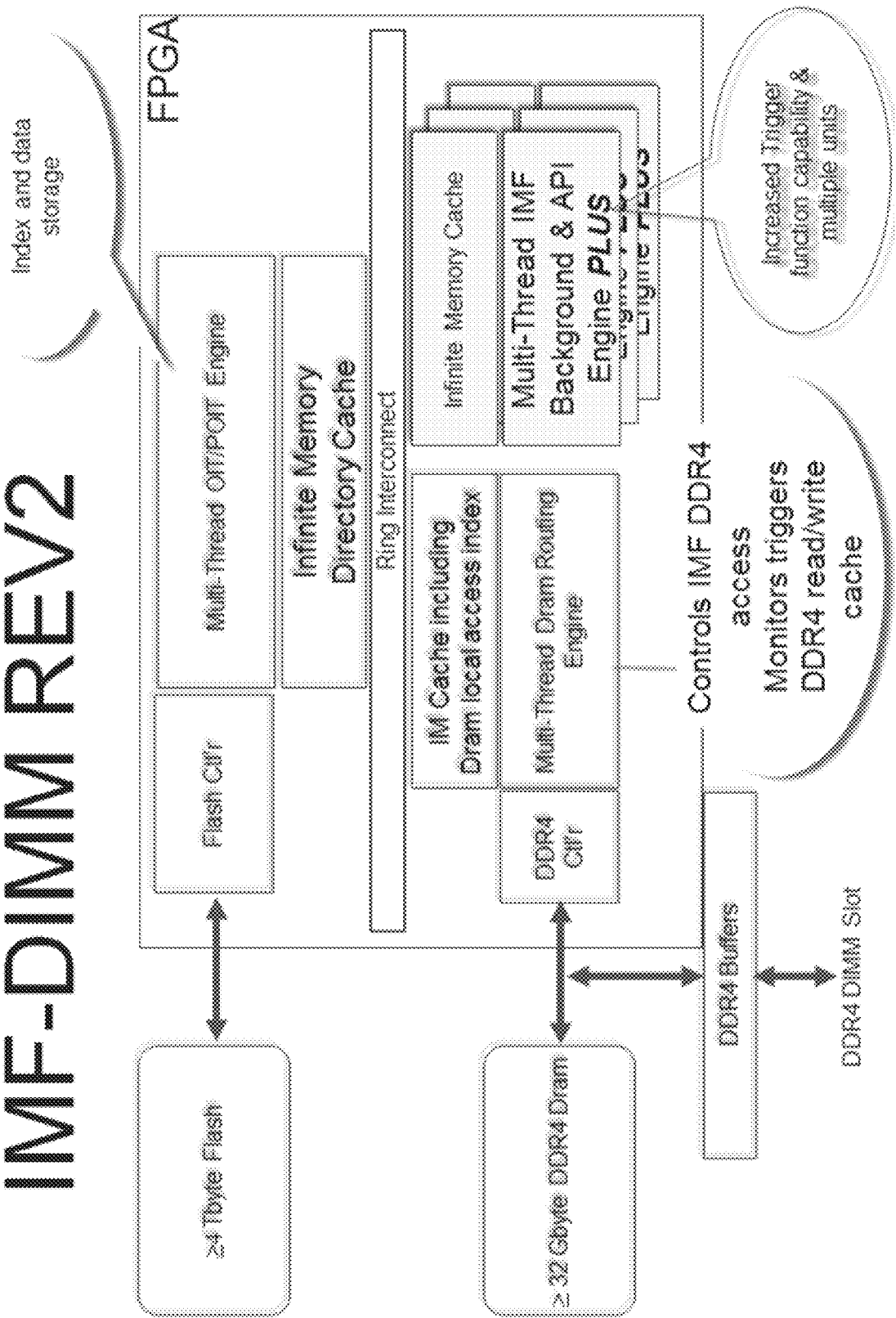
FIG. 28 is a block diagram illustrating an IMF-DIMM (rev. 2) view of a hardware implementation architecture, in accordance with certain embodiments of the present disclosure.

FIG. 28 is a block diagram illustrating an IMF-DIMM (rev. 2) view of a hardware implementation architecture, in accordance with certain embodiments of the present disclosure.

IMF-DIMM Rev2 is may be similar to Rev1. The capability of the Multi-threaded IMF Background & API Engine may be functionally increased to execute a wide range of IMF trigger instructions. Additional instances of the updated Multi-threaded IMF Background & API EnginePlus may be added for more IMF trigger program performance. The combination of functional additions and more instances may be intended to enable IMF to execute big-data and data-manager software with fewer servers as shown, for example, in rev2 in FIG. 28.

IMF-uRouter

Figure 29:
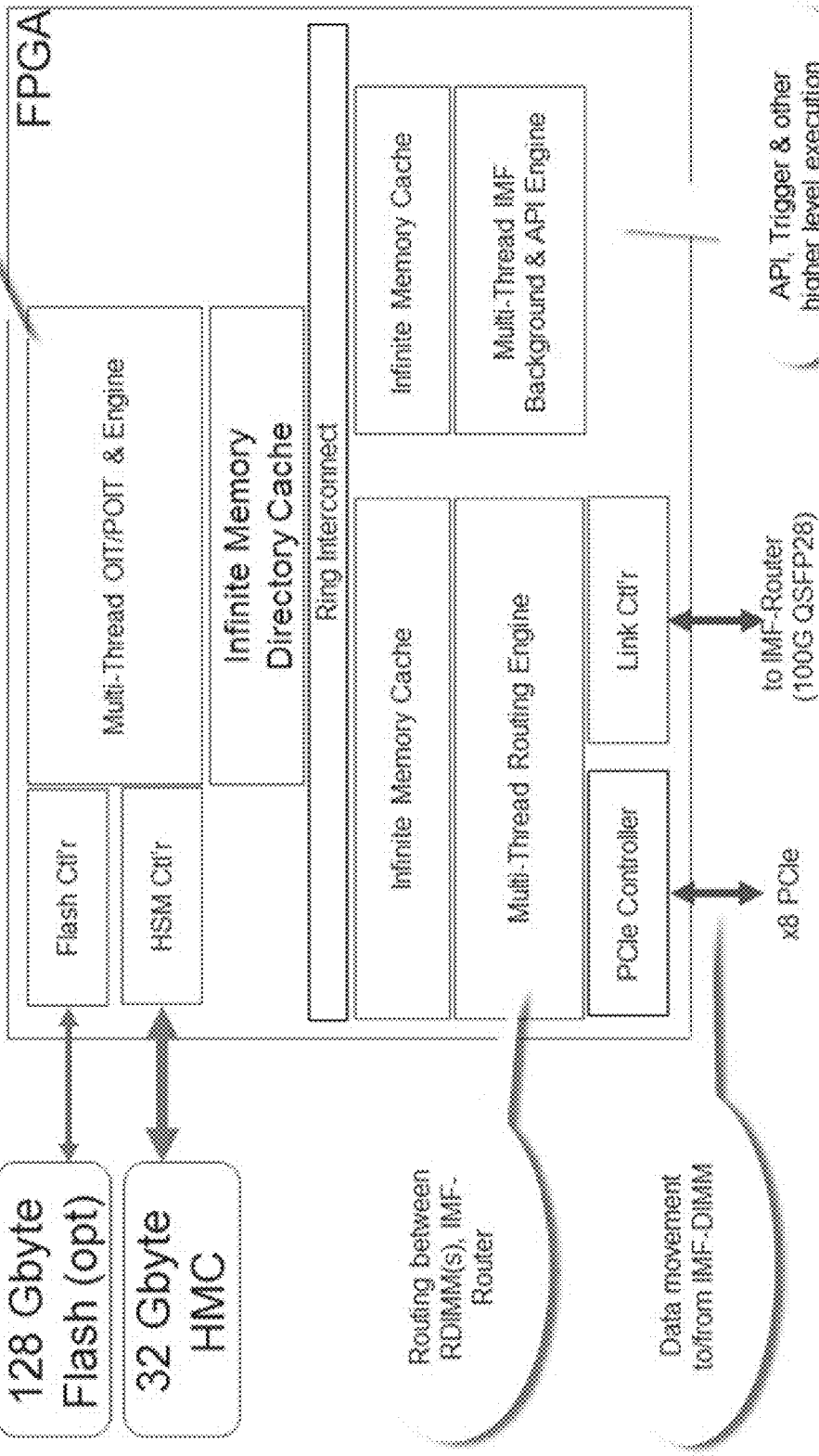
FIG. 29 is a block diagram illustrating an IMF-uRouter view of a hardware implementation architecture, in accordance with certain embodiments of the present disclosure.

The internal architecture of the uRouter may be the same as the IMF-DIMM, with the differences related to the functionality of the uRouter, Manage IMF server object index, and route appropriate packets to/from PCIe (IMF-DIMMs) and IMF-Router. It may have additional routing function and may not actually store objects. As noted, an example set of routing engines may be as follows:

FIG. 29 is a block diagram illustrating an IMF-uRouter view of a hardware implementation architecture, in accordance with certain embodiments of the present disclosure.

1. Routing Engine: Controls routing of packets to/from PCIe (IMF-DIMMs) and IMF-Router. Typically packets enter through one path are processed internally and exit on one of the paths.

2. OIT/POIT Engine (ObjMemEngine): Manages OIT/POIT and provides this service to the other engines. The engine can process a level within an index in 2 cycles providing high performance index search and management. Manages flash and HMC (Hybrid Memory Cube) storage for indices. Caches most frequently used indices in HMC 3. IMF Background & API Engine: Provides higher level API and IMF trigger execution. Also handles background maintenance.

IMF-Router

Figure 30:
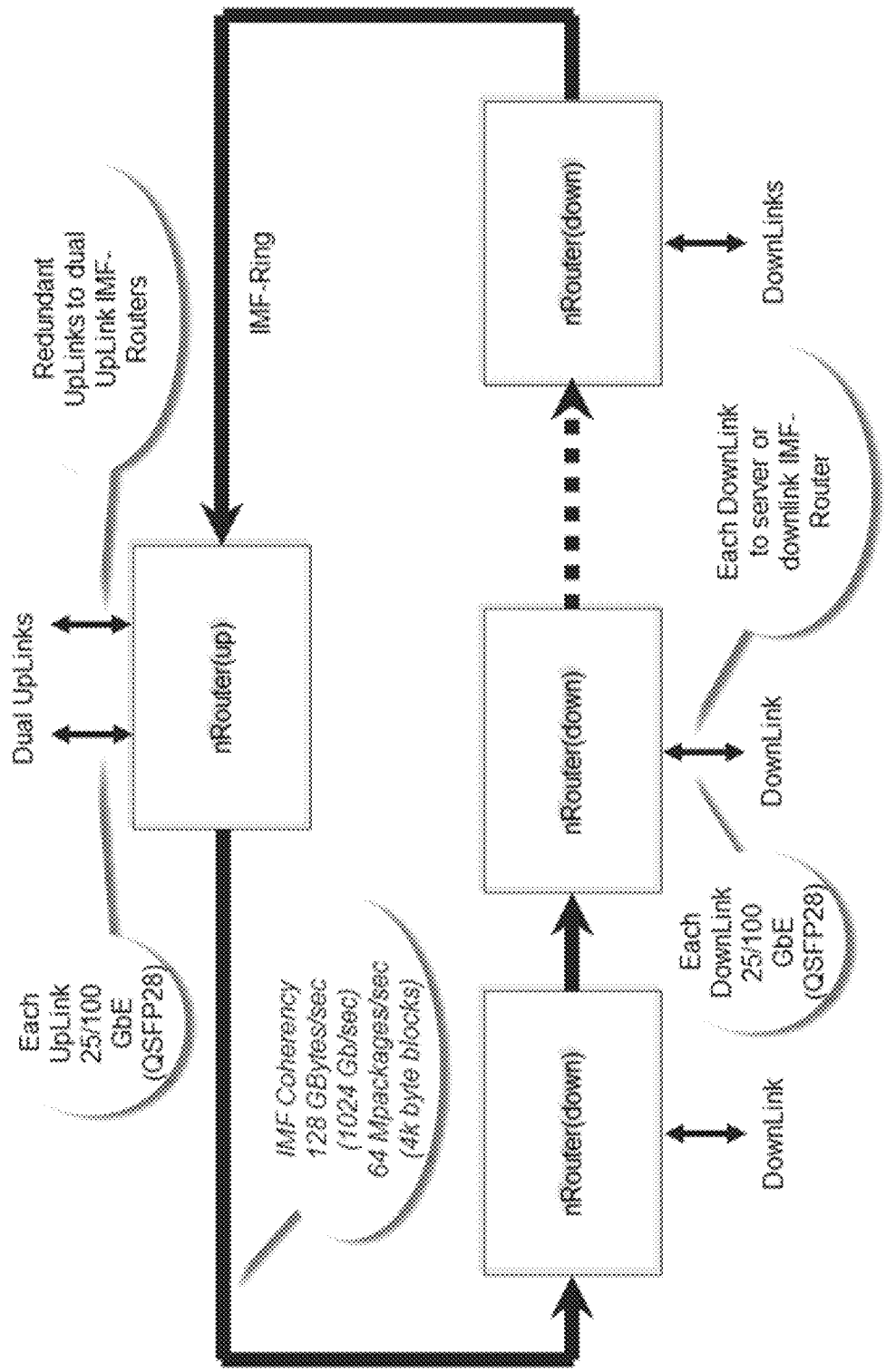
FIG. 30 is a block diagram illustrating an IMF-Router view of a hardware implementation architecture, in accordance with certain embodiments of the present disclosure.

FIG. 30 is a block diagram illustrating an IMF-Router view of a hardware implementation architecture, in accordance with certain embodiments of the present disclosure.

IMF-Router may be analogous to an IP router. A difference may be the addressing model and static vs. dynamic. IP routers may utilize a fixed static address per each node and routes based on the destination IP address to a fixed physical node (can be virtualized for medium and long timeframes). IMF-Router may utilize an IMF Object Address (IOA) which may specify the object and specific block of the object. Objects and blocks may dynamically reside at any node. The IMF-Router may route IOA packages based on the dynamic location(s) of objects and blocks and may track object/block location dynamically in real time.

The IMF-Router may be a scaled up version of IMF-uRouter. Instead of connecting to a single PCIe bus to connect to leaf IMF-DIMMs, it may connect multiple (e.g. 12-16, but expected to be 16) downlink IMF-uRouters or IMF-Routers and two uplink IMF-Routers. There may also be a scale up of the object index storage capacity, processing rate and overall routing bandwidth.

Figure 31:
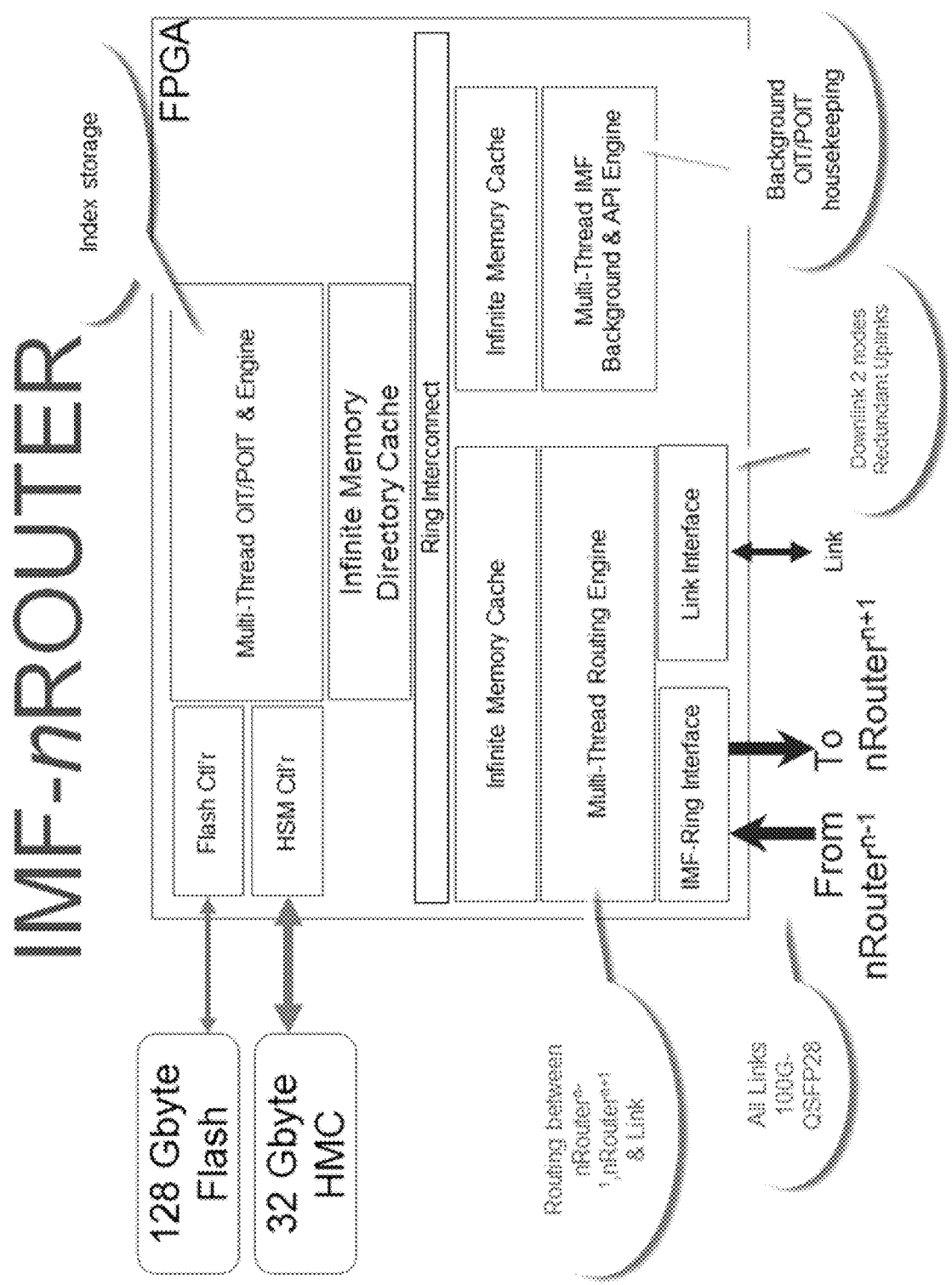
FIG. 31 is a block diagram illustrating an IMF-nRouter view of a hardware implementation architecture, in accordance with certain embodiments of the present disclosure.

FIG. 31 is a block diagram illustrating an IMF-nRouter view of a hardware implementation architecture, in accordance with certain embodiments of the present disclosure. The IMF-Router architecture may utilize an nRouter for each downlink or uplink it connects to. The nRouter may be virtually identical to the uRouter (e.g. with the exception of supporting the internal IMF-Ring—which may be the same as the on chip version—and deleted PCIe). The IMF-Ring may utilize Interlaken protocol between nRouters. Interlaken protocol at the packet level may be compatible with utilizing 10G and 100G ethernet for DownLinks and UpLinks. Each nRouter may have as much object index storage capacity, processing rate and routing bandwidth as the uRouter, thus allowing the IMF-Router to scale up to support the number of downlinks and uplinks.

Each downlink nRouter's object index may reflect all objects or blocks that are downlink from it. So even an IMF-Router may use a distributed internal object index and routing.

The IMF-Routers at any level with respect to leafs may be identical. The larger aggregate hierarchical Object Memory (caches) at each level from leaf may tend to lower the data movement between levels since more data can be stored at each level. Data that is in high use may be stored in multiple locations.

What is claimed is:

1. A hardware-based processing node of an object memory fabric, the processing node comprising:
   a memory module storing and managing one or more memory objects, the memory module comprising at least a Field Programmable Gate Array (FPGA), a first memory, and a second memory, wherein the first memory has a lower latency than the second memory, and wherein:
   each memory object is created natively within the memory module,
   each memory object is accessed using a single memory reference instruction without Input/Output (I/O) instructions,
   a first set of data of the one or more memory objects is stored within the first memory of the memory module and a second set of data of the one or more memory objects is stored within the second memory of the memory module, and
   the FPGA of the memory module dynamically determines during execution of one or more applications on the hardware-based processing node at a hardware level of the memory module which of the first subset of data will be transferred to the second memory and dynamically determines during continued execution of the one or more applications which of the second subset of data will be transferred to the first memory based on access patterns associated with the object memory fabric.

2. The hardware-based processing node of claim 1, wherein the FPGA of the memory module initiates the transfer of the first subset of data and the second subset of data.

3. The hardware-based processing node of claim 2, wherein the FPGA of the memory module transmits a communication to a processor connected to the hardware-based processing node, wherein the communication includes a notification that data has been transferred to the second memory.

4. The hardware-based processing node of claim 1, wherein a data of the second subset of data is eligible to be transferred between to the first memory from the second memory based on a determination that the data will be referenced within a certain predetermined period of time.

5. The hardware-based processing node of claim 1, wherein dynamically determining which of the first subset of data will be transferred to the second memory includes using metadata stored in the memory module, wherein the metadata is associated with the data.

6. The hardware-based processing node of claim 1, wherein the first memory is a non-volatile, persistent memory and the second memory is a volatile, non-persistent memory.

7. The hardware-based processing node of claim 6, wherein the memory module comprises a single Dual In-line Memory Module (DIMM) and wherein the first memory is a flash memory and the second memory is a dynamic random-access memory (DRAM).

8. The hardware-based processing node of claim 7, wherein the FPGA of the memory module maps an object of the one or more memory objects from the object memory fabric into a virtual address space and from the virtual address space into a physical memory address pace of the first memory and the second memory.

9. The hardware-based processing node of claim 1, wherein the memory module is a single Dual In-line Memory Module (DIMM) and comprises an accelerator module storing the one or more memory objects, wherein the accelerator module performs a set of predefined management functions on the one or more memory objects.

10. The hardware-based processing node of claim 9, wherein the set of predefined management functions of the accelerator module replace storage management and networking software in the node.

11. An object memory fabric comprising:
a plurality of hardware-based processing nodes, each hardware-based processing node comprising:
a memory module storing and managing one or more memory objects, the memory module comprising at least a Field Programmable Gate Array (FPGA), a first memory, and a second memory, wherein the first memory has a lower latency than the second memory, and wherein:
each memory object is created natively within the memory module,
each memory object is accessed using a single memory reference instruction without Input/Output (I/O) instructions,
a first set of data of the one or more memory objects is stored within the first memory of the memory module and a second set of data of the one or more memory objects is stored within the second memory of the memory module, and
the FPGA of the memory module dynamically determines during execution of one or more applications on the hardware-based processing node at a hardware level of the memory module which of the first subset of data will be transferred to the second memory and dynamically determines during continued execution of the one or more applications which of the second subset of data will be transferred to the first memory based on access patterns associated with the object memory fabric.

12. The object memory fabric of claim 11, wherein the FPGA of the memory module initiates the transfer of the first subset of data and the second subset of data.

13. The object memory fabric of claim 12, wherein the FPGA of the memory module transmits a communication to a processor connected to the hardware-based processing node, wherein the communication includes a notification that data has been transferred to the second memory.

14. The object memory fabric of claim 11, wherein a data of the second subset of data is eligible to be transferred between to the first memory from the second memory based on a determination that the data will be referenced within a certain predetermined period of time.

15. The object memory fabric of claim 11, wherein dynamically determining which of the first subset of data will be transferred to the second memory includes using metadata stored in the memory module, wherein the metadata is associated with the data.

16. The object memory fabric of claim 11, wherein the first memory is a non-volatile, persistent memory and the second memory is a volatile, non-persistent memory.

17. The object memory fabric of claim 16, wherein each memory module comprises a single Dual In-line Memory Module (DIMM) and wherein the first memory is a flash memory and the second memory is a dynamic random-access memory (DRAM).

18. The object memory fabric of claim 17, wherein the FPGA of each memory module maps an object of the one or more memory objects from the object memory fabric into a virtual address space and maps the object from the virtual address space into a physical memory address space of the first memory and the second memory.

19. The object memory fabric of claim 11, wherein the memory module is a single Dual In-line Memory Module and comprises an accelerator module storing the one or more memory objects, wherein the accelerator module performs a set of predefined management functions on the one or more memory objects.

20. The object memory fabric of claim 19, wherein the set of predefined management functions of the accelerator module replace storage management and networking software in the node.

21. A computer-implemented method, comprising:
creating one or more memory objects natively within a memory module of a hardware-based processing node of the object memory fabric, wherein the hardware-based processing node includes a memory module storing and managing one or more memory objects, the memory module comprising at least a Field Programmable Gate Array (FPGA), a first memory, and a second memory, the first memory having lower latency than the second memory;
accessing each memory object of the one or more memory objects using a single memory reference instruction without Input/Output (I/O) instructions; and
storing, by the hardware-based processing node, a first set of data of the one or more memory objects within the first memory of the memory module;
storing, by the hardware-based processing node, a second set of data of the one or more memory objects within the second memory of the memory module;
determining, by the FPGA of the memory module at a hardware level of the memory module during execution of one or more applications on the hardware-based processing node, which of the first subset of data will be transferred to the second memory based on access patterns associated with the object memory fabric; and
determining, by the FPGA of the memory module at a hardware level of the memory module during continued execution of one or more applications on the hardware-based processing node, which of the second subset of data will be transferred to the first memory based on access patterns associated with the object memory fabric.

22. The method of claim 21, wherein the FPGA of the memory module initiates the transfer of the first subset of data and the second subset of data.

23. The method of claim 22, wherein the FPGA of the memory module transmits a communication to a processor connected to the hardware-based processing node, wherein the communication includes a notification that data has been transferred to the second memory.

24. The method of claim 21, wherein a data of the second subset of data is eligible to be transferred between to the first memory from the second memory based on a determination that the data will be referenced within a certain predetermined period of time.

25. The method of claim 21, wherein dynamically determining which of the first subset of data will be transferred to the second memory includes using metadata stored in the memory module, wherein the metadata is associated with the data.

26. The method of claim 21, wherein the first memory is a non-volatile, persistent memory and the second memory is a volatile, non-persistent memory.

27. The method of claim 26, wherein the memory module comprises a single Dual In-line Memory Module (DIMM)

and wherein the first memory is a flash memory and the second memory is a dynamic random-access memory (DRAM).

28. The method of claim 27, the FPGA of the memory module maps an object of the one or more memory objects from the object memory fabric into a virtual address space and from the virtual address space into a physical memory address space of the first memory and the second memory.

29. The method of claim 21, wherein the memory module is a single Dual In-line Memory Module (DIMM) and comprises an accelerator module storing the one or more memory objects, wherein the accelerator module performs a set of predefined management functions on the one or more memory objects.

30. The method of claim 29, wherein the set of predefined management functions of the accelerator module replace storage management and networking software in the node.

* * * * *